(12) United States Patent
Iino et al.

(10) Patent No.: US 8,219,439 B2
(45) Date of Patent: Jul. 10, 2012

(54) ELECTRIC-POWER-GENERATING-FACILITY OPERATION MANAGEMENT SUPPORT SYSTEM, ELECTRIC-POWER-GENERATING-FACILITY OPERATION MANAGEMENT SUPPORT METHOD, AND PROGRAM FOR EXECUTING OPERATION MANAGEMENT SUPPORT METHOD ON COMPUTER

(75) Inventors: Yutaka Iino, Kawasaki (JP); Shigeru Matsumoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 159 days.

(21) Appl. No.: 12/760,275

(22) Filed: Apr. 14, 2010

(65) Prior Publication Data

US 2010/0198640 A1   Aug. 5, 2010

Related U.S. Application Data

(62) Division of application No. 10/864,896, filed on Jun. 10, 2004, now Pat. No. 8,069,077.

(30) Foreign Application Priority Data

Jun. 11, 2003 (JP) ................................. 2003-166488
Apr. 15, 2004 (JP) ................................. 2004-120707

(51) Int. Cl.
*G06Q 40/00* (2006.01)

(52) U.S. Cl. ...................... 705/7.31; 705/7.25; 705/7.29; 705/7.33; 705/7.34; 705/7.35

(58) Field of Classification Search .................. 705/7.31, 705/7.25, 7.29, 7.33, 7.34, 7.35
See application file for complete search history.

(56) References Cited

U.S. PATENT DOCUMENTS 5,687,139 A * 11/1997 Budney ............................ 368/10
6,021,402 A * 2/2000 Takriti ........................... 705/412
6,185,483 B1 * 2/2001 Drees ............................. 700/295
(Continued)

FOREIGN PATENT DOCUMENTS

JP   61-49481   10/1986
(Continued)

OTHER PUBLICATIONS

Optimal Scheduling of Spinning Reserve; H.B. Gooi; IEEE Transactions on Power Systems, vol. 14, No. 4, Nov. 1999; 8-pages.*

(Continued)

*Primary Examiner* — Gregory Johnson
(74) *Attorney, Agent, or Firm* — Oblon, Spivak, McClelland, Maier & Neustadt, L.L.P.

(57) ABSTRACT

An electric-power-generating-facility operation management support system includes an analyzing unit that calculates operation plan creating basic information based upon received information with regard to lifespan calculating expressions, present electric-power market information, and operation-history information with regard to an electric power generation. The electric-power-generating-facility operation management support system also includes an operation plan creating unit that calculates and outputs operational conditions of electric power generating facilities as a created operation planning based upon the operation plan creating basic information calculated by the analyzing unit. The analyzing unit includes a lifespan-consumption-costs calculating unit that calculates lifespan consumption costs of the electric power generating facilities. In addition, the analyzing unit includes a reserve-electric-power-price estimating unit that estimates a market price of reserve electric power. The analyzing unit further includes a reserve-electric-power supply -probability estimating unit that estimates a probability of a supply of the reserve electric power.

12 Claims, 26 Drawing Sheets

U.S. PATENT DOCUMENTS

| | | | |
|---|---|---|---|
| 6,606,848 B1 * | 8/2003 | Rollins, III | 60/39.182 |
| 6,778,882 B2 * | 8/2004 | Spool et al. | 700/295 |
| 6,990,906 B2 * | 1/2006 | Powell | 104/281 |
| 7,039,575 B2 * | 5/2006 | Juneau | 703/18 |
| 7,343,360 B1 * | 3/2008 | Ristanovic et al. | 705/412 |
| 7,349,882 B2 * | 3/2008 | Bjelogrlic et al. | 705/37 |
| 2001/0005802 A1 * | 6/2001 | Arita et al. | 700/286 |
| 2002/0019758 A1 * | 2/2002 | Scarpelli | 705/7 |
| 2002/0060497 A1 * | 5/2002 | Arita et al. | 307/42 |
| 2002/0128749 A1 * | 9/2002 | Arita et al. | 700/286 |
| 2002/0138176 A1 * | 9/2002 | Davis et al. | 700/286 |
| 2003/0041002 A1 * | 2/2003 | Hao et al. | 705/37 |
| 2003/0074244 A1 * | 4/2003 | Braxton | 705/7 |
| 2003/0083787 A1 * | 5/2003 | Harada et al. | 700/291 |
| 2003/0083788 A1 * | 5/2003 | Harada et al. | 700/291 |
| 2003/0161731 A1 * | 8/2003 | Blotenberg | 417/2 |
| 2003/0182250 A1 * | 9/2003 | Shihidehpour et al. | 706/21 |
| 2003/0189420 A1 * | 10/2003 | Hashimoto et al. | 323/212 |
| 2003/0225661 A1 * | 12/2003 | Peljto | 705/36 |
| 2004/0006502 A1 * | 1/2004 | Masiello et al. | 705/8 |
| 2004/0039622 A1 * | 2/2004 | Masiello et al. | 705/8 |
| 2004/0054564 A1 * | 3/2004 | Fonseca et al. | 705/7 |
| 2004/0095237 A1 * | 5/2004 | Chen et al. | 340/506 |
| 2004/0199478 A1 * | 10/2004 | Arita et al. | 705/412 |
| 2004/0215529 A1 * | 10/2004 | Foster et al. | 705/26 |
| 2004/0236659 A1 * | 11/2004 | Cazalet et al. | 705/37 |
| 2004/0249775 A1 * | 12/2004 | Chen | 706/21 |
| 2005/0234600 A1 * | 10/2005 | Boucher et al. | 700/286 |

FOREIGN PATENT DOCUMENTS

| | | |
|---|---|---|
| JP | 62-178704 | 8/1987 |
| JP | 2-103301 | 4/1990 |
| JP | 5-10857 | 1/1993 |
| JP | 9-179604 | 7/1997 |
| JP | 11-308772 | 11/1999 |
| JP | 2001-86645 | 3/2001 |
| JP | 2002-297803 | 10/2002 |
| JP | 2002-300720 | 10/2002 |
| JP | 2003-22368 | 1/2003 |

OTHER PUBLICATIONS

Price-based adaptive spinning reserve requirements in power system scheduling; Chung-Li Tseng; Electrical Power and Energy Systems 21 (1999); 9-pages.*

Spinning reserve allocation using response health analysis; M. Fotuhi-Firuzabad; IEE Proc.Gener. Transm. Distrib., vol. 143, No. 4, Jul. 1996; 7-pages.*

A genetic algorithm based method for bidding strategy coordination in energy and spinning reserve markets; Fushuan Wen, A.Kumar David ; Articial Intelligence in Engineering 15 (2001); 9-pages.*

Surging electricity demand growth bolsters outlook for natural gas; Koen, A D; Oil & Gas Journal; Oct. 24, 1994; 5-pages.*

NERC's Ten-Year Projections of Electric Demand and Capacity, 1992-2001; Studness, Charles M.; Public Utilities Fortnightly; Oct. 15, 1992; 3-pages.*

Realities restraining North American capacity expansion; William Horton and Dr. Robert Peltier; Power; New York; Jun. 2003; vol. 147, Iss. 5; 4-pages.*

Renewable Energy Power for Tomorrow; The Futurist; May/Jun. 1989; 4-pages.*

K. Nishimura, T. IEE, vol. 121-B, No. 11, pp. 1422-1425, "Reformation of Electricity Business and Changing R & Z Target", Nov. 1, 2001.

Hiroshi Ogawa, Member and Toshio Kobayashi, Associate, "An Approximate Estimation Method of LOLP in Planning of Power Supply Program", Chiba Institute of Technology, vol. 114-B, No. 12, Nov. 20, 1994, pp. 1212-1219 with English Abstract.

* cited by examiner

ELECTRIC-POWER-GENERATING-FACILITY OPERATION MANAGEMENT SUPPORT SYSTEM, ELECTRIC-POWER-GENERATING-FACILITY OPERATION MANAGEMENT SUPPORT METHOD, AND PROGRAM FOR EXECUTING OPERATION MANAGEMENT SUPPORT METHOD ON COMPUTER

CROSS REFERENCE TO RELATED APPLICATIONS

This application is a divisional of and claims the benefit of priority under 35 U.S.C. §120 from U.S. Ser. No. 10/864,896, filed Jun. 10, 2004, the entire contents of which are hereby incorporated by reference, and claims the benefit of priority from the prior Japanese Patent Application Nos. 2003-166488, filed Jun. 11, 2003, and 2004-120707, filed Apr. 15, 2004.

BACKGROUND OF THE INVENTION

1. Field of the Invention

The present invention relates to a system and a method for performing operation managements of electric power generating facilities, and a program for executing the method, and more particularly, to operation management support system for allowing the electric power generating facilities to exhibit optimal power generating performance while giving consideration to operational risk of the electric power generating facilities, operation management method thereof, and a program for executing the method on a computer.

Further, herein, the present inventions mentioned above may be referred to or expressed, respectively, as "electric-power-generating facility operation management support system", "electric-power-generating facility operation management support method" and "program for executing operation management support method on computer" or like.

2. Related Art

In general, in electric power generating facilities or plants such as thermal power generating facilities, operation is performed under conditions so as to extend the lifespan thereof as much as possible, based upon the estimation of lifespan of the facilities, which are determined based upon thermal stress due to operations (start, stop), aging deterioration, and so forth. Such arrangement examples are disclosed in Japanese Examined Patent Publication No. 61-49481, Japanese Examined Patent Publication No. 4-54808, and Japanese Patent No. 2965989, wherein operation is performed while giving consideration to the lifespan of the electric power generating facilities.

With the operational method and operational system for performing operation while giving consideration to the lifespan of the electric power generating facilities disclosed in the aforementioned documents, thermal stress occurring under operational conditions in a boiler, a turbine, and so forth, which are components of the electric power generating facilities, is calculated based upon a physical model, and operational conditions which exhibit the permissible calculated results are employed as restriction conditions. Then, the system transmits the calculated restriction conditions to a power generating plant operational control system, whereby operational control is performed. Description will be made regarding a schematic configuration thereof with reference to a block diagram which shows a power generating facility optimal operation system in FIG. 26. A power generating facility optimal operation system 101 includes a storage unit 103 for storing fuel-cost property functions f1(MW) through fn(MW) for the electric power generating units 102a through 102n, and an optimal-operational-condition calculation unit 105 for calculating load-distribution command values MW(1) through MW(n) for electric power generating units 102a through 102n based upon power demand from a central demand unit 104.

The optimal-operational-condition calculation unit 105 calculates the load distribution command values MW(1) through MW(n) for the electric power generating units 102a through 102n such that the sum of the electric power generation of the electric power generating units 102a through 102n (total amount of electric power generation) matches the aforementioned power demand. Description will be made below regarding the restriction conditions and the optimal conditions of the calculation.

(1) Restriction Conditions $$\text{Total power generation} = \Sigma(\text{power generation of each}) = \text{electric-power demand value}$$

(2) Optimal Conditions $$\partial f1(MW)/\partial MW(1) = \partial f2(MW)/\partial MW(2) = \ldots = \partial fn(MW)/\partial MW(n)$$

The load distribution values MW(1) through MW(n) are obtained by calculating solutions which satisfy the aforementioned restriction conditions and optimal conditions. The electric power generating facility optimal operation system having such a configuration can determine the load distribution command values (operational conditions) which suppress the power generating costs to a minimum, as well as satisfying the required power demand.

On the other hand, liberalization of electric power market in recent years involves deregulation of sale and purchase of electric power on the market. In this case, the transaction price of electric power and supply thereof change dependent upon trading of electric power on the market as shown in Non-patent Document 1. On the other hand, a technique is known as disclosed in Japanese Unexamined (KOKAI) Patent Publication No. 9-179064, wherein a product-manufacturing plant adjusts the relation between manufacturing of products and selling of electric power so as to efficiently manufacture products corresponding to the transaction price of electric power.

On the other hand, aging of the electric power generating facilities increases the risk of unexpected shutdown thereof. In the event of unexpected shutdown of the electric power generating facilities under contract for sale of electric power, the supplier of the electric power must pay a penalty for non-fulfillment of the contract. Accordingly, the risk of unexpected shutdown of the facilities should be suppressed from the perspective of business management, as well as from the perspective of plant operation. Conventionally, the supplier of the electric power has used insurance as means for avoiding or hedging such a risk.

The insurance service for handling the unexpected shutdown of the facilities has a mechanism for carrying out a monitoring-operation service for monitoring the electric power generating facilities and an electric power supplying service for providing electric power so as to compensate shortage of electric power at the time of unexpected shutdown of the facilities. An arrangement is known as disclosed in Japanese Unexamined (KOKAI) Patent Publication No. 2003-22368, which has a mechanism for carrying out an insurance service for unexpected shutdown of the facilities.

However, with the conventional electric power generating facility optimal operation mechanism, the total capability of electric power production of all electric power generating facilities is a fixed value, and estimation of supply and demand of electric power is made regardless of operations of electric power supplying sources (which will be simply referred to as "electric power suppliers" hereafter) other than the electric power generating facilities of the electric power company. Accordingly, in the event of operating the electric power generating facilities of the electric power company under this estimation using the fixed electric power demand, in some cases, imbalance occurs between supply of electric power and demand thereof. That is to say, suppliers and consumers can freely sell and purchase of electric power on the market corresponding to price fluctuation over time. Accordingly, operation of the electric power generating facilities needs to be adjusted so as to control the sale amount (in some cases, the purchase amount) of electric power based upon the market trends.

In the case of electric power suppliers directly supplying electric power to general consumers or electric-power vendors (which will be referred to as "consumer" hereafter) based upon a bilateral contract (one-to-one contract) without transmission through the central demand unit for controlling the electric power system, the electric power generating facilities need to follow the demand of the consumers which changes at random.

As described above, optimal operation cannot be performed for the electric power generating facilities of the electric power company only by operating the electric power generating facilities under optimal conditions obtained based upon the electric power demand.

Furthermore, with operation of the electric power generating facilities on the electric power market wherein the transaction price of electric power fluctuates over time directly corresponding to the market needs, maximum generating of electric power at the time of the increased transaction price thereof while monitoring the precise market trends allows the supplier of electric power to obtain an increased profit from electric power, as well as providing optimal operation thereof from the economic perspective. Furthermore, reserve electric power which can be provided at a desired time is useful on such an electric power market. Note that the term "reserve electric power" as used here does not mean electric power stored in capacitors, batteries, or the like. The term "reserve electric power" as used here means the electric power which can be generated in corresponding to the increased demand at any time by operating the electric power generating facility beyond normal operations, i.e., reserve electric power generating capabilities. Accordingly, there is demand for operation of electric power generating facilities to reserve a part of output thereof as reserve electric power so as to be used as stand-by electric power for handling risks of fluctuation of trading on the market.

However, with the aforementioned operation methods and operation systems operating under conditions for extending lifespan thereof as much as possible, or employing an insurance service for unexpected shutdown of the electric power generating facilities, operation wherein a part of output of the electric power generating facilities is set aside as the reserve electric power so as to be operated as stand-by electric power leads to problems as follows.

First, with the aforementioned operation methods and operation systems operating under conditions for extending lifespan thereof as much as possible, the aforementioned operation which sets aside the reserve electric power has a problem that optimal operation of the electric power generating facilities cannot be made according to the market demand for reserve electric power.

With the aforementioned operation methods and operation systems operating under conditions for extending lifespan thereof as much as possible, the first priority is the lifespan of the electric power generating facilities, and accordingly, the reserve electric power is prepared under rated operating conditions of the electric power generating facilities. Accordingly, operation of the reserve electric power production capability is limited to predetermined operational restriction conditions, even in a case of increased needs of the electric power market. Accordingly, in normal situations wherein no reserve electric power is not actually supplied, the electric power generating facilities generate electric power less than the rated electric power generation by the amount of the reserve electric power, i.e., performs partial-load operation, leading to the disadvantages of efficiency, costs, and the like.

Accordingly, with the aforementioned operation methods and operation systems operating under conditions for extending lifespan thereof as much as possible, sufficient reserve electric power production capability is not maintained while supplying sufficient electric power in normal situations. In a case of maintaining sufficient reserve electric power production capability, electric power generation in normal situations needs to be reduced corresponding to the increased reserve electric power production capability, leading to low-efficiency partial-load operation in normal situations. This leads to a problem that optimal operation of the electric power generating facilities cannot be made according to the market demand for reserve electric power.

Next, the aforementioned operation methods and operation systems employing an insurance service for unexpected shutdown of the electric power generating facilities also have a problem (second problem) that the insurance service has no mechanism which effectively functions as suitable risk-hedging means from the perspective of business for handling the increased operational risk of the electric power generating facilities due to generation of reserve electric power.

Operation of electric power generating facilities while maintaining reserve electric power production capability leads to marked difference in risk costs between a case wherein the reserve electric power is actually generated and an case otherwise.

However, the aforementioned conventional insurance service for unexpected shutdown of the facilities has a mechanism for estimating risk costs regardless of the fact whether or not reserve electric power has been actually generated. Accordingly, the supplier must pay an insurance fees for a case wherein the reserve electric power has been actually generated (a case of high risk costs for the electric power generating facilities) even in a case wherein the reserve electric power has not been generated (a case of low risk costs for the electric power generating facilities).

This leads to an excessive insurance fees as compared with risk costs of the electric power generating facilities in a case of generating no reserve electric power in reality, and accordingly, the aforementioned insurance service does not effectively function as risk-hedging means for operating the electric power generating facilities from the perspective of business.

SUMMARY OF THE INVENTION

Accordingly, it is an object of the present invention to provide an electric power generating facility operations management support system for determining economically-optimal operational conditions based upon real-time information with regard to the demand for the electric power and the price thereof as well as information with regard to properties of the electric power generating facilities.

Furthermore, it is an object of the present invention to provide an electric power generating facility operations management support system, an operations management support method thereof, and a program for executing the method, for supporting operation of the electric power generating facilities so as to reserve electric power beyond the rated electric power generation while monitoring the price and demand of the reserve electric power on the market, for exhibiting the maximum performance of the electric power generating facilities.

Furthermore, it is an object of the present invention to provide an electric power generating facility operations management support system, an operations management support method thereof, and a program for executing the method, for providing an insurance service which estimates risk costs based upon the fact whether or not reserve electric power has been actually generated even in a case of maintaining reserve electric power production capability beyond the rated electric power generation for exhibiting the maximum performance of the electric power generating facilities.

In order to solve the aforementioned problems, according to a first aspect of the present invention, an electric-power-generating-facilities operations management support system according to the present invention comprises: a condition-input unit for inputting: costs of electric power generation in electric power generating facilities; probability distribution of predicted values of the demand for electric power; and probability distribution of predicted values of the transaction price of electric power on the market; optimal-operational-condition calculating means for calculating the performance of electric power generation of the electric power generating facilities based upon the costs of electric power generation of electric power generating facilities, the probability distribution of predicted values of the demand for electric power, and the probability distribution of predicted values of the transaction price of electric power on the market, input from the condition-input unit so as to obtain the optimal operational conditions which exhibit the maximum performance of electric power generation; risk estimating means for calculating and estimating a risk value of damage of the optimal operation under the optimal operational conditions calculated by the optimal-operational-condition calculating means; and a calculation-result display unit for displaying the optimal operational conditions calculated by the optimal-operational-condition calculating means and the risk-estimation results estimated by the risk estimating means.

More preferably, the risk estimating means include at least one of: market-risk calculating means for calculating market risk value corresponding to damage due to fluctuation of the demand for electric power and the transaction price of electric power on the market; liquidity-risk calculating means for calculating liquidity-risk value corresponding to damage from unexpected trading on the electric power market due to deregulation of electric power on the market; credit-risk calculating means for calculating credit-risk value corresponding to damage due to shortage of information with regard to the demand of consumers; operational-risk calculating means for calculating operational-risk value corresponding to damage due to unexpected trouble of the electric power generating facilities and unexpected trouble of operation thereof; and total-risk calculating means for calculating total-risk value based upon the market-risk value, the liquidity risk value, the credit-risk value, and the operational-risk value thus calculated by the various risk calculating means.

Furthermore, according to another aspect of the present invention, an electric-power-generating-facilities operations management support system comprises: analyzing means for calculating operation plan creating basic information based upon received information with regard to lifespan calculating expressions, present electric-power market information, and operation-history information with regard to electric power generation; and operation plan creating means for calculating and outputting operational conditions of electric power generating facilities as created operation planning based upon the operation plan creating basic information calculated by the analyzing means, and the analyzing means comprises: a lifespan-consumption-costs calculating unit for calculating lifespan consumption costs of the electric power generating facilities; a reserve-electric-power-price estimating unit for estimating the market price of reserve electric power; and a reserve-electric-power supply-probability estimating unit for estimating probability of supply of reserve electric power.

Furthermore, an electric-power-generating-facilities operations management support method according to the present invention comprises: an analyzing step for calculating operation plan creating basic information; and an operation plan creating step, and the analyzing step includes: a lifespan-consumption-costs calculating step for calculating lifespan-consumption costs of electric power generating facilities; a reserve-electric-power-price estimating step for estimating the market price of reserve electric power; and a reserve-electric-power-supply-probability estimating step for estimating probability of supplying reserve electric power; and the operation plan creating step includes: an electric-power-generation-profit calculating step for calculating profit from electric power generation based upon the operation plan creating basic information calculated by the analyzing step; an optimal-operational-condition calculating step for calculating the optimal operational conditions which exhibit the optimal profit from electric power generation calculated by the electric-power-generation-profit calculating step; and an optimal-operational-condition notifying step for outputting the operational conditions calculated by the optimal-operational-condition calculating step so as to notify the user of the information.

More preferably, the electric-power-generation-profit calculating step includes: a planning-based electric-power-generation-amount $Xf$/market-price $Pf$ property calculating step for calculating the relation between the planning-based electric-power-generation amount $Xf$ which is a part of the amount of electric power generation and the estimated market price $Pf$ of reserve electric power, based upon the operation plan creating basic information calculated by the analyzing step; a reserve-electric-power-generation-amount $Xv$/market-price $Pf$ property calculating step for calculating the relation between the reserve-electric-power-generation amount $Xv$ which is a part of the amount of electric power generation and the estimated market price $Pf$ of reserve electric power; a reserve-electric-power-generation-amount $Xv$/reserve-electric-power-supply-probability property $Prob(Xv)$ calculating step for calculating the relation between the reserve-electric-power generation amount $Xv$ and the reserve-electric-power supply probability $Prob(Xv)$; an electric-power-generation-amount $[Xf+Xv]$/electric-power-revenues $P$ property calculating step for calculating the relation between the revenues $P$ from electric power generation and the amount of electric power generation $[Xf+Xv]$, based upon the various properties calculated by the planning-based electric-power-generation-amount $Xf$/market-price $Pf$ property calculating step, the reserve-electric-power-generation-amount $Xv$/market-price property $Pf$ calculating step, and the reserve-electric-powergeneration-amount Xv/reserve-electric-power-supply-probability Prob(Vx) property calculating step; an electric-power-generation-amount [Xf+Xv]/electric-power-generation-costs C property calculating step for calculating the relation between costs C of electric power generation including lifespan-consumption costs as operational-risk costs and the amount of electric power generation; and a planning-based-electric-power-generation-amount Xf/reserve-electric-power-generation-amount Xv/expected profit-from-electric-power-generation Prof property calculating step for calculating the relation between expected profit Prof from electric power generation, the planning-based electric-power-generation amount Xf, and the reserve-electric-power generation amount Xv, based upon the calculated electric-power-generation-amount [Xf+Xv]/electric-power-revenues P property and electric-power-generation-amount [Xf+Xv]/electric-power-generation-costs C property, wherein the operational-risk costs comprise lifespan-consumption costs and unexpected-shutdown-risk costs.

More preferably, the electric-power-generating-facilities operations management support method further including: an insurance-estimation-request receiving step for receiving a request for estimation of insurance; an unexpected-shutdown-risk estimating step for estimating risk of unexpected shutdown of facilities based upon past operation-history information with regard to electric power generating facilities which are to be insured, provided according to the estimation request for insurance; an insurance-fees-estimation-results output step for estimating insurance fees based upon the unexpected-shutdown risk estimated by the unexpected-shutdown-risk estimating step, and outputting the estimated results; a planning-based-electric-power-generation-amount Xf/market-price Pf property calculating step for calculating the relation between the planning-based electric power generation amount Xf which is a part of the amount of electric power generation and the estimated market price Pf of reserve electric power, based upon the operation plan creating basic information calculated by the analyzing step; a reserve-electric-power-generation-amount Xv/market-price Pf property calculating step for calculating the relation between the reserve-electric-power-generation amount Xv which is a part of the amount of electric power generation and the estimated market price Pf of reserve electric power; a reserve-electric-power-generation-amount Xv/reserve-electric-power-supply-probability Prob(Xv) property calculating step for calculating the relation between the reserve-electric-power generation amount Xv and the reserve-electric-power supply probability Prob(Xv); an electric-power-generation-amount [Xf+Xv]/electric-power-revenues P property calculating step for calculating the relation between the revenues P from electric power generation and the amount of electric power generation [Xf+Xv], based upon the various properties calculated by the planning-based electric-power-generation-amount Xf/market-price Pf property calculating step, the reserve-electric-power-generation-amount Xv/market-price Pf property calculating step, and the reserve-electric-power-generation-amount Xv/reserve-electric-power-supply-probability Prob(Xv) property calculating step; an electric-power-generation-amount [Xf+Xv]/electric-power-generation-costs C property calculating step for calculating the relation between: costs C of electric power generation including lifespan-consumption costs and unexpected-shutdown-risk costs as operational-risk costs; and the amount of electric power generation; and a planning-based-electric-power-generation-amount Xf/reserve-electric-power-generation-amount Xv/expected-profit-from-electric-power-generation Prof property calculating step for calculating the relation between expected profit Prof from electric power generation, the planning-based electric-power-generation amount Xf, and the reserve-electric-power generation amount Xv, based upon the calculated electric-power-generation-amount [Xf+Xv]/electric-power-revenues P property and electric-power-generation-amount [Xf+Xv]/electric-power-generation-costs C property; an insurance-contract-application receiving step for receiving application of insurance contract with the insurance fees estimated by the insurance-fees-estimation-results output step; a preliminary insurance-fees settlement step for executing preliminary settlement for the insurance fees according to application of insurance contract; a post-operation unexpected-shutdown-risk estimating step for estimating unexpected-shutdown risk following the preliminary settlement, based upon operation-history information with regard to the insured electric power generating facilities after insurance contract; a post-operation insurance-fees calculating step for calculating insurance fees again based upon unexpected-shutdown risk estimated by the post-operation unexpected-shutdown-risk estimating step; and a post-operation settlement step for calculating the difference between the insurance fees thus calculated again by the post-operation insurance-fees calculating step and the preliminary insurance fees, so as to execute post-operation settlement.

According to another aspect of the present invention, a program for executing operation-planning notifying processing on a computer according to the present invention comprises: an analyzing step for calculating operation plan creating basic information; and an operation plan creating step, and the analyzing step includes: a lifespan-consumption-costs calculating step for calculating lifespan-consumption costs of electric power generating facilities; a reserve-electric-power-price estimating step for estimating the market price of reserve electric power; and a reserve-electric-power-supply-probability estimating step for estimating probability of supplying reserve electric power, and the operation plan creating step includes: an electric-power-generation-profit calculating step for calculating profit from electric power generation based upon the operation plan creating basic information calculated by the analyzing step; an optimal-operational-condition calculating step for calculating the optimal operational conditions which exhibit the optimal profit from electric power generation calculated by the electric-power-generation-profit calculating step; and an optimal-operational-condition notifying step for outputting the operational conditions calculated by the optimal-operational-condition calculating step so as to notify the user of the information.

According to another aspect of the present invention, a program for executing operation-planning notifying processing on a computer comprises: an analyzing step for calculating operation plan creating basic information; and an operation plan creating step; and the analyzing step includes: a lifespan-consumption-costs calculating step for calculating lifespan-consumption costs of electric power generating facilities; a reserve-electric-power-price estimating step for estimating the market price of reserve electric power; and a reserve-electric-power-supply-probability estimating step for estimating probability of supplying reserve electric power, and the operation plan creating step includes; an electric-power-generation-profit calculating step for calculating profit from electric power generation based upon the operation plan creating basic information calculated by the analyzing step; an optimal-operational-condition calculating step for calculating the optimal operational conditions which exhibit the optimal profit from electric power generation calculated by the electric-power-generation-profit calculating step; and an optimal-operational-condition notifying step for outputting the operational conditions calculated by the optimal-operational-condition calculating step so as to notify the user of the information. Furthermore, a program for executing operation-planning notifying processing on a computer according to another aspect of the present invention comprises: an analyzing step for calculating operation plan creating basic information; and an operation plan creating step; and the analyzing step includes: a lifespan-consumption-costs calculating step for calculating lifespan-consumption costs of electric power generating facilities; a reserve-electric-power-price estimating step for estimating the market price of reserve electric power; and a reserve-electric-power-supply-probability estimating step for estimating probability of supplying reserve electric power, and the operation plan creating step includes; an electric-power-generation-profit calculating step for calculating profit from electric power generation based upon the operation plan creating basic information calculated by the analyzing step; an optimal-operational-condition calculating step for calculating the optimal operational conditions which exhibit the optimal profit from electric power generation calculated by the electric-power-generation-profit calculating step; and an optimal-operational-condition notifying step for outputting the operational conditions calculated by the optimal-operational-condition calculating step so as to notify the user of the information, and the electric-power-generation-profit calculating step including: a planning-based electric-power-generation-amount Xf/market-price Pf property calculating step for calculating the relation between the planning-based electric-power-generation amount Xf which is a part of the amount of electric power generation and the estimated market price Pf of reserve electric power, based upon the operation plan creating basic information calculated by the analyzing step; a reserve-electric-power-generation-amount Xv/market-price Pf property calculating step for calculating the relation between the reserve-electric-power-generation amount Xv which is a part of the amount of electric power generation and the estimated market price Pf of reserve electric power; a reserve-electric-power-generation-amount Xv/reserve-electric-power-supply-probability Prob(Xv) property calculating step for calculating the relation between the reserve-electric-power generation amount Xv and the reserve-electric-power supply probability Prob(Xv); an electric-power-generation-amount [Xf+Xv]/electric-power-revenues P property calculating step for calculating the relation between the revenues P from electric power generation and the amount of electric power generation [Xf+Xv], based upon the various properties calculated by the planning-based electric-power-generation-amount Xf/market-price Pf property calculating step, the reserve-electric-power-generation-amount Xv/market-price Pf property calculating step, and the reserve-electric-power-generation-amount Xv/reserve-electric-power-supply-probability Prob(Xv) property calculating step; an electric-power-generation-amount [Xf+Xv]/electric-power-generation-costs C property calculating step for calculating the relation between costs C of electric power generation including lifespan-consumption costs as operational-risk costs and the amount of electric power generation [Xf+Xv]; and a planning-based-electric-power-generation-amount Xf/reserve-electric-power-generation-amount Xv/expected-profit-from-electric-power-generation Prof property calculating step for calculating the relation between expected profit Prof from electric power generation, the planning-based electric-power-generation amount Xf, and the reserve-electric-power generation amount Xv, based upon the calculated electric-power-generation-amount [Xf+Xv]/electric-power-revenues P property and electric-power-generation-amount [Xf+Xv]/electric-power-generation-costs C property.

According to another aspect of the present invention, a program for executing insurance service processing on a computer comprises: an insurance-estimation-request receiving step for receiving a request for estimation of insurance; an unexpected-shutdown-risk estimating step for estimating risk of unexpected shutdown of facilities based upon past operation-history information with regard to electric power generating facilities which are to be insured, provided according to the estimation request for insurance; an insurance-fees-estimation-results output step for estimating insurance fees based upon the unexpected-shutdown risk estimated by the unexpected-shutdown-risk estimating step, and outputting the estimated results; an insurance-contract-application receiving step for receiving application of insurance contract with the insurance fees estimated by the insurance-fees-estimation-results output step; a preliminary insurance-fees settlement processing for executing preliminary settlement for the insurance fees according to application of insurance contract; a post-operation unexpected-shutdown-risk estimating step for estimating unexpected-shutdown risk following the preliminary settlement based upon operation-history information with regard to the insured electric power generating facilities after insurance contract; a post-operation insurance-fees calculating step for calculating insurance fees again based upon unexpected-shutdown risk estimated by the post-operation unexpected-shutdown-risk estimating step; and a post-operation settlement step for calculating the difference between the insurance fees thus calculated again by the post-operation insurance-fees calculating step and the preliminary insurance fees, so as to execute post-operation settlement.

According to the present invention, the system calculates the optimal operational conditions based upon information with regard to fluctuation of demand for electric power and fluctuation of price thereof on the market, as well as based upon the property of the electric power generating facilities, thereby enabling optimal operation of the electric power generating facilities while meeting the needs of the electric-power market. Furthermore, the system according to the present invention quantitatively estimates the risk of optimal performance of operation of the electric power generating facilities due to unexpected fluctuation of the price of electric power and unexpected fluctuation of the demand thereof, thereby assisting the operator in making a determination for operating the plant.

Furthermore, the system according to the present invention calculates risk values which represent various kinds of risks due to external factors of the electric power generating facilities, such as a market-price-fluctuation risk, a demand-fluctuation risk, and so forth, thereby estimating reduction of the optimal performance of operation of the electric power generating facilities due to various kinds of external adverse factors, in the form of probability from the economic and overall perspective while maintaining the optimal performance of electric power generation. Furthermore, the system according to the present invention displays the risk values thus calculated, in various kinds of display modes such as the display mode wherein the risk value is displayed in the form of the probability distribution of the electric power generating performance, the display mode wherein the risk value is displayed in the form of the lower end of reliability as the worst-case risk value, the display mode wherein the risk value is displayed in the form of the sigma value which represents irregularities in the electric power generating performance, and so forth, thereby providing numerical criteria for estimating risk, and thereby assisting the operator in making a determination for operating the plant.

Furthermore, the system according to the present invention enables the electric power generating facilities to maintain the reserve electric power production capability beyond the rated operational conditions, thereby enabling operation of the electric power generating facilities with the maximum performance while giving consideration to the market price of reserve electric power and the needs thereof on the electric-power market. More specifically, the system according to the present invention provides the optimal operation planning (operational conditions) of the electric power generating facilities, calculated based upon the tradeoff relation between: the operational-risk costs (lifespan-consumption costs, unexpected-shutdown-risk costs) due to over-rated operation; and the price of reserve electric power generated according to the demand on the market, thereby enabling operation of the electric power generating facilities under generally the optimal operational conditions as compared with conventional arrangements from the long-term and economic perspective.

DESCRIPTION OF THE PREFERRED EMBODIMENTS

Description will be made below regarding embodiments of the present invention.

[First Embodiment]

Figure 1:
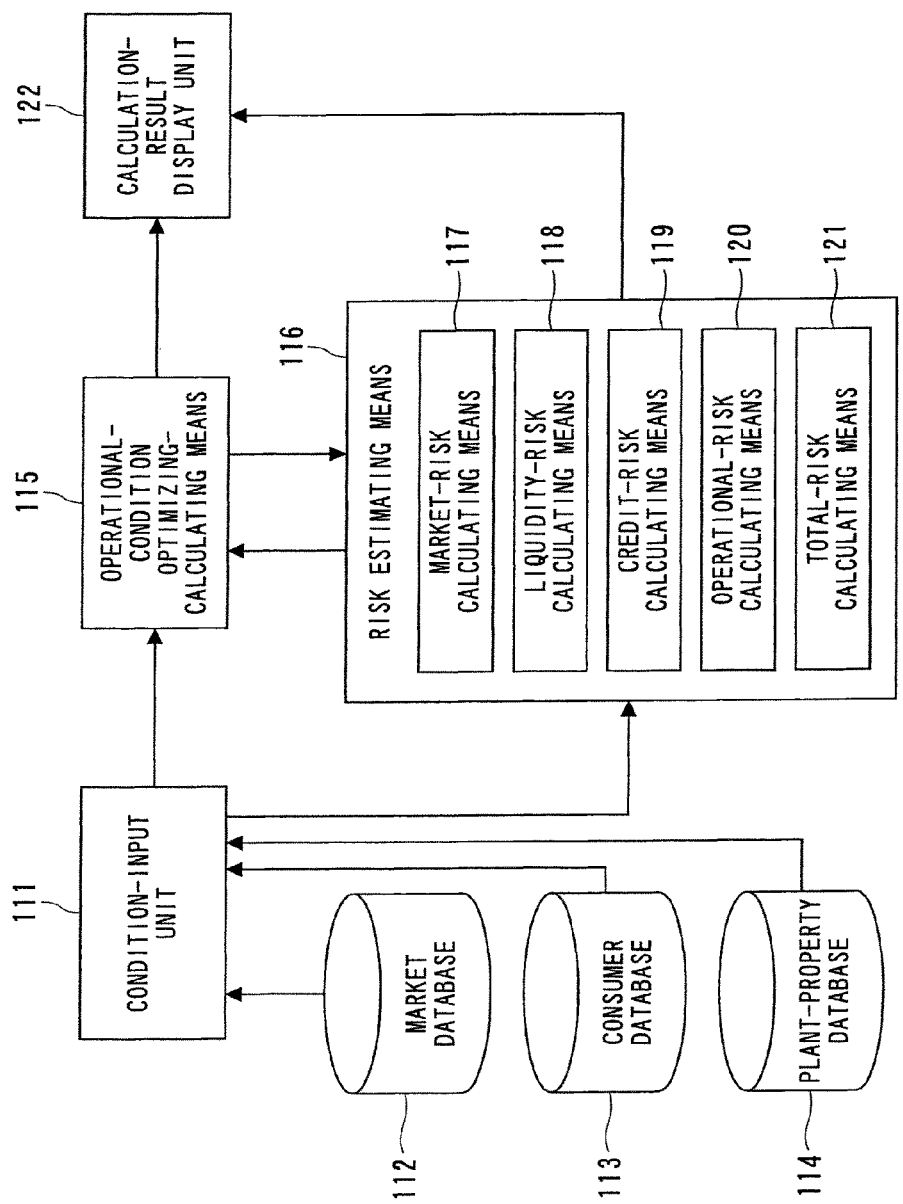
FIG. 1 is a block configuration diagram which shows an electric power generating facility operations management support system according to a first embodiment of the present invention.

FIG. 1 is a block configuration diagram which shows an electric power generating facility operations management support system 110 according to a first embodiment of the present invention. Information input from a condition input unit 111 includes: costs of generating electric power in the electric power generating facilities; probability distribution of predicted values of the demand for electric power; and probability distribution of predicted values of the transaction price of electric power on the market. The information data sets may be directly input by an operator of the electric power generating facilities, or may be input from a database which has been prepared beforehand. Now, let us say that the electric power generating facility operations management support system 110 includes a market database 112 for storing the probability distribution of the predicted values of the transaction price of electric power on the market and a consumer database 113 for storing the probability distribution of the predicted values of the demand of electric power. With such a system, upon the operator inputting the date, the probability distribution of the predicted values of the demand for electric power and the probability distribution of the predicted values of the transaction price of electric power on the market are input from the aforementioned databases. Furthermore, the electric power generating facility operations management support system 110 includes a plant-property database 114 for storing the data of the electric power generating facilities and operational data thereof (electric-power generating efficiency, costs of generating electric power, and so forth). Upon the operator specifying a specific electric power generating facility, the operational data is input from the plant-property database 114.

Operational-condition optimizing-calculation means 115 calculate the optimal electric-power-generating performance of the electric power generating facilities based upon the costs of generating electric power in the electric power generating facilities, the probability distribution of predicted values of the demand for electric power, and the probability distribution of predicted values of the transaction price of electric power on the market, which have been input from the condition input unit 111, so as to calculate optimal operational conditions for achieving optimal electric-power-generating performance. The optimal electric-power-generating performance is determined so as to exhibit optimal cost performance of electric-power supply from the electric power generating facilities, and detailed description will be made later.

Risk estimating means 116 calculate a risk value that the optimal operation under the optimal operational conditions calculated by the operational-condition optimizing-calculation means 115 would deteriorate. The risk estimating means 116 comprise market-risk calculating means 117 for calculating market risk value corresponding to damage due to fluctuation of the demand for electric power and the transaction price of electric power on the market, liquidity-risk calculating means 118 for calculating liquidity-risk value corresponding to damage due to rapid fluctuation of the amount of electric power on the market, credit-risk calculating means 119 for calculating credit-risk value corresponding to damage from fluctuation of electric power supply due to non-fulfillment of contract or annulment of contract by the consumer of electric power, operational-risk calculating means 120 for calculating operational-risk value corresponding to damage from unexpected shutdown of electric power supply due to trouble or the like of the electric power generating facilities, and total-risk calculating means 121 for calculating total-risk value based upon the market-risk value, the liquidity risk value, the credit-risk value, and the operational-risk value thus calculated by the aforementioned various risk calculating means. Detailed description thereof will be made later. Then, a calculation-result display unit 122 displays the optimal operational conditions calculated by the operational-condition optimizing-calculation means 115 and the risk estimation results obtained by the risk estimating means 116.

Next, description will be made regarding processing performed by the operational-condition optimizing-calculation means 115. The operational-condition optimizing-calculation means 115 calculates the optimal electric-power-generating performance of the electric power generating facilities so as to determine the optimal operational conditions for achieving the calculated optimal performance as follows. That is to say, the operational-condition optimizing-calculation means 115 calculate the sum of sales (which will be referred as "Sale") of electric power and the sum of costs (which will be referred to as "Cost") of electric power supply under the condition that the sum S of the generated electric power which belongs to the electric power vendor matches the sum D of the demands of electric power, as well as giving consideration to purchase and sale of electric power on the market and conditions of consumers. Next, the operational-condition optimizing-calculation means 115 calculates the difference between the Sale and the Cost so as to obtain the total electric power generating performance (which will be referred to as "Gain") of the electric power generating facilities. Next, the operational-condition optimizing-calculation means 115 determines the operational conditions such that the total electric power generating performance Gain exhibits the maximum value, whereby the optimal operational conditions are determined. Note that the operational conditions includes the load SG(i) of each electric power generating facility, the purchase amount of electric power on the market, i.e., SM, the sale amount of electric power on the market, i.e., DM, and so forth, for example.

First, the sum S of the generated electric power which belongs to the electric power vendor is obtained. With the electric power load of an i-th generator of an NS number of generators in the electric power generating facilities as SG(i) [MW], with the purchase amount of electric power on the electric power market as SM[MW], with the supply amount for compensating shortage of electric power supplied from other electric power companies or the like under backup contract as Smis[MW], the sum S of the generated electric power which belongs to the electric power vendor is represented by Expression (1).

[Mathematical Expression 1]

$$S = \sum_{i=1}^{NS} SG(i) + SM + Smis \quad (1)$$

Next, the sum D of the demands of electric power is obtained. Let us say that an NDF number of consumers purchase electric power under fixed and bilateral contract, and an NVD number of consumers purchase electric power under scaled and bilateral contract. Accordingly, with the electric power supplied under the fixed and bilateral contract as DF(i) [MW], with the electric power supplied under the scaled and bilateral contract as DV(i)[MW], with the electric power sold on the market as DM[MW], and with electric power consumption of the electric power generating facilities as Dlocal [MW], the sum D of the demand of electric power is represented by Expression (2).

[Mathematical Expression 2]

$$D = \sum_{i=1}^{NDF} DF(i) + \sum_{i=1}^{NDV} DV(i) + DM + Dlocal \quad (2)$$

Now, the sum S of the generated electric power needs to match the sum D of the demands of electric power, and accordingly, the restriction condition D=S is obtained. Furthermore, let us say that the maximum demand of the i-th consumer under scaled and bilateral contract is DVmax [WM], and the minimum demand thereof is DVmin[MW]. Furthermore, let us say that the maximum of the purchase amount SM on the market is SMmax[MW], the maximum of sale amount DM on the market is DMmax[MW], and the maximum of the backup amount for compensating shortage of electric power is Smismax[MW]. Furthermore, the maximum of electric power generation of each generator is SGmax(i), and the minimum thereof is SGmin(i). These restriction conditions (a) through (f) will be listed below.

(a) Restriction Condition Wherein the Sum of Electric Power Demand Matches the Sum of Electric Power Supply

S=D (b) Restriction Condition Wherein the Demand of Each Consumer Under a Scaled and Bilateral Contract has a Minimum and a Maximum $DVmax(i) \geq DV(i) \geq DVmin(i) (i=1, \ldots, NDV)$ (c) Restriction Condition Wherein the Sale Amount of Electric Power on the Market has a Maximum $DMmax \geq DM \geq 0$ (d) Restriction Condition Wherein the Purchase Amount of Electric Power on the Market has a Maximum $SMmax \geq SM \geq 0$ (e) Restriction Condition Wherein the Backup Amount of Electric Power for Compensating Shortage of Electric Power has a Maximum $Smismax \geq Smis$ (f) Restriction Condition Wherein the Electric Power Generation of Each Generator has a Minimum and a Maximum $SGmax(i) \geq SG(i) \geq SGmin(i) (i=1, \ldots, NS)$ Note that while the electric-power-generating efficiency has been used as an electric-power-generating performance value of the electric power generating facilities in conventional systems, the total electric power generating performance value, i.e., Gain, which is the difference between the sum Sale of the sale amount of electric power and the sum Cost of the costs of electric power supply, is used as the electric-power-generating performance value of the electric power generating facilities according to the present invention. The reason is that the transaction price (unit price per unit time or per unit electric power) of electric power on the electric power market indicates the strength of the demand of the consumers or on the market.

Accordingly, the sum of the transaction prices corresponding to the supply amount of electric power, i.e., the sum of the sale amount of electric power per unit time is used as an index of the performance for meeting the market demand and the consumer demand. Now, the sum Sale of the sale amount of electric power per unit time is represented by Expression (3).

[Mathematical Expression 3]

$$Sale = \sum_{i=1}^{NDF} CF(i)(DF(i)) + \sum_{i=1}^{NDV} CV(i)(DV(i)) + CMS(DM) \; [\$/hour] \quad (3)$$

Here, CF(i)(DF(i)) represents the rates of the i-th consumer under fixed and bilateral contract, and is represented by the function DF(i) of the electric power supplied under the contract. In the same say, CV(i)(DV(i)) represents the rates of the i-th consumer under scaled and bilateral contract, and is represented by the function DV(i) of the electric power consumption of each consumer. Furthermore, CMD(DM) represents the sale amount of electric power on the market, and is represented by the function DM of the sale amount of the electric power on the market.

On the other hand, the costs of electric power generation is used as an index for indicating operational performance of the electric power generating facilities according to the present invention. The sum of costs of electric power generation per unit time, i.e., Cost is represented by Expression (4).

[Mathematical Expression 4]

$$Cost = \sum_{i=1}^{NS} CG(i)(SG(i)) + CMP(DM) + Cpenalty + (Smis) \; [\$/hour] \quad (4)$$

Note that CG(i)(SG(i)) represents operational costs of the i-th electric power generating facility, and is represented by the function of the amount of electric power generation SG(i) corresponding to the fuel-cost performance of each electric power generating facility. On the other hand, CMP(DM) represents costs of electric power purchased on the market, and is represented by the function of the purchase amount of electric power, i.e., DM. Furthermore, Cpenalty(Smis) represents penalty costs corresponding to the backup amount of electric power from other electric power companies for compensating shortage of electric power, and is represented by the function of the backup amount of electric power, i.e., Smis.

Then, the sum of costs of electric power supply, i.e., Costs, represented by Expression (4) is subtracted from the sum of the sale amount of electric power, i.e., Sale, represented by Expression (3) so as to obtain the total electric power generating performance, i.e., Gain, as shown by Expression (5). Note the Gain such obtained is used as an index for determining the optimal operational conditions. Specifically, the operational conditions which exhibit the maximum Gain are determined as the optimal operational conditions.

$$Gain = Sale - Cost[\$/hour] \quad (5)$$

The operational-condition optimizing-calculation means 115 solve the optimization problem wherein the maximum electric-power-generating performance index represented by Expression (5) is obtained under the restriction conditions (a) through (f) based upon the probability distribution of predicted values of the transaction price of electric power on the market, the probability distribution of predicted values of the demand for electric power, and the costs of generating electric power, which have been input from the condition input unit 111, using an optimization algorithm such as a gradient-based method, sequential quadratic programming method, or the like. The operational conditions (SG(i) which is the load of each electric power generating facility, SM which is the purchase amount of electric power on the market, and DM which is the sale amount of electric power on the market) which exhibit the maximum electric-power-generating performance index are determined as the optimal operational conditions. The total electric power generating performance, i.e., Gain, and the optimal operational conditions thus calculated by the operational-condition optimizing-calculation means 115 are displayed on the calculation-result display unit 122.

Next, description will be made regarding the risk estimating means 116. The risk estimating means 116 estimates the risk of deterioration in the optimal performance due to fluctuation of the optimal operational conditions calculated by the operational-condition-optimizing calculating means 115 based upon the probability distribution of predicted values of the transaction price of electric power on the market, and the probability distribution of predicted values of the demand for electric power, which have been input from the condition input unit 111.

Figure 2:
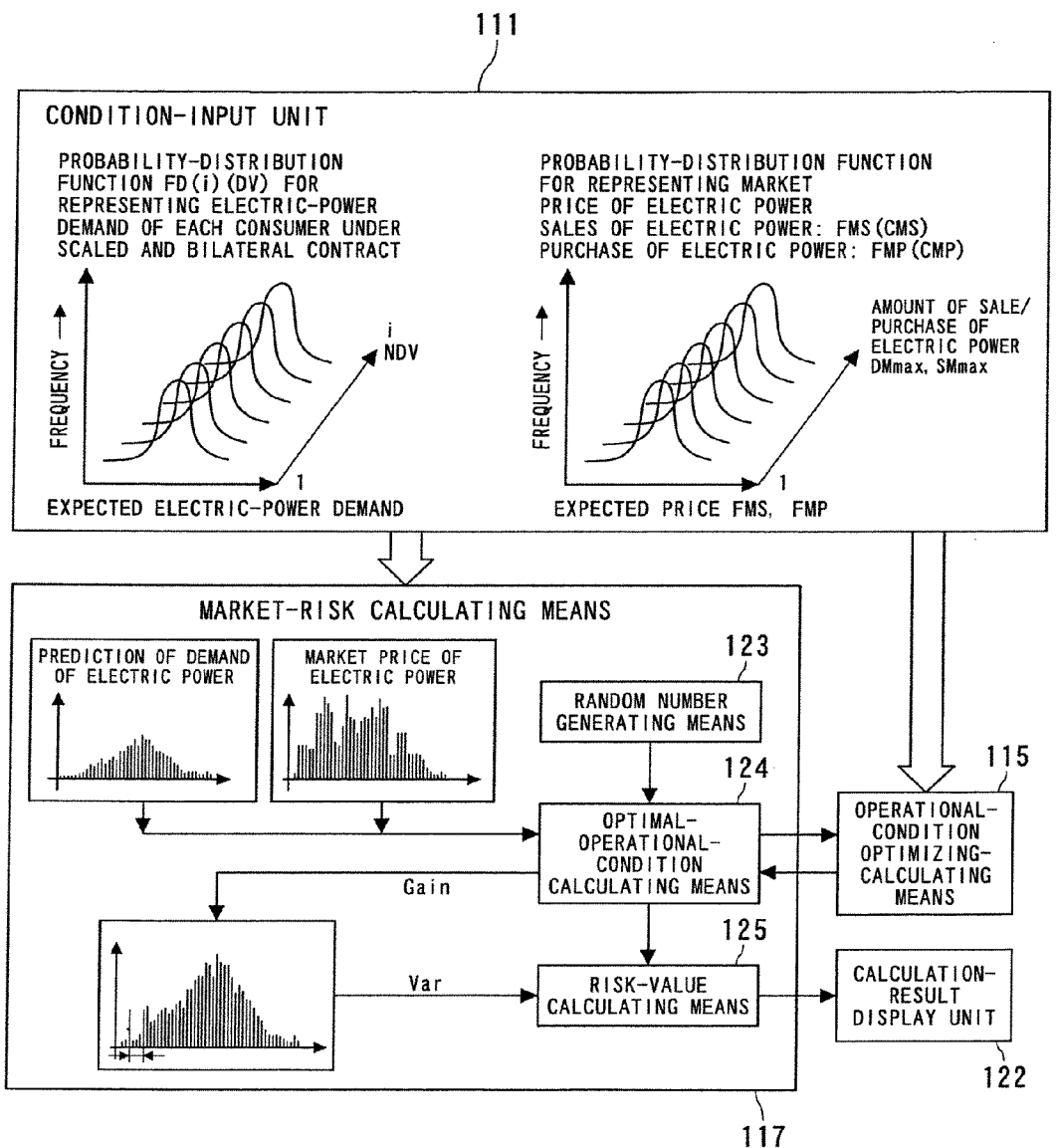
FIG. 2 is an explanatory diagram for describing market-risk calculating means included in risk estimating means according to the first embodiment of the present invention.

FIG. 2 is an explanatory diagram for describing the market-risk calculating means 117 included in the risk estimating means 116. The market-risk calculating means 117 calculate the probability of performance deterioration, which is a risk value of deterioration in the optimal performance of the electric power generating facilities due to fluctuation of the operational conditions thereof due to the fluctuation of the demand for electric power and the fluctuation of the transaction price of electric power on the market.

First, input to the market-risk calculating means 117 are: the probability distribution function FD(i)(DV) corresponding to the demand for electric power of the consumers under scaled and bilateral contract of all the consumers under bilateral contract; and the probability distribution function of the transaction price of electric power on the market (in a case of selling electric power on the market, FMS(CMS) is input, and in a case of purchase of electric power on the market, FMP (CMP) is input), which have been input from the market-condition input unit 111.

Next, with the market-risk calculating means 117, random-number generating means 123 generate a great number of random number sets based upon the probability distribution function FD(i)(DV) corresponding to the demand of electric power and the probability distribution function of the transaction price of electric power on the market. Subsequently, optimal-operational-condition calculating means 124 instruct the operational-condition optimizing-calculation means 115 to calculate the optimal operational conditions and the electric-power-generating performance under the conditions determined by each random number set. The aforementioned calculation is performed for all the random number sets, whereby the histogram of the electric-power-generating performance, i.e., Gain, represented by Expression (5), is obtained.

Risk-value calculating means 125 count the number of random number sets which exhibit the permissible minimum performance or less of the electric-power-generating performance Gain, and the ratio of the number thereof as to the number of all the random number sets is calculated, which is a probability, i.e., a risk value, of deterioration in the performance below the permissible minimum performance. Otherwise, the risk-value calculating means 125 calculate the worst case performance of the electric-power-generating performance based upon 95%-reliability, or the difference between worst-case performance and the permissible minimum performance (which will be referred to as "Value at Risk", or "VaR", hereafter). The histogram and the risk value (or the VaR value), are displayed on the calculation-result display unit 122. Thus, the estimated value of the risk from the fluctuation of the electric-power generating performance due to the fluctuation of the demand or the fluctuation of the transaction price on the market, i.e., the market risk, is obtained.

Figure 3:
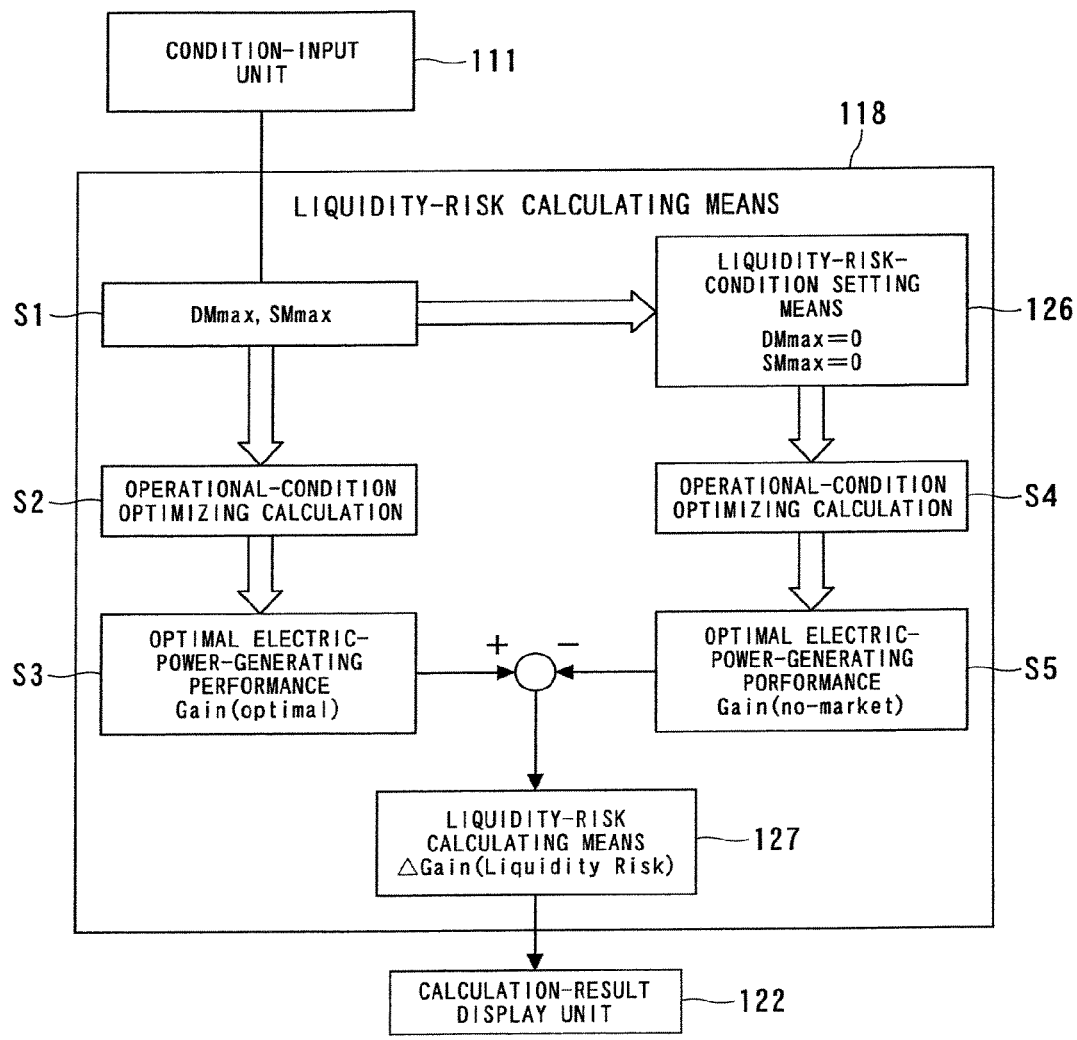
FIG. 3 is an explanatory diagram for describing liquidity-risk calculating means included in the risk estimating means according to the first embodiment of the present invention.

FIG. 3 is an explanatory diagram for describing the liquidity-risk calculating means 118 included in the risk estimating means 116. The liquidity-risk calculating means 118 calculate the risk value of deterioration in the optimal performance from the fluctuation of the operational conditions of the electric power generating facilities due to reduced trading on the market, i.e., reduced market participants, from rapid change in the market.

First, the maximum permissible value of the sale amount of electric power on the market, i.e., DMmax[MW], and the maximum permissible value of the purchase amount of electric power on the market, i.e., SMmax[MW] are input to the liquidity-risk calculating means 118 from the condition input unit 111 (Step S1) so as to perform optimal-operational-condition calculation (Step S2). Note that the liquidity-risk calculating means 118 instruct the operational-condition optimizing-calculation means 115 to perform the aforementioned calculation, whereby the optimal operational conditions and the optimal electric power generating performance, i.e., Gain (Optimal) [$/hour], are obtained by the operational-condition optimizing-calculation means 115 (Step S3).

Next, let us say that the liquidity of the market deteriorates. In this case, liquidity-risk-condition setting means 126 set the maximum value of the sale amount of electric power on the market, i.e., Dmmax, to 0 [MW], and set the maximum value of the purchase amount of electric power on the market, i.e., Smmax, to 0 [MW], so as to perform optimal-operational-condition calculation under these conditions (Step S4). Note that the liquidity-risk calculating means 118 instruct the operational-condition optimizing-calculation means 115 to perform the aforementioned calculation, whereby the optimal operational conditions and the corresponding optimal electric power generating performance, i.e., Gain (no-market) [$/hour], are obtained (Step S5). In the final stage, liquidity-risk calculating means 127 calculate the difference between the Gain under the normal market conditions and the Gain (no-market), i.e., ΔGain (Liquidity Risk), as shown by Expression (6).

$$\Delta Gain(Liquidity\ Risk) = Gain(Optimal) - Gain(no\text{-}market)[\$/hour] \qquad (6)$$

The calculated value as the liquidity-risk value is displayed on the calculation-result display unit 122. Thus, the liquidity-risk value of deterioration in the electric power generating performance due to reduction of trading of electric power on the market, i.e., deterioration in liquidity of the market, is obtained.

Figure 4:
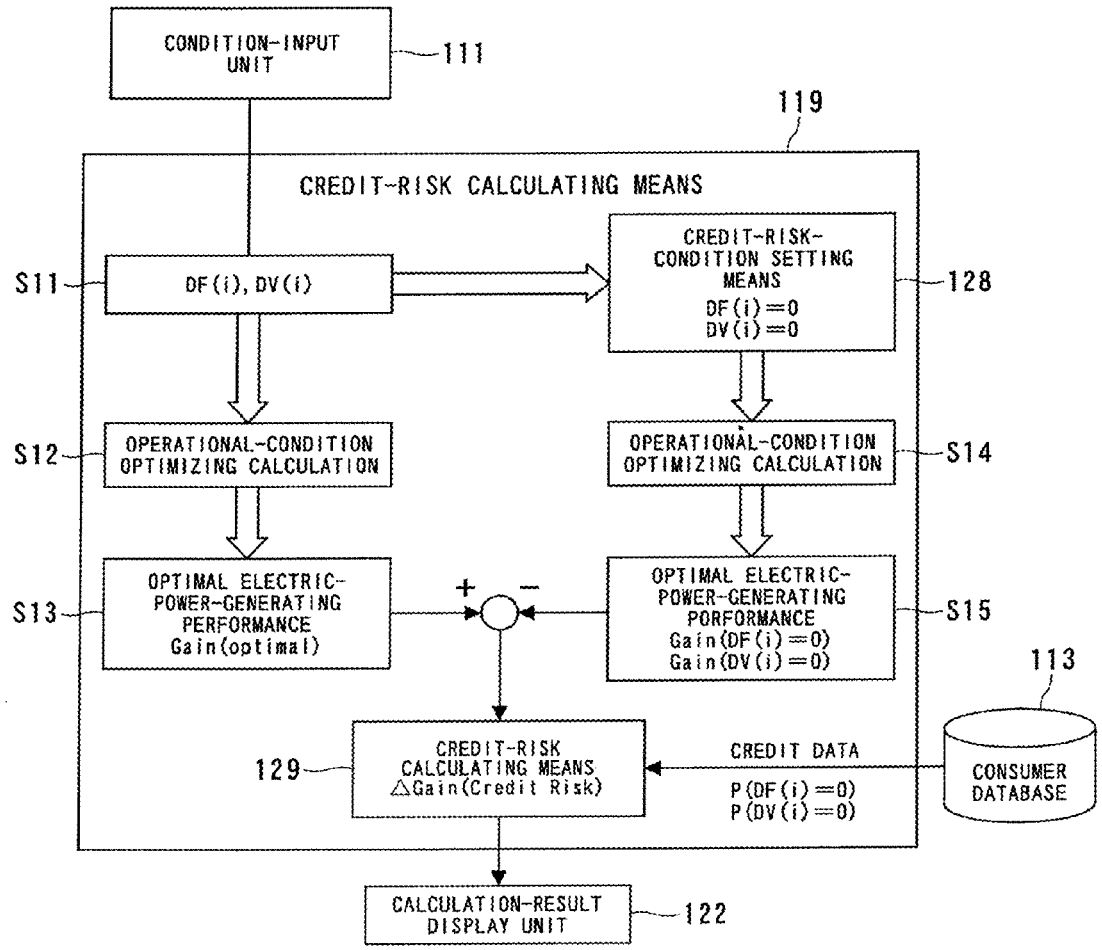
FIG. 4 is an explanatory diagram for describing credit-risk calculating means included in the risk estimating means according to the first embodiment of the present invention.

FIG. 4 is an explanatory diagram for describing the credit-risk calculating means 119 included in the risk estimating means 116. The credit-risk calculating means 119 calculate the risk value of deterioration in the electric power generating performance from the fluctuation of the operational conditions of the electric power generating facilities due to cancellation of electric power supply under contract owing to trouble such as non-fulfillment of the contract or cancellation of the contract by consumers under the contract (or electric-power brokers), bankruptcy thereof, or the like.

First, the condition input unit 111 inputs each amount of electric power supplied under fixed and bilateral contract, i.e., DF(i), and each amount of electric power supplied under scaled and bilateral contract, i.e., DV(i), to the credit-risk calculating means 119 (Step S11) so as to perform operational-condition optimizing calculation (Step S12). Note that the credit-risk calculating means 119 instruct the operational-condition optimizing-calculation means 115 to perform the aforementioned calculation, whereby the optimal operational conditions and the corresponding optimal electric power generating performance, i.e., Gain (Optimal) [$/hour], are obtained under these conditions by the operational-condition optimizing-calculation means 115 (Step S13).

Next, making an assumption that non-fulfillment of contract occurs in a part of the consumers under the contract, credit-risk condition-setting means 128 prepare scenarios wherein DF(i) becomes 0 while maintaining the other conditions for each i-th consumer, and scenarios wherein DV(i) becomes 0 while maintaining the other conditions for each i-th consumer. Then, the credit-risk calculating means 119 perform operational-condition optimizing calculation for each scenario (Step S14). Note that the credit-risk calculating means 119 instruct the operational-condition optimizing-calculation means 115 to perform the aforementioned calculation, whereby the optimal operational conditions and the corresponding electric power generating performance are calculated for each scenario, i.e., Gain (DF(i)=0) and Gain (DV(i)=0) [$/hour] for each i-th consumer, by the operational-condition optimizing-calculation means 115 (Step S15).

Credit-risk-value calculating means 129 read out credit data (probability of non-fulfillment of contract) from the consumer database 113 in the form of P(DF(i)=0) and P(DV(i)=0) so as to calculate the credit-risk value, i.e., ΔGain (Credit Risk) using Expression (7).

[Mathematical Expression 5]

$$\Delta\text{Gain(Credit Risk)} = \sum_{i=1}^{NDF} P(DF(i) = 0)[\text{Gain(optimal)} - \text{Gain}(DF(i) = 0)] + \sum_{i=1}^{NDV} P(DV(i) = 0)[\text{Gain(optimal)} - \text{Gain}(DV(i) = 0)] \quad (7)$$

Then calculation-result display unit 122 displays the calculated value as the credit-risk value. Thus, the credit-risk calculating means 119 calculate the value of the risk (credit risk) of deterioration in the electric power generating performance from reduction of bilateral trading due to non-fulfillment of contract or the like of consumers based upon credit data of consumers.

Figure 5:
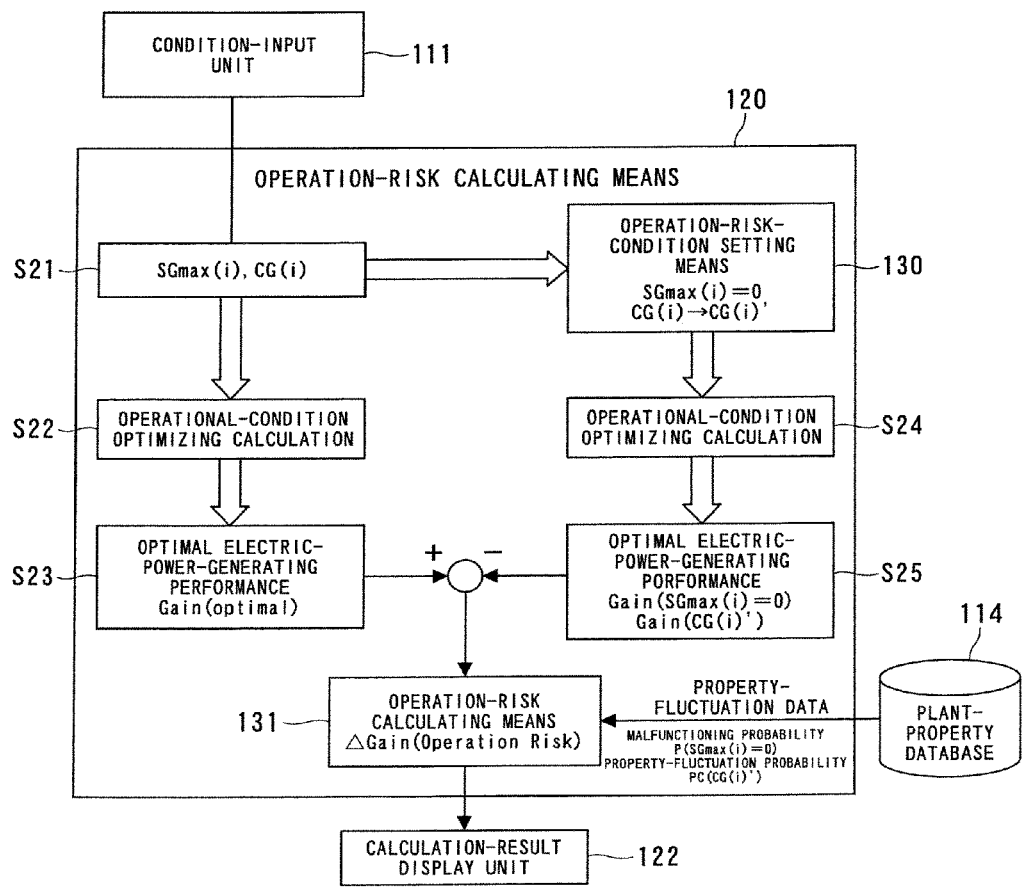
FIG. 5 is an explanatory diagram for describing operational-risk calculating means included in the risk estimating means according to the first embodiment of the present invention.

FIG. 5 is an explanatory diagram for describing operational-risk calculating means 120 included in the risk estimating means 116. The operational-risk calculating means 120 calculate the value of risk of deterioration in the optimal performance from fluctuation of the properties of the electric power generating facilities due to trouble thereof, change in external factors, or the like.

The condition input unit 111 inputs the maximum value of electric power generation, i.e., SGmax(i), and the fuel-cost property, i.e., CG(i), to the operational-risk calculating means 120 for each electric power generating facility (Step S21) so as to perform operational-condition optimizing calculation (Step S22). Note that the operational-risk calculating means 120 instruct the operational-condition optimizing-calculation means 115 to perform the aforementioned calculation, whereby the optimal operational conditions and the corresponding electric power generating performance, i.e., Gain (Optimal) [$/hour] are obtained by the operational-condition optimizing-calculation means 115 (Step S23).

Next, making an assumption that unexpected shutdown occurs in a part of the electric power generating facilities due to trouble, operational-risk condition-setting means 130 prepare scenarios wherein SGmax(i) becomes 0 while maintaining the other conditions for each i-th electric power generating facilities, and scenarios wherein the fuel-costs property CG(i) makes transition to CG(i)' due to external factors (air temperature, sea water temperature, or the like) while maintaining the other conditions for each i-th electric power generating facilities, so as to perform operational-condition optimizing calculation for each scenario (Step S24). Note that the operational-risk calculating means 120 instruct the operational-condition optimizing-calculation means 115 to perform the aforementioned calculation, whereby the optimal operational conditions and the corresponding electric power generating performance, i.e., Gain (SGmax(i)=0) and Gain (CG(i)') [$/hour] are obtained for each i-th electric power generating facilities by the operational-condition optimizing-calculation means 115 (Step S25).

Next, operational-risk-value calculating means 131 read out probability of each scenario wherein trouble occurs in the electric power generating facilities, or the electric power generating performance deteriorates due to external factors, from the plant-property database 114 in the form of performance-deterioration probability data (trouble probability P(SGmax(i)=0), and performance deterioration probability P(CG(i)') so as to obtain the operational risk value Gain (Operational Risk) using Expression (8).

[Mathematical Expression 6]

$$\Delta\text{Gain(Operation Risk)} = \sum_{i=1}^{NS} P(SG\text{max}(i) = 0)[\text{Gain(optimal)} - \text{Gain}(SG\text{max}(i) = 0)] + \sum_{i=1}^{NS} P(CG(i)')[\text{Gain(optimal)} - \text{Gain}(CG(i)')] \quad (8)$$

Then calculation-result display unit 122 displays the calculated value as the operational-risk value. Thus, the operational-risk calculating means 120 calculate the value of the risk (operational risk) of deterioration in the electric power generating performance due to trouble of the electric power generating facilities or change in properties thereof due to external factors based upon reliability data thereof.

Furthermore, the risk estimating means 116 include the total-risk calculating means 121 for calculating total risk value, i.e., ΔGain (Total), based upon the market-risk value VaR calculated by the market-risk calculating means 117, the liquidity-risk value ΔGain (Liquidity Risk) calculated by the liquidity-risk calculating means 118, the credit-risk value ΔGain (Credit Risk) calculated by the credit-risk calculating means 119, and the operational-risk value ΔGain (Operation risk) calculated by the operational-risk calculating means 120. Thus, the total risk is represented by a value, thereby facilitating determination of operations of the electric power generating facilities. Note that the total risk value, i.e., ΔGain (Total) is obtained using Expression (9).

$$\Delta\text{Gain}(\text{Total}) = \alpha 1 \cdot VaR + \alpha 2 \cdot \Delta\text{Gain}(\text{Liquidity Risk}) + \\ \alpha 3 \cdot \Delta\text{Gain}(\text{Credit Risk}) + \alpha 4 \cdot \Delta\text{Gain}(\text{Operation Risk}) \quad (9)$$

The calculation-result display unit 122 displays the calculated value as the total value. Thus, the system obtains a value of risk (total risk) due to fluctuation of the electric power generating performance, as the total estimation results including various types of risk during operation.

Figure 6:
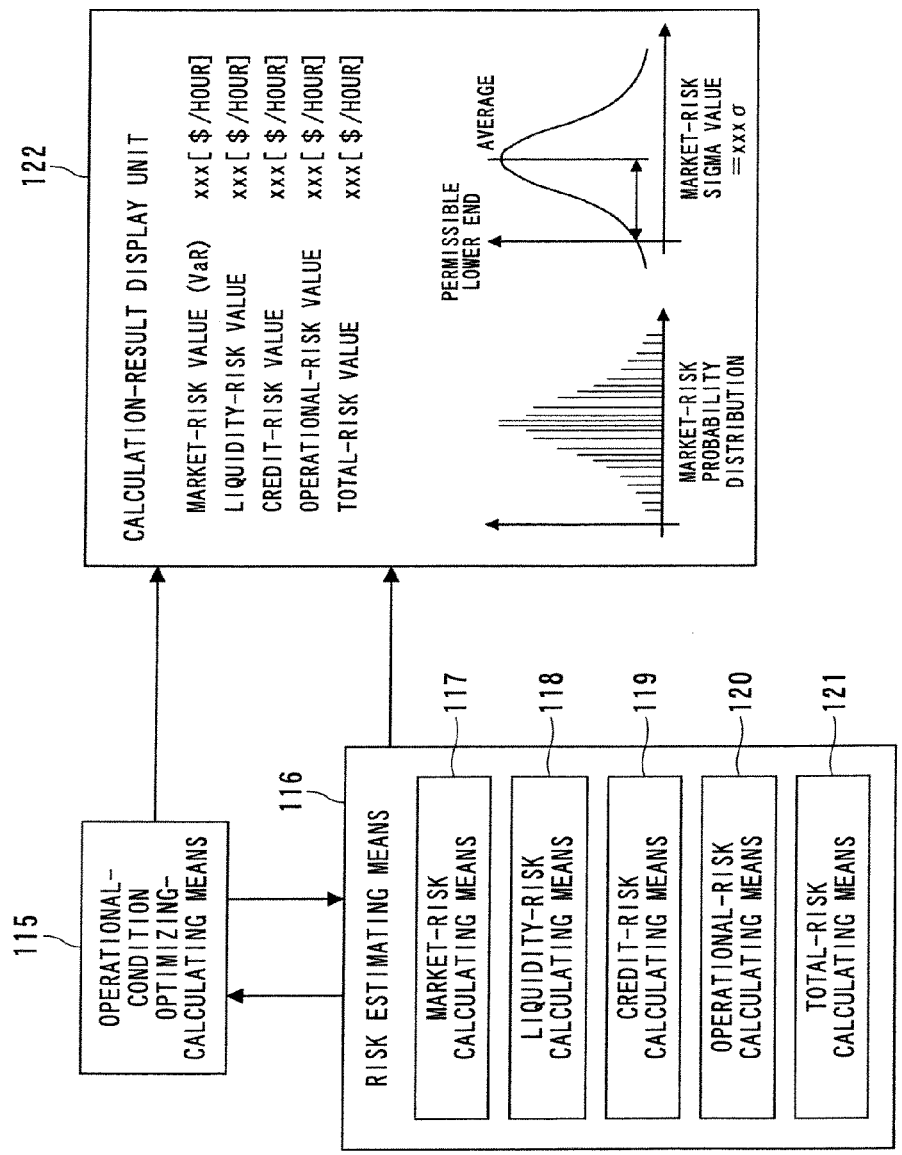
FIG. 6 is an explanatory diagram for describing a display function of a calculation-result display unit for displaying risk values according to the first embodiment of the present invention.

Next, description will be made regarding the display function of the calculation-result display unit 122. FIG. 6 is an explanatory diagram for describing the display function of the calculation-result display unit 122 for displaying the risk values. The calculation-result display unit 122 has the risk-value display function for displaying various kinds of risk values as graphic data or numeric data on the calculation-result display 122, thereby efficiently assisting the operator of the electric power generating facilities in making a determination.

As shown in FIG. 6, the calculation-result display unit 122 receives the market-risk value, the fluidity-risk value, the credit-risk value, the operational-risk value, and the total-risk value, from the risk estimating means 116, and displays these risk values on the screen thereof as values of deterioration in the electric power generating performance. These risk values may be displayed on a Web site through a Web server. Furthermore, a histogram of market risk values may be displayed.

Furthermore, an arrangement may be made wherein a normal-distribution curve is fit to the histogram so as to calculate and display the ratio (which will be referred to as "sigma ratio") of difference between the average and the permissible minimum value as to the standard deviation σ. Furthermore, an arrangement may be made wherein the minimum value determined based upon 95%-reliability of the market risk is displayed as the worst-case electric power generating performance, i.e., VaR (Value at Risk). These various kinds of display functions for displaying risk values allow the operator of the electric power generating facilities to intuitively understand the degree of these risks, thereby assisting the operator in making a determination.

With the first embodiment, the optimal operational conditions are calculated based upon the input information with regard to fuel-cost properties of the electric power generating facilities and the input information with regard to the predicted values and probabilities of the demand for electric power and the transaction price thereof on the market. That is to say, the optimal operational conditions are not calculated only based upon the fuel-cost properties but also based upon trading on the market such as selling electric power on the electric power market or purchase thereof in a case that the purchase price is lower than the costs of electric power generation. Furthermore, the risk estimating means 116 allow the operator of the electric power generating facilities to make a quantitative estimation of influence of fluctuation of the transaction price and fluctuation of the demand upon the optimal performance of operation of the electric power generating facilities, thereby assisting the operator in making a determination of plant operation.

[Second Embodiment]

Figure 7:
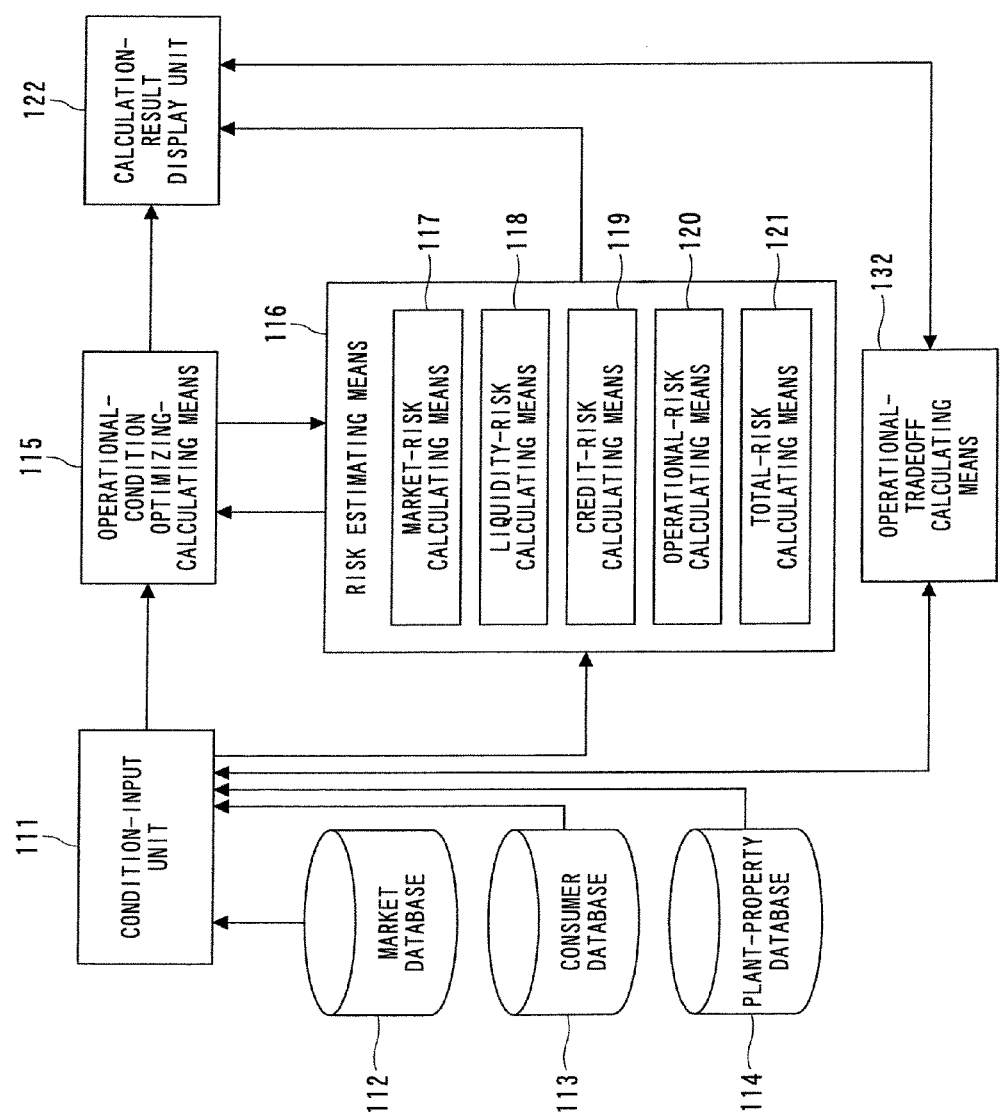
FIG. 7 is a block configuration diagram which shows an electric-power-generating-facilities operations management support system according to a second embodiment of the present invention.

Next, description will be made regarding a second embodiment according to the present invention. FIG. 7 is a block configuration diagram which shows an electric-power-generating-facility (or facilities) operation management support system according to the second embodiment of the present invention. The electric-power-generating-facilities operation management support system according to the second embodiment has the same configuration as with the first embodiment shown in FIG. 1, except for further including optimal tradeoff calculating means 132 for calculating the optimal tradeoff operational conditions. The same components as in FIG. 1 are denoted by the same reference numerals, and redundant description thereof will be omitted.

As shown in FIG. 7, upon the optimal tradeoff calculating means 132 receiving determining parameters with regard to tradeoff between the optimal performance of the electric power generation and the risk thereof from the condition input unit 111, the optimal tradeoff calculating means 132 calculate the optimal tradeoff operational conditions based upon the received information, and display the calculated results on the calculation-result display unit 122.

Figure 8:
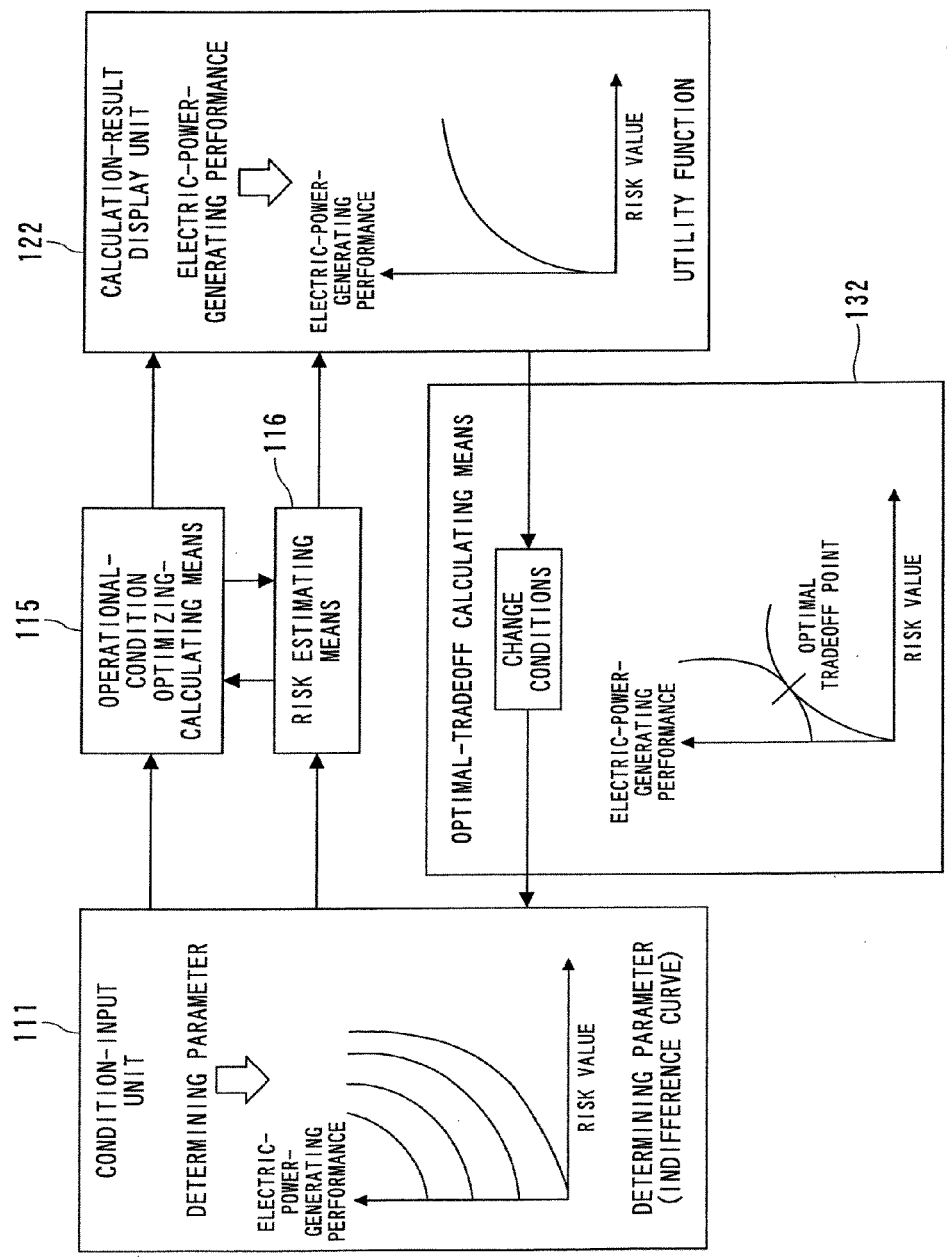
FIG. 8 is an explanatory diagram for describing processing performed by optimal tradeoff calculating means according to the second embodiment of the present invention.

FIG. 8 is an explanatory diagram for describing processing performed by the optimal tradeoff calculating means 132. The condition input unit 111 inputs the risk values permissible for the operator of the electric power generating facilities in the form of "determining parameters" for generating "indifference curves". As shown in FIG. 8, the indifference curves generated by the determining parameters represent tradeoff relation between the risk value and the electric-power generating performance, wherein the horizontal axis represents the risk value and the vertical axis represents the electric power generating performance. Note that the relation between the electric power generating performance and the risk thereof at any point on the single indifference curve constitutes an equivalent tradeoff.

Next, the optimal tradeoff calculating means 132 calculate the relation between the optimal electric power generating performance and the risk thereof with the various kinds of input conditions received from the condition input unit 111 as parameters, whereby the utility function is obtained, and is displayed on the calculation-result display unit 122 as shown in FIG. 8. In the final stage, the optimal tradeoff calculating means 132 select a single indifference curve which comes in contact with the utility function at only one point, and determine the point as the optimal tradeoff point. The operational conditions corresponding to the optimal tradeoff point thus obtained are determined as the optimal tradeoff operational conditions, and are displayed on the calculation-result display unit 122.

With the second embodiment, the optimal tradeoff calculating means 132 calculate the optimal tradeoff operational conditions based upon the evaluation criteria for determining tradeoff between the electric power generating performance and the risk thereof specified by the operator of the electric power generating facilities, thereby efficiently assisting the operator in making a determination.

[Third Embodiment]

Figure 9:
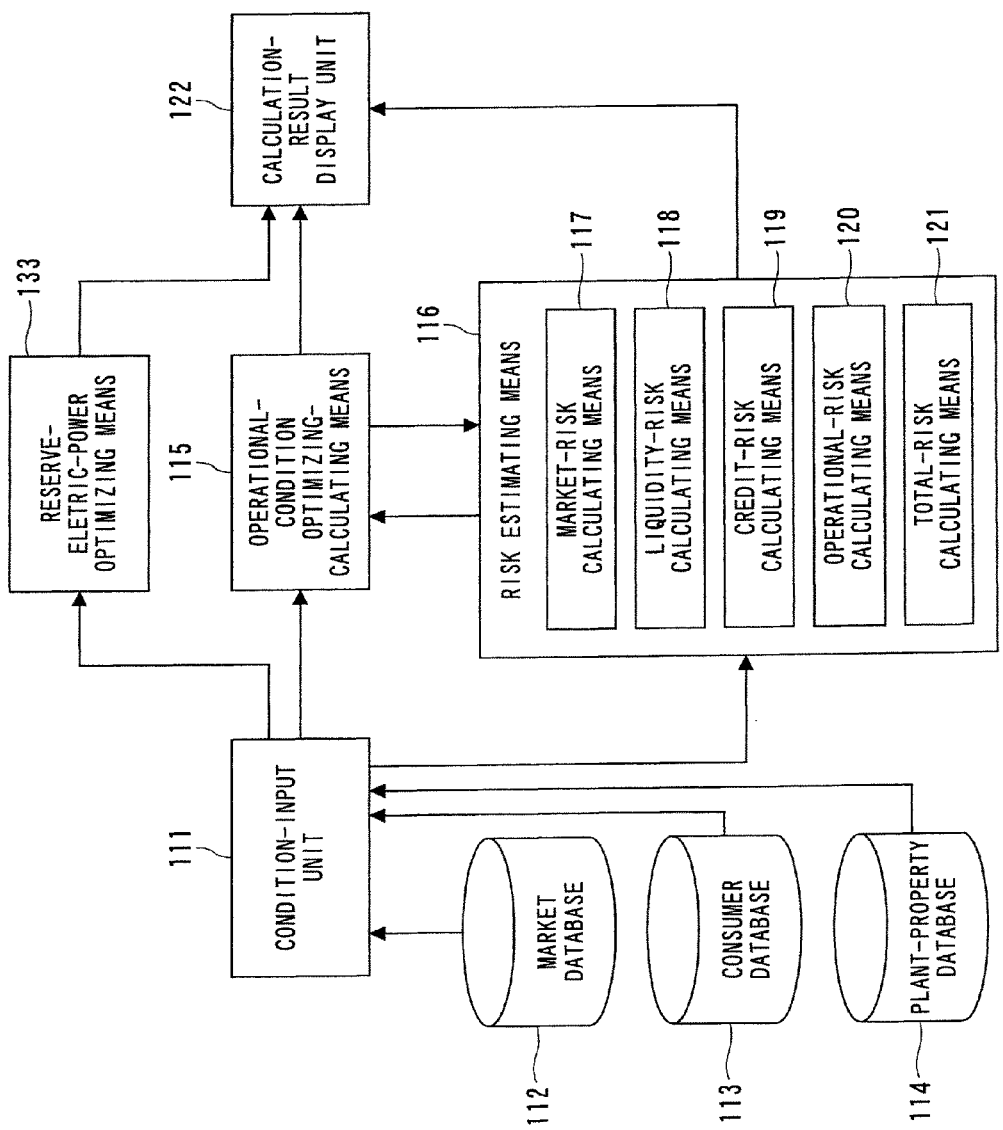
FIG. 9 is a block configuration diagram which shows an electric-power-generating-facilities operations management support system according to a third embodiment of the present invention.

Next, description will be made regarding a third embodiment according to the present invention. FIG. 9 is a block configuration diagram which shows an electric-power-generating-facilities operations management support system according to the third embodiment of the present invention. The electric-power-generating-facilities operations management support system according to the third embodiment has the same configuration as with the first embodiment shown in FIG. 1, except for further including reserve-electric-power optimizing means 133 for calculating optimal reserve power for immediately responding to the demand for an increase of the supply from the consumers. The same components as in FIG. 1 are denoted by the same reference numerals, and redundant description thereof will be omitted.

As shown in FIG. 9, upon the reserve-electric-power optimizing means 133 receiving reserve-electric-power parameters with regard to the reserve power of the electric power generating facilities from the condition input unit 111, the reserve-electric-power optimizing means 133 calculate the optimal partial load operational conditions or optimal over-rated-load operational conditions of the electric power generating facilities for maintaining reserve electric power production capability, and display the calculated results on the calculation-result display unit 122.

The reserve electric power production capability is maintained for handling change in the demands of the consumers by operating the electric power generating facilities so as to be prepared for immediately increasing output thereof corresponding to demand from the consumers at all times. In some cases, electric power generated by a generator having a function for preparing the reserve power is traded at a higher price on the market than with the generator without such a function. As described above, the operation of the electric power generating facilities for preparing the reserve power is useful for the electric power market as well as consumers.

Figure 10:
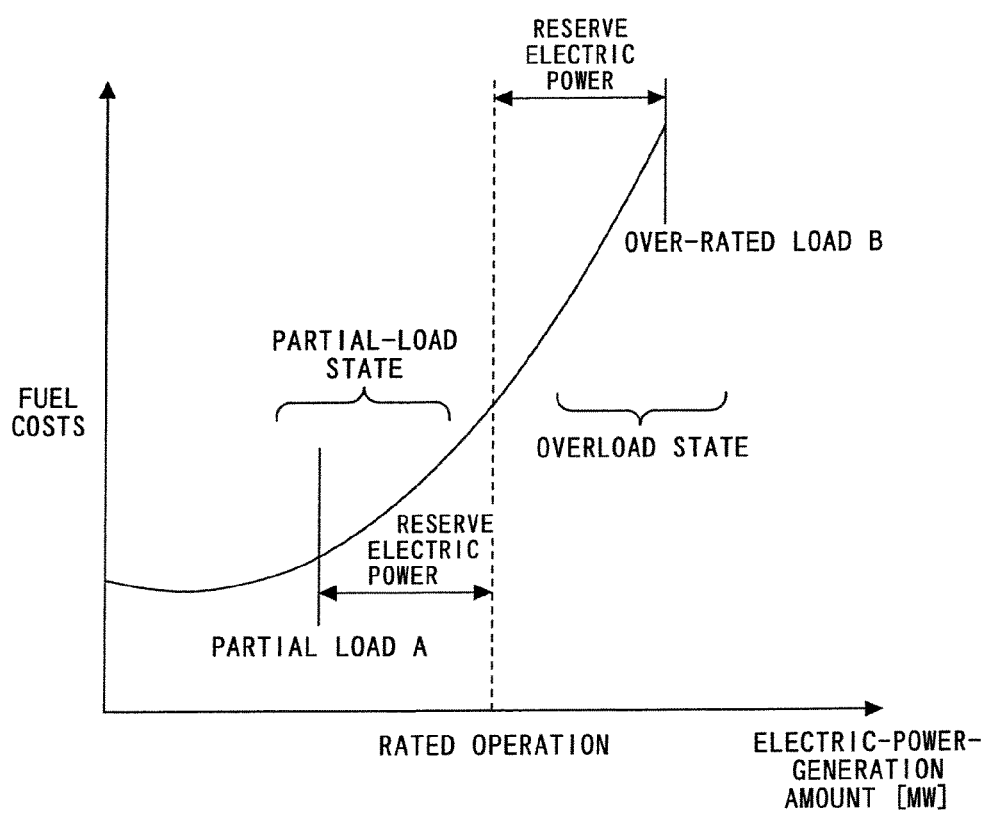
FIG. 10 is an explanatory diagram for describing a mechanism based upon the fuel-costs property of the electric power generating facilities, used by reserve-electric-power optimizing means for calculating reserve electric power according to the third embodiment of the present invention.

On the other hand, operation of the electric power generating facilities for maintaining the reserve electric power production capability leads to reduction of the optimal electric power generating performance thereof. Description will be made regarding the reason with reference to FIG. 10 which shows the fuel-cost property of the electric power generating facilities. FIG. 10 shows the relation between the electric-power output (MW) and the fuel cost of electric power generation ($/hour), as the fuel-cost property, wherein the horizontal axis represents the electric-power output (MW) and the vertical axis represents the fuel cost of electric power generation [$/hour].

In general, the maximum electric power output is obtained with the optimal efficiency under the rated operational conditions. However, with the present embodiment, there are two modes for maintaining the reserve electric power production capability. One mode (first mode) is that the electric power generating facilities are operated so as to exhibit a lower output performance in normal situations than with the rated operation (partial-load operation), and the output is increased in a range up to that obtained under the rated operational conditions corresponding to the demand for an increase of the load from the consumers. The other mode (second mode) is that the electric power generating facilities are operated under the rated operational conditions beyond the rated operation in normal situations, and are operated under over-rated-operational conditions corresponding to the demand for an increase of the supply from the consumers.

In a case of the aforementioned first mode, the electric power generating facility needs to be operated under partial-load operational conditions denoted by "partial load A" in FIG. 10, leading to partial-load operation of the electric power generating facility with a lower efficiency than with the optimal operational conditions around those of the rated operation. That is to say, such operation leads to sacrificing electric power generating performance. In this case, the cost of the reserve electric power, i.e., the extent of the sacrifice of the optimal electric power generating performance, $\Delta$Cost (Partial Load), is represented by Expression (10).

$$\Delta \text{Cost(Partial Load)} = \text{Cost(Partial Load)} - \text{Cost(Optimal)} \tag{10}$$

Note that Cost (Partial Load) represents the costs of electric power generation under the partial-load operational conditions, and Cost (Optimal) represents the costs of the electric power generation under around the rated operational conditions.

On the other hand, in a case of the second mode, the electric power generating facilities need to be operated under over-load operational conditions denoted by "overload B" in FIG. 10 upon receiving the demand for generating the reserve electric power, leading to increased operational costs such as reduced lifespan thereof, increased maintenance costs, and so forth, due to excessive stress applied to the electric power generating facilities, as well as deterioration in efficiency of electric power generation thereof. Note that "overload operations" used here means operations under conditions beyond rated operational conditions, wherein the electric power generating facilities are preferably operated under the rated operational conditions or less from the perspective of lifespan thereof.

Operation of the electric power generating facilities under the overload operational conditions denoted by "overload B" in FIG. 10 leads to reduction of the efficiency from the optimal operation under around the rated operational conditions due to change in load. That is to say, such operation leads to sacrificing electric power generating performance. In this case, the cost of the reserve electric power, i.e., the extent of the sacrifice of the optimal electric power generating performance, $\Delta$Cost (Overload), is represented by Expression (11).

$$\Delta \text{Cost(Overload)} = \text{Cost(Overload)} - \text{Cost(Optimal)} \tag{11}$$

Note that Cost (Overload) represents the costs of electric power generation under the overload operational conditions, and Cost (Optimal) represents the costs of electric power generation under around the rated operational conditions.

Maintaining of the reserve electric power production capability leads to the advantage of the increased value of bilateral contract and increased profit from supplying the reserve electric power on the market, and the disadvantage of increased costs of electric power generation, and the disadvantage of increased costs of electric power generation, so there is a tradeoff between advantage and disadvantage.

Figure 11:
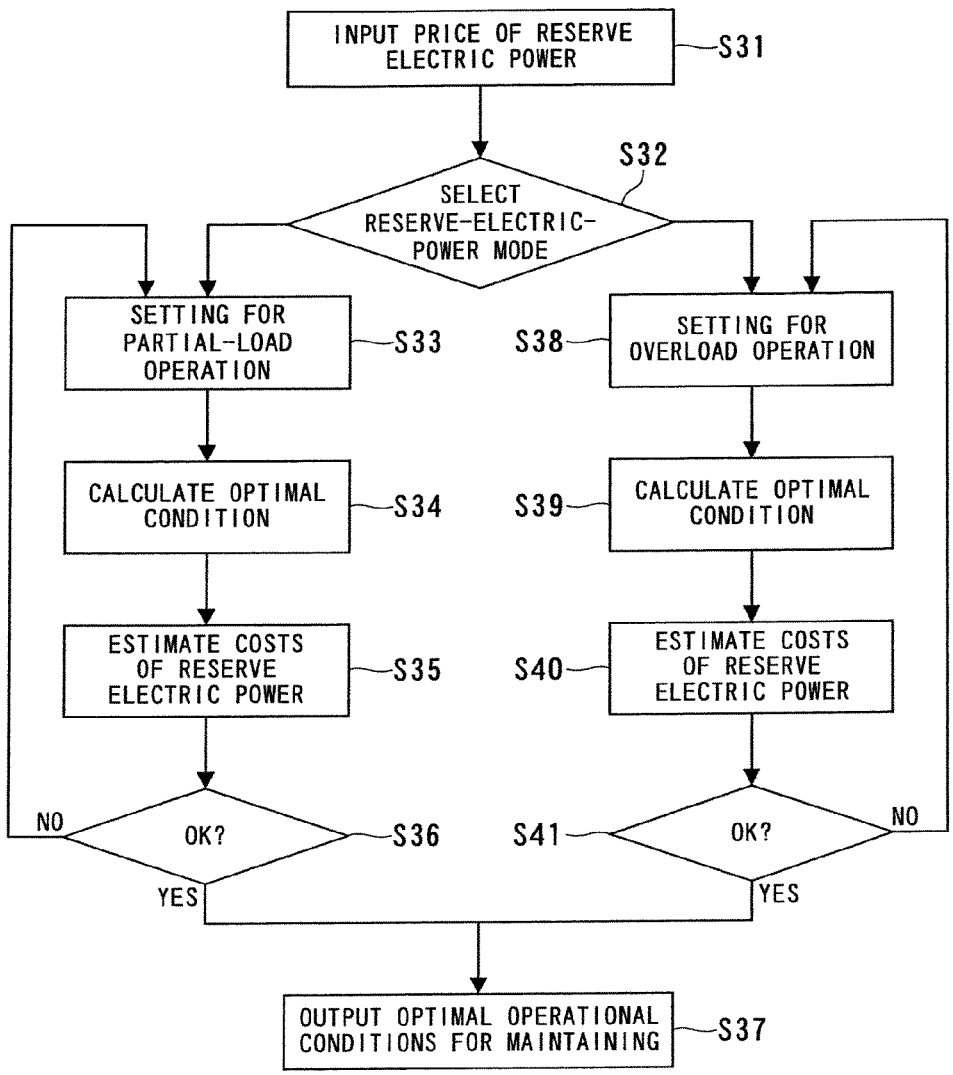
FIG. 11 is a flowchart for describing processing performed by the reserve-electric-power optimizing means according to the third embodiment of the present invention.

Accordingly, the reserve-electric-power optimizing means 133 calculate optimal reserve power production capability. FIG. 11 shows a flowchart for describing processing performed by the reserve-electric-power optimizing means 133. First, a price of the reserve electric power, CMargin [$/MW], as a reserve-electric-power parameter, is input from the condition input unit 111 (Step S31). Next, mode selection is made (Step S32). The operator of the electric power generating facilities selects a mode from: the partial-load mode wherein partial-load operation is performed in normal situations and output is increased corresponding to the increased demand from the consumers; and the overload mode wherein rated operation is performed in normal situations and output is increased by operating the electric power generating facilities beyond rated operation corresponding to the increased demand from the consumers. Upon the operator selecting the partial-load mode, the reserve-electric-power optimizing means 133 receive initial values of the reserve electric power $\Delta$[MW] and corresponding partial-load operational conditions (Step S33) so as to calculate the optimal operational conditions (Step S34). Note that the reserve-electric-power optimizing means 133 instruct the operational-condition optimizing calculation means 115 to perform the aforementioned calculation. The costs of operation of the electric power generating facilities with the reserve electric power production capability are compared with the costs thereof without the reserve electric power production capability, whereby the costs of the reserve electric power production capability are calculated (Step S35). Then, the costs of reserve electric power are estimated (Step S36). Subsequently, determination is made whether or not the costs Δcost of reserve electric power production capability thus calculated have matched the price of the reserve electric power, CMargin. In the event that determination is made that the costs thereof have matched CMargin, the corresponding operational conditions are determined as the optimal operational conditions with the reserve electric power production capability, and are displayed on the calculation-result display unit 122 (Step S37).

In the event that determination is made that the costs thereof do not match CMargin, processing is performed as follows. That is to say, in the event of the costs of reserve electric power production capability Δcost, <the price of the reserve electric power, i.e., CMargin, the reserve electric power production capability is increased (Δ←Δ+δ). On the other hand, in the event of the costs of reserve electric power production capability, Δcost, >the price of the reserve electric power, i.e., CMargin, the reserve electric power production capability is reduced (Δ←Δ−δ). Subsequently, the flow returns to Step S33, and the same processing is performed until that determination is made that the costs of the reserve electric power production capability, Δcost, have matched the price of the reserve electric power, CMargin. That is to say, convergence analysis is performed. In the event that determination is made that the convergence conditions have been satisfied, the corresponding operational conditions are determined as the optimal operational conditions with the reserve electric power production capability, and are displayed on the calculation-result display unit 122 (Step S37).

On the other hand, upon the operator selecting the overload mode in mode selection in Step S32, the reserve-electric-power optimizing means 133 receive initial values of the reserve electric power Δ [MW] and corresponding overload operational conditions (Step S38) so as to calculate the optimal operational conditions (Step S39) in the same way as in the partial-load mode. Subsequently, the costs of operation of the electric power generating facilities with the reserve electric power production capability are compared with the costs thereof without the reserve electric power production capability, whereby the costs of the reserve electric power production capability are calculated (Step S40). Then, estimation is made for the costs of the reserve electric power production capability (Step S41). That is to say, convergence analysis is performed under the condition wherein the costs of the reserve electric power production capability, Δcost, match the price of the reserve electric power, Cmargin. In the event that determination is made that the convergence conditions have been satisfied, the corresponding operational conditions are determined as the optimal operational conditions with the reserve electric power production capability, and are displayed on the calculation-result display unit 122 (Step S37).

The electric-power-generating-facilities operations management support system according to the third embodiment includes the reserve-electric-power optimizing means 133, thereby obtaining the optimal tradeoff conditions between the advantage of the increased value of bilateral contract and increased profit from supplying the reserve electric power on the market, and the disadvantage of increased costs of electric power generation. Thus, the electric-power-generating-facilities operations management support system according to the third embodiment allows the operator thereof to operate the electric power generating facilities with higher efficiency than with the conventional optimal operation from the economic perspective.

[Fourth Embodiment]

Figure 12:
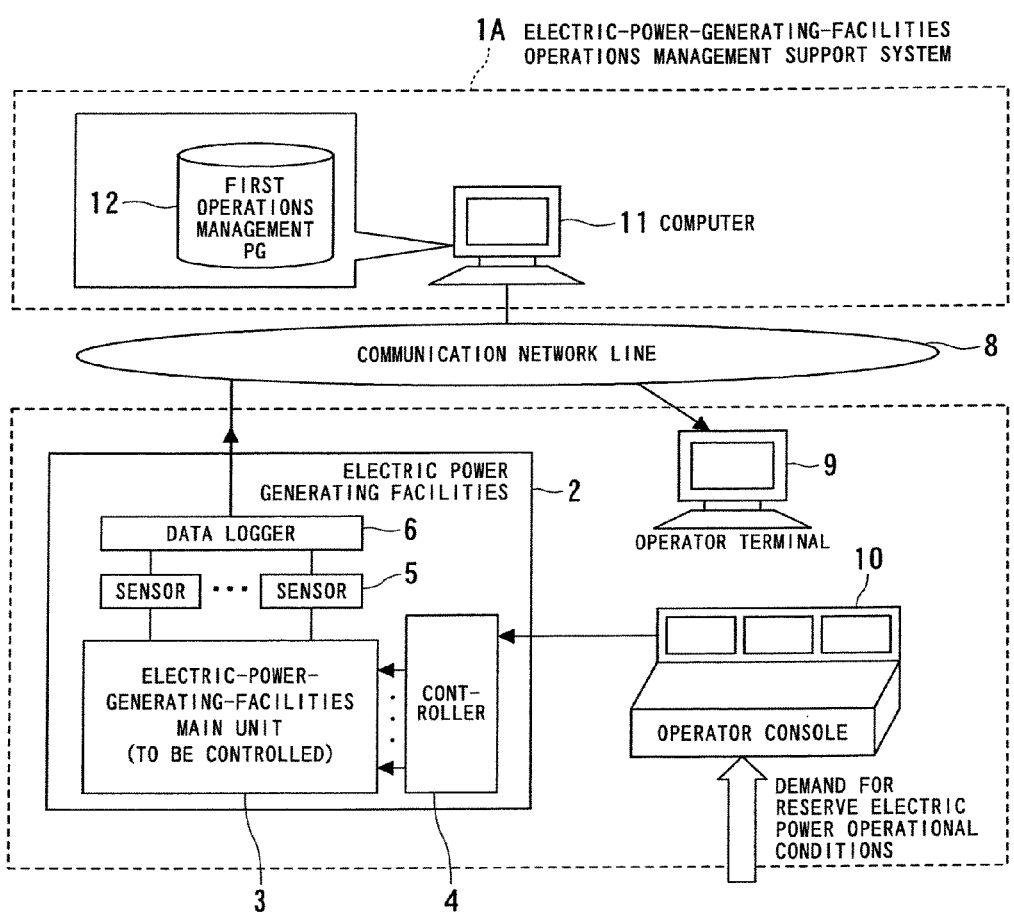
FIG. 12 is a schematic configuration diagram which shows a schematic configuration of an operations management system for managing electric power generating facilities, including an electric-power-generating-facilities operations management support system according to a fourth embodiment of the present invention.

FIG. 12 is a schematic configuration diagram which shows a schematic configuration of an operations management support system for managing electric power generating facilities 2, including an electric-power-generating-facilities operations management support system 1A according to a fourth embodiment of the present invention.

The electric-power-generating-facilities operations management support system 1A provides the user (the operator or the like who actually operates the electric power generating facilities 2) the estimated optimal operational conditions for operation of the electric power generating facilities 2 with as low risk and as high efficiency as possible, for operation for generating the normal amount of electric power (which will be referred to as "base electric power generation" hereafter), and operation for providing the reserve electric power, thereby assisting the operator of the electric power generating facilities.

FIG. 12 shows a schematic configuration of the electric power generating facilities 2 including: an electric-power-generating-facility main unit 3 which is to be controlled, a controller 4 for controlling devices of the electric-power-generating-facility main unit 3; multiple sensors 5 for detecting the processing parameters of the devices of the electric-power-generating-facility main unit 3; and a data logger 6 for storing the processing parameters measured with the sensors 5 as time series data.

The electric-power-generating-facilities operations management support system 1A receives the operation-history information from the electric power generating facilities 2 which are to be operated and managed, so as to analyze the lifespan consumption (which will be referred to as "lifespan-consumption costs" hereafter) of the electric power generating facilities 2, the market price of the electric power (which will be referred to as "reserve electric power" hereafter) which is stand-by electric power maintained by reserving a part of the output capability, and the probability of actually supplying the reserve electric power (which will be referred to as "reserve-electric-power supplying probability" hereafter), based upon the received operation-history information and so forth.

Then, the electric-power-generating-facilities operations management support system 1A estimates the risk of operation of the electric power generating facilities 2 (which will be simply referred to as "operational risk" hereafter) based upon the analysis results thus obtained, so as to obtain the estimated optimal operational conditions for operating the electric power generating facilities 2 with as low a risk and as high an efficiency as possible, while giving consideration to the electric power market, and displays the estimated optimal operational conditions on an operator terminal 9 for the user, which is display means electrically connected through a communication network line 8 such as the Internet or a dedicated line for transmitting electronic information.

The user supplies the reserve electric power according to the procedure as follows. That is to say, first, the user (operator of the electric power generating facilities) operates an operator console 10 serving as means for putting the electric power up for bidding, whereby bidding is performed on the electric power market (which will be simply referred to as "market" hereafter). In the event that the transaction has been made on the market, the operator console 10 receives the demand for reserve electric power corresponding to the determined amount of reserve electric power. Note that in this case, the operator console 10 serves as means for receiving the demand for the reserve electric power.

Next, the user performs an input operation at the operator console 10 so as to specify the determined amount of electric power generation (command values) corresponding to the received demand for the reserve electric power to the electric power generating facilities 2. Note that in this case, the operator console 10 serving as means for receiving command values for adjusting the amount of electric power generation from the operator for determining the amount of electric power generation. The user can determine the command values based upon the amount of electric power generation and the corresponding operational conditions displayed on the operator console 9 transmitted from the electric-power-generating-facilities operations management support system 1A.

Upon receiving the command values, the operator console 10, serving as the means for receiving command values for adjusting the amount of electric power generation, sends the command values to the electric power generating facilities 2, whereby a controller (not shown in FIG. 12) connected to the electric power generating facilities 2 controls the amount of electric power generation according to the received command values thereof. Note that in this case, the operator console 10 serves as the means for outputting the command values for adjusting the amount of electric power generation.

Note that the operational risk used here means the lifespan-consumption costs due to the excessive load (thermal stress and so forth) applied to the electric power generating facilities 2 during operation thereof under over-rated-load operational conditions.

As shown in FIG. 12, the electric-power-generating-facilities operations management support system 1A has a mechanism wherein a computer 11 reads out a program (which will be referred to as "first operation management PG" hereafter) 12 so as to execute the program on the computer 11 for executing the operations management support method (operations management notification processing) according to the fourth embodiment of the present invention. That is to say, the combination of the computer 11 (hardware) and the first operation management PG 12 (software) enables functions for performing calculation and displaying for the operational conditions.

Figure 13:
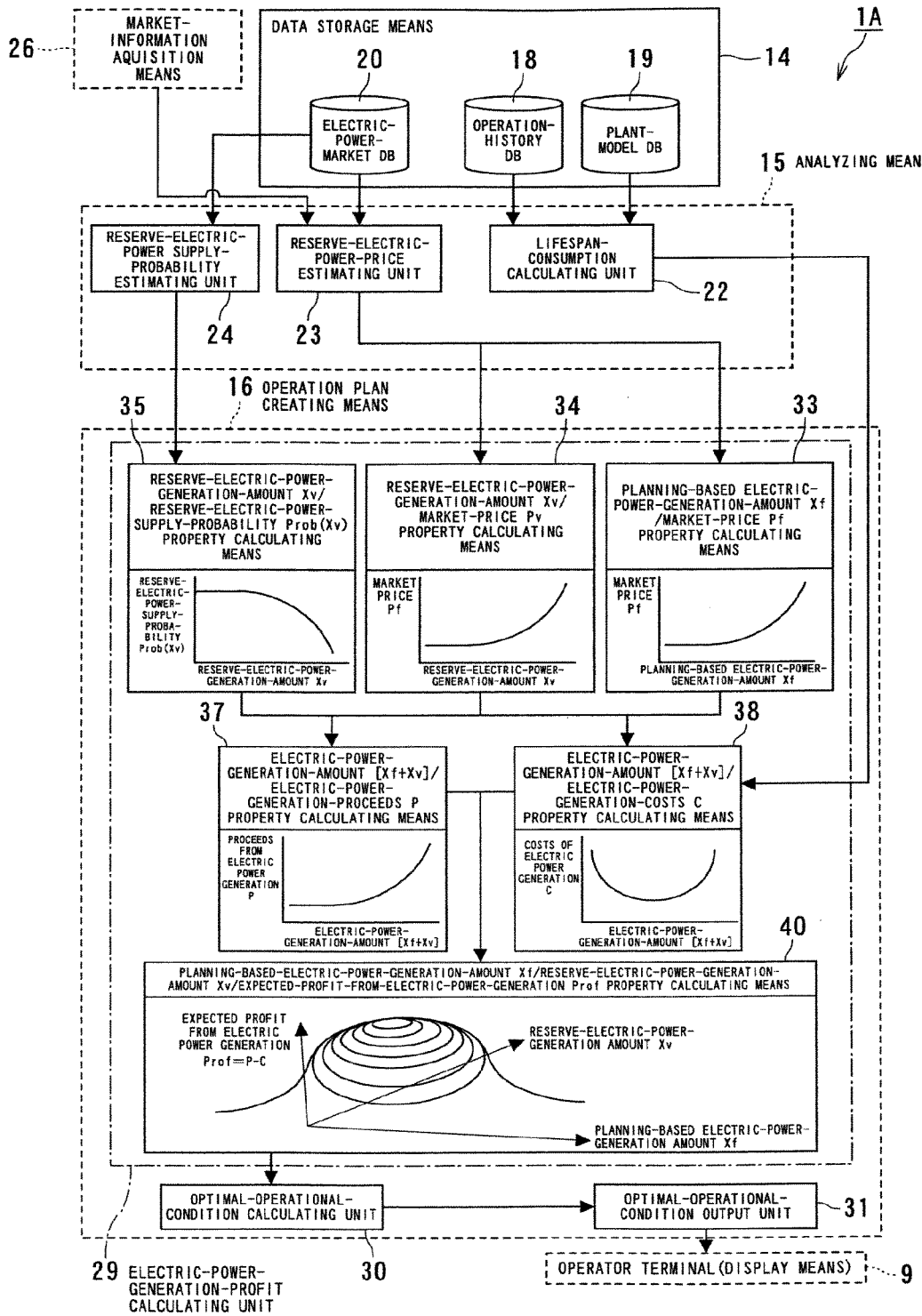
FIG. 13 is a schematic functional block diagram which shows a functional configuration of the electric-power-generating-facilities operations management support system according to the fourth embodiment of the present invention.

FIG. 13 is a schematic functional block diagram which shows a functional configuration of the electric-power-generating-facilities operations management support system 1A according to the fourth embodiment of the present invention.

The electric-power-generating-facilities operations management support system 1A performs processing for calculating and displaying the operational conditions for operating the electric power generating facilities with as low a risk and as high an efficiency as possible, while giving consideration to the electric power market trends, based upon the life-span consumption costs, the market price of the reserve electric power, and probability of supplying the reserve electric power. The aforementioned processing for calculating and displaying the operational conditions, thus performed by the electric-power-generating-facilities operations management support system 1A, allows the operator to operate the electric power generating facilities with as low a risk and high an efficiency as possible.

Furthermore, the electric-power-generating-facilities operations management support system 1A includes data storage means 14 for storing the electronic data such as operation-history information and so forth received from the electric power generating facilities 2 shown in FIG. 12, analyzing means 15 for calculating the basic information for generating the operation planning (which will be referred to as "operation plan creating basic information" hereafter), and operation plan creating means 16 for calculating and outputting the operational conditions of the electric power generating facilities 2 as operation planning, based upon the operation plan creating basic information calculated by the analyzing means 15.

The data storage means 14 of the electric-power-generating-facilities operations management support system 1A stores the electronic data which can be read by the analyzing means 15. The electronic data stored in the data storage means 14 of the electric-power-generating-facilities operations management support system 1A includes: an operation-history database (note that "database" will be abbreviated as "DB" hereafter) 18 for storing various kinds of measurement-result information and operation information with regard to the electric power generating facilities 2 shown in FIG. 12, serving as the operation history thereof, received from the controller 4, the sensors 5, and the data logger 6; a plant-model DB 19 for storing information with regard to lifespan calculating calculation expressions such as physical calculation expressions and so forth for calculating the lifespan of the electric power generating facilities, an electric-power-market DB 20 for storing past electric-power-market information and past output of electric power.

The analyzing means 15 includes a lifespan-consumption-cost calculating unit 22 for calculating the life-span consumption costs of the electric power generating facilities, a reserve-electric-power-price estimating unit 23 for estimating the market price of the reserve electric power, and a reserve-electric-power supply-probability estimating unit 24 for estimating the probability of actually supplying the reserve electric power (which will be referred to as "reserve-electric-power supply probability" hereafter). The analyzing means 15 including the lifespan-consumption-cost calculating unit 22, the reserve-electric-power-price estimating unit 23, and the reserve-electric-power supply-probability estimating unit 24, calculate the lifespan-consumption costs of the electric power generating facilities, the market price of the reserve electric power (estimated value), and the probability of actually supplying the reserve electric power, serving as basic information for generating operation planning.

The lifespan-consumption-cost calculating unit 22 of the analyzing means 15 reads out information from the operation-history DB 18 and the plant-model DB 19 so as to calculate the lifespan-consumption costs of the electric power generating facilities based upon the obtained information. Note that the information which the lifespan-consumption-cost calculating unit 22 reads out from the operation-history DB 18 includes: total over-rated output; the number of times of starting and stopping; and operation-history information with regard to rapidly-changed output ratio. On the other hand, the plant-model DB 19 stores physical expressions and so forth for estimating the lifespan of the electric power generating facilities.

The lifespan-consumption-cost calculating unit 22 receives the various kinds of measurement-result information measured with the sensors 5 and operation information with regard to the electric power generating facilities, which are stored in the operation-history DB 18, and receives physical expressions stored in the plant-model DB 19, so as to calculate the thermal stress applied to the components forming the electric power generating facilities. Furthermore, estimated remaining lifespan of each component under given operational conditions can be calculated based upon the aforementioned calculated results. In this case, the lifespan-consumption-cost calculating unit 22 can obtain the estimated remaining lifespans before and after operation, thereby calculating estimated lifespan consumption as represented by Expression (12).

[Mathematical Expression 7]

$$\text{Estimated lifespan consumption} = \text{estimated remaining lifespan before operation} - \text{estimated remaining lifespan after operation} \quad (12)$$

On the other hand, consumption of costs required for a component during the entire lifespan thereof (which will be referred to as "lifespan costs" hereafter) due to reduction of the lifespan thereof is dependent upon the lifespan costs of the component and the ratio of consumption of the lifespan as to the entire lifespan (which will be referred to as "lifespan consumption ratio" hereafter). That is to say, the lifespan consumption costs is represented by Expression (13) as follows.

[Mathematical Expression 8]

$$\text{Lifespan-consumption costs} = \text{lifespan consumption ratio} \times \text{lifespan costs} \quad (13)$$

Note that the lifespan consumption ratio is represented by Expression (14) using the component lifespan and consumption of the lifespan.

[Mathematical Expression 9]

$$\text{Lifespan consumption ratio} = (\text{consumption of the lifespan})/(\text{component lifespan}) \quad (14)$$

Accordingly, the lifespan consumption costs is represented by Expression (15) using the above Expression (13) and Expression (14).

[Mathematical Expression 10]

$$\text{Lifespan consumption costs} = (\text{consumption of the lifespan})/(\text{component lifespan}) \times (\text{costs of the component} + \text{maintenance costs required for replacement of the component}) \quad (15)$$

The reserve-electric-power-price estimating unit 23 receives basic information for estimating the price of reserve electric power (which will be referred to as "reserve-electric-power estimating information" hereafter), and performs computation processing based upon the received reserve-electric-power estimating information, whereby the price of reserve electric power is estimated. The reserve-electric-power estimating information received by the reserve-electric-power-price estimating unit 23 includes: present electric-power market information; past electric-power market information; and operation-history information with regard to output of electric power, for example. Note that "market information" is a general term for the information required for transactions involving electric power, which includes at least information with regard to the date and market price.

As shown in FIG. 13, the electric-power-generating-facilities operations management support system 1A according to the present embodiment further includes market-information acquisition means 26 for obtaining present electric-power market information generally at real time, which is a part of the reserve-electric-power estimating information. Then, the reserve-electric-power-price estimating unit 23 receives the present electric-power market information from the market-information acquisition means 26.

Furthermore, the reserve-electric-power-price estimating unit 23 reads out the past electric-power market information and the operation-history information with regard to output of electric power from the market DB 20. Upon the reserve-electric-power-price estimating unit 23 obtaining the reserve electric power estimating information, the reserve-electric-power-price estimating unit 23 performs statistical processing based upon the obtained reserve-electric-power-price estimating information so as to estimate the present or future market price of reserve electric power (e.g., price per kWh [$/kWh]).

The reserve-electric-power supply-probability estimating unit 24 estimates the probability of actually supplying reserve electric power, based upon the past electric-power market information. The reserve-electric-power supply-probability estimating unit 24 reads out the past electric-power market information from the electric-power market DB 20. The reserve-electric-power supply-probability estimating unit 24 totals up the electric power amount put up for bidding as reserve electric power (which will be referred to as "amount of electric power bid on" hereafter), and the amount of electric power generation actually supplied in response to bids placed, based upon the received past electric-power-market information, so as to calculate the ratio of the amount of electric power generation actually supplied as to the amount of electric power bid on, whereby the reserve-electric-power supply probability is obtained.

That is to say, the reserve-electric-power supply probability is represented by Expression (16) as follows.

[Mathematical Expression 11]

$$\text{Reserve-electric-power supply probability} = (\text{electric power amount actually supplied})/(\text{amount of reserve electric power bid on the market}) \quad (16)$$

The operation plan creating means 16 includes: an electric-power-generation profit calculating unit 29 for calculating the profit from electric power generation based upon the information with regard to the lifespan-consumption costs, the market price of reserve electric power, and the reserve-electric-power supply probability, analyzed by the analyzing means; an optimal-operational-condition calculating unit 30 for calculating the optimal amount of planned base electric power generation and the optimal amount of reserve electric power generation corresponding to the maximum profit from the electric power generation calculated by the electric-power-generation profit calculating unit 29; and an optimal-operational-condition output unit 31 for outputting the operational conditions calculated by the optimal-operational-condition calculating unit 30, i.e., the amount of the planned base electric power generation and the amount of the reserve electric power generation.

The electric-power-generation profit calculating unit 29 of the operation plan creating means 16 includes: planning-based-electric-power-generation-amount Xf/market price Pf property calculating means 33 for calculating the relation between the amount of planning-based electric power generation Xf and the market transaction price of reserve electric power (estimated value) Pf; reserve-electric-power generation amount Xv/market price Pv property calculating means 34 for calculating the relation between the amount of reserve electric power generation Xv and the market transaction price of reserve electric power (estimated value) Pv; and reserve-electric-power generation amount Xv/reserve-electric-power supply probability Prob (Xv) property calculating means 35 for calculating the relation between the amount of reserve electric power generation Xv and the probability of supplying the reserve electric power Prob (Xv).

Furthermore, the electric-power-generation profit calculating unit 29 further includes: electric-power generation amount [Xf+Xv]/electric-power-generation-revenues P property calculating means 37 for calculating the relation between the revenues from electric power generation P and the amount of electric power generation (=planning-based electric-power generation amount Xf+reserve electric power generation amount Xv) based upon the properties calculated by the planning-based-electric-power-generation-amount Xf/market price Pf property calculating means 33, the reserve-electric-power generation amount Xv/market price Pv property calculating means 34, and the reserve-electric-power generation amount Xv/reserve-electric-power supply probability Prob (Xv) property calculating means 35; electric-power generation amount [Xf+Xv]/electric-power-generation-costs C property calculating means 38 for calculating the relation between the costs from electric power generation C and the amount of electric power generation [Xf+Xv]; and planning-based-electric-power generation amount Xf/reserve-electric-power generation amount Xv/expected-profit-from-electric-power-generation Prof property calculating means 40 for calculating the relation between the expected profit from electric power generation Prof, the amount of planning-based electric power generation Xf, and the amount of reserve electric power generation Xv, based upon the electric power generation [Xf+Xv]/revenues from electric power generation P property and the electric power generation amount [Xf+Xv]/costs of electric power generation C property.

Note that the expected-profit-from-electric-power-generation Prof is an excepted value of profit from electric power generation, and is the value wherein the costs of electric power generation C is subtracted from the profit from electric power generation P. That is to say, Prof is represented by the following Expression.

$$\text{Expected-profit-from-electric-power-generation Prof} = (\text{profit from electric power generation } P) - (\text{costs of electric power generation } C)$$

The operation plan creating means 16 instruct the electric-power-generation profit calculating unit 29 to calculate the planning-based electric power generation amount Xf/reserve electric power generation amount Xv/expected-profit-from-reserve-electric-power Prof property so that the optimal-operational-condition calculating unit 30 calculates the estimated optimal amount of electric power generation (the unit thereof is "kW/h", for example) of the electric power generating facilities 2 from the perspective of profit, i.e., the amount of planning-based electric power generation and the amount of reserve electric power generation, as operational conditions, based upon information with regard to the lifespan consumption costs, the market price of reserve electric power, and the probability of actually supplying reserve electric power. Then, the optimal-operational-condition output unit 31 receives the operational conditions, i.e., the amount of planning-based electric power generation and the amount of reserve electric power generation, calculated by the optimal-operational-condition calculating unit 30, so as to output these operational conditions to the operator terminal 9.

With the operation plan creating means 16, the amount of planning-based electric power generation and the amount of reserve electric power generation of the electric power generating facilities as operational conditions output therefrom are calculated through several calculation steps performed by the electric-power-generation profit calculating unit 29 and the optimal-operational-condition calculating unit 30, based upon the received information with regard to the lifespan consumption costs, the market price of reserve electric power, and the probability of actually supplying the reserve electric power. Then, the calculated results are displayed on the operator terminal 9 shown in FIG. 12. Note that detailed description of the calculation will be made later in description for the operation-planning notification processing.

Note that while description has been made regarding an arrangement wherein the electric-power-generating-facilities operations management support system 1A having such a configuration displays the calculated operational conditions on the display means, the present invention is not restricted to such an arrangement wherein the operational conditions are displayed on a monitor such as the operator terminal 9 or the like, rather, an arrangement may be made wherein the operational conditions are output through printing means such as a printer or the like of the user. That is to say, the display means used here are means for notifying the user of the operational conditions.

Note that the communication network line 8 is not indispensable to the present invention. In this case, an arrangement may be made, which has the same configuration as described above, except for absence of the communication network line 8. Arrangement examples without the communication network line 8 include an arrangement wherein the computer 11 performs the same operations of the operator terminal 9 in addition to the operation thereof, the computer 11 stores the operation-history information with regard to the electric power generating facilities 2 on a readable data storage medium instead of the operation-history DB 18, and the computer 11 reads out the operation-history information through the aforementioned data storage medium.

With the aforementioned arrangement without the communication network line 8, the computer 11 serves as display means so as to display the operational conditions on the monitor thereof. In this case, the computer 11 reads out the first operations management PG 12 so as to perform operational-condition generating processing, thereby providing an operations management support system for supporting the electric power generating facilities 2 without the communication network line 8.

Furthermore, while description has been made regarding an arrangement wherein the operator console 10 serves as market-bidding means for putting electric power up for bidding on the market, and reserve-electric-power demand receiving means for allowing bidding for reserve electric power and receipt of orders thereof, an arrangement may be made wherein the operator performs puts reserve electric power up for bidding and receives orders thereof through the electric-power-generating-facilities operations management support system 1A. In this case, the electric-power-generating-facilities operations management support system 1A needs to further include the market-bidding means and the reserve-electric-power demand receiving means.

On the other hand, as shown in FIG. 13, while description has been made regarding an arrangement wherein the lifespan-consumption-cost calculating unit 22 receives information from the operation-history DB 18 and the plant-model DB 19, an arrangement may be made wherein the lifespan-consumption-cost calculating unit 22 receives the information from an unshown external input means. For example, an arrangement may be made wherein the user directly inputs the operation-history information and so forth to the lifespan-consumption-cost calculating unit 22 through input means (not shown). Furthermore, an arrangement may be made wherein the reserve-electric-power-price estimating unit 23 and the reserve-electric-power supply-probability estimating unit 24 receive information from external input means as with the lifespan-consumption-cost calculating unit 22.

Furthermore, in addition to a function for obtaining the present electric-power market information described above, the market-information acquisition means 26 may have a function for periodically storing the obtained information so as to periodically update the electric-power-market DB 20. Furthermore, while description has been made in the present embodiment regarding an arrangement wherein the electricpower-generating-facilities operations management support system 1A includes the market-information acquisition means 26, the present invention is not restricted to such an arrangement, rather, an arrangement may be made wherein the user directly inputs the present electric-power market information instead of the market-information acquisition means 26. This configuration allows the reserve-electric-power-price estimating unit 23 to obtain the present electric-power market information, even without the market-information acquisition means 26.

With the electric-power-generating-facilities operations management support system 1A having such a configuration, the operation plan creating means 16 output the estimated optimal operational conditions of the electric power generating facilities 2 from the perspective of profit based upon the information with regard to the lifespan consumption costs, the market price of reserve electric power, and the probability of actually supplying reserve electric power, thereby enabling operation of the electric power generating facilities 2 while giving consideration to the lifespan consumption costs which are an operational risk.

That is to say, with the present embodiment, the electric power generating facilities 2 provide reserve electric power on the market with a high market price based upon the information with regard to estimated optimal distribution of electric power generation based upon the tradeoff relation between the market price of reserve electric power and the lifespan consumption costs which are an operational risk, thereby enabling operation of the electric power generating facilities 2 generally under the optimal operational conditions as compared with conventional arrangements from the economic and overall perspective.

Furthermore, the electric-power-generating-facilities operations management support system 1A according to the present embodiment estimates the probability of actually supplying reserve electric power (reserve-electric-power supply probability) with high precision, and reserve electric power is generated based upon the estimated reserve-electric-power supply probability, thereby enabling operation of the electric power generating facilities 2 with high efficiency generally the same as with the rated operation thereof without excessive restriction of the planning-based electric power generation while maintaining sufficient reserve electric power capability. Furthermore, the electric-power-generating-facilities operations management support system 1A according to the present embodiment calculates the estimated optimal amount of planning-based electric power generation and reserve electric power generation so as to output the calculated information as operational conditions, thereby assisting the user (operator of the electric power generating facilities) in making a determination.

Furthermore, the electric-power-generating-facilities operations management support system 1A according to the present embodiment is electrically connected to the electric power generating facilities 2 at a remote location through the communication network line 8 so as to allow the user (operator) to perform remote control of the electric power generating facilities 2. That is to say, the electric-power-generating-facilities operations management support system 1A centrally controls the individual electric power generating facilities 2 even in a case wherein the electric power generating facilities 2 are at remote locations from the electric-power-generating-facilities operations management support system 1A.

Thus, the present invention provides an operation-and-maintenance service (which will be referred to as "O&M service" hereafter) wherein the electric-power-generating-facilities operations management support system 1A performs monitoring of the electric power generating facilities 2 and calculation of operational conditions thereof at the same time, and the calculated operational conditions are provided to the operator of each of the electric power generating facilities 2 for supporting operation and management of each.

Next, description will be made regarding operation plan creating processing in order, which is a part of the electric power generating facility operations management support method performed by the electric-power-generating-facilities operations management support system 1A.

Figure 14:
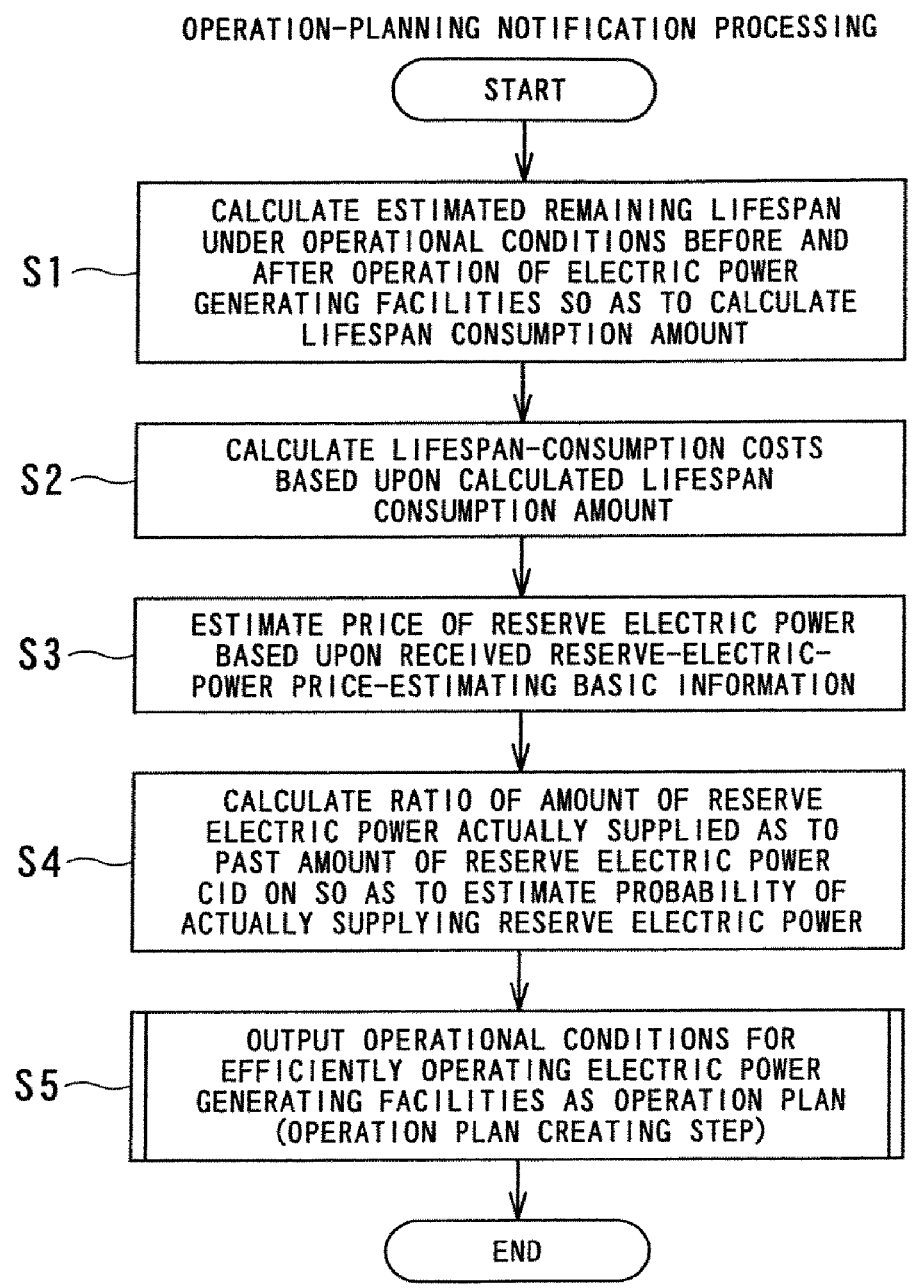
FIG. 14 is an explanatory diagram (processing flowchart) for describing an electric-power-generating-facilities operations management support method (operation-planning notification processing) performed by the electric-power-generating-facilities operations management support system according to the fourth embodiment of the present invention.

FIG. 14 is an explanatory diagram (processing flowchart) for describing operation plan creating processing in order, which is a part of the electric power generating facility operations management support method performed by the electric-power-generating-facilities operations management support system 1A.

As shown in FIG. 14, the operation plan creating processing comprises analyzing steps (Step S1 through Step S4) for calculating operation plan creating basic information based upon the received information, and an operation plan creating step (Step S5) for outputting the operational conditions of the electric power generating facilities based upon the operation plan creating basic information calculated in these analyzing steps.

The analyzing steps (Steps S1 through S4) of the operation plan creating processing include: lifespan-consumption-costs calculating steps (Steps S1 and S2) for calculating the lifespan consumption costs of the electric power generating facilities; a reserve-electric-power-price estimating step (Step S3) for estimating the market price of reserve electric power; and a reserve-electric-power supply-probability estimating step (Step S4) for estimating the probability of actually supplying reserve electric power.

Figure 15:
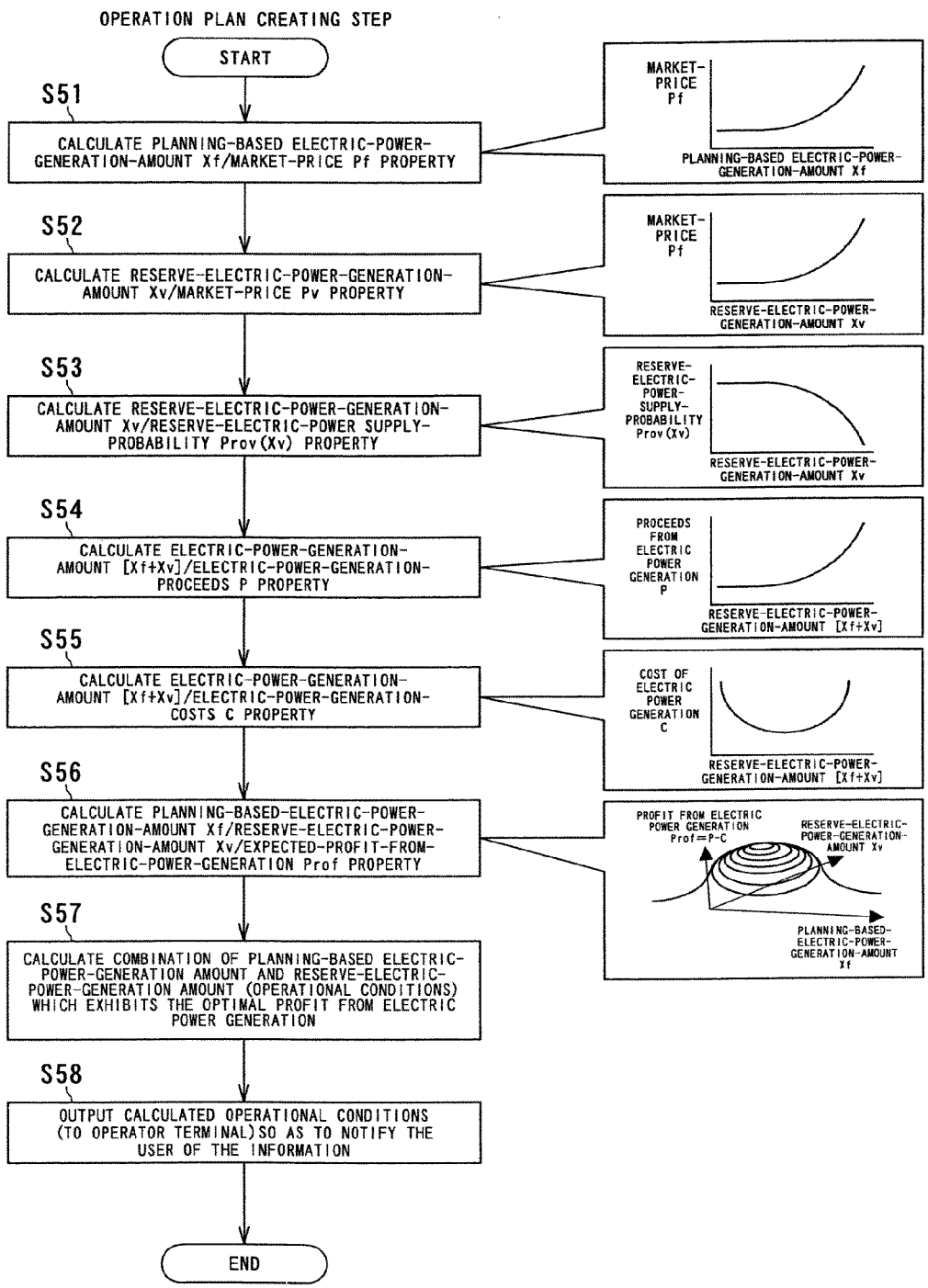
FIG. 15 is an explanatory diagram (processing flowchart) for making detailed description regarding operation plan creating step of operation-planning notification processing performed by the electric-power-generating-facilities operations management support system according to the fourth embodiment of the present invention.

On the other hand, FIG. 15 shows an explanatory diagram (processing flowchart) for describing processing steps included in the operation plan creating step (Step S5) in detail.

As shown in FIG. 15, the operation plan creating step 5 includes: profit-from-electric-power-generation calculating steps (Steps S51 through S56) for calculating the profit from electric power generation; an optimal-operational-condition calculating step (Step S57) for calculating the optimal amount of planning-based electric power generation and the optimal amount of reserve electric power generation which exhibit the maximum profit from electric power generation calculated in the aforementioned profit-from-electric-power-generation calculating steps; and an optimal-operational-condition notifying step (Step S58) for outputting the optimal operational conditions, i.e., the optimal amount of planning-based electric power generation and the optimal amount of reserve electric power generation, calculated in the aforementioned optimal-operational-condition calculating step.

The profit-from-electric-power-generation calculating steps (Steps S51 through S56) of the operation plan creating step 5 include: a planning-based electric-power generation amount Xf/market-price Pf property calculating step (Step S51) for calculating the relation between the planning-based electric power generation amount Xf and the market transaction price of reserve electric power Pf (estimated value) based upon the results obtained in the analyzing step; a reserve-electric-power generation-amount Xv/market-price Pv property calculating step (Step S52) for calculating the relation between the reserve electric power generation amount Xv and the market transaction price of reserve electric power Pv (estimated value); and a reserve-electric-power generation-amount Xv/reserve-electric-power supply-probability Prob (Xv) property calculating step (Step S53) for calculating the relation between the reserve electric power generation amount Xv and the reserve electric power supply probability Prob (Xv).

Furthermore, the profit-from-electric-power-generation calculating steps (Steps S51 through S56) further include a processing step for calculating expected profit from electric power generation Prof (=(revenues from electric power generation P)–(costs of electric power generation C)) based upon the properties calculated in the planning-based electric-power-generation-amount Xf/market-price Pv property calculating step, the reserve-electric-power generation-amount Xv/market-price Pv property calculating step, and the reserve-electric-power generation-amount Xv/reserve-electric-power supply probability Prob (Xv) property calculating step, i.e., Steps S51 through S53.

Specifically, the profit-from-electric-power-generation calculating steps (Steps S51 through S56) further include: an electric-power-generation-amount [Xf+Xv]/electric-power-generation-revenues P property calculating step (Step S54) for calculating the relation between the revenues from electric power generation P and the amount of electric power generation (=(planning-based electric power generation amount Xf)+(reserve electric power generation amount Xv)); an electric-power-generation-amount [Xf+Xv]/electric-power-generation-costs C property calculating step (Step S55) for calculating the relation between costs of electric power generation C and the amount of electric power generation [Xf+Xv]; and a planning-based-electric-power-generation amount Xf/reserve-electric-power-generation-amount Xv/profit-from-electric-power-generation Prof property calculating step (Step S56) for calculating the relation between the expected profit from electric power generation Prof, the planning-based electric power generation amount Xf, and the reserve-electric-power generation amount Xv, based upon the calculated electric-power-generation amount [Xf+Xv]/electric-power-generation-revenues P property, and electric-power-generation-amount [Xf+Xv]/electric-power-generation costs C property.

As shown in FIGS. 14 and 15, with the operation plan creating processing, first, the analyzing step is performed. In the analyzing step, first, lifespan consumption cost calculating processing (Steps S1 and S2) is performed. Specifically, in the lifespan consumption cost calculating processing (Steps S1 and S2), first, the lifespan-consumption-cost calculating unit 22 performs lifespan consumption calculating step in Step S1.

In the lifespan consumption calculating step (Step S1), the lifespan-consumption-cost calculating unit 22 receives the measurement-result information obtained with various kinds of the sensors and operation information with regard to the electric power generation facilities from the operation-history DB 18, and the physical expressions stored in the plant-mode DB 19. Then, the lifespan-consumption-cost calculating unit 22 calculates the thermal stress applied to each component forming the electric power generating facilities, calculates the estimated remaining lifespan before and after operation under given operational conditions, and calculates the lifespan consumption using Expression (12) described above.

Upon completion of calculation of the lifespan consumption by the lifespan-consumption-cost calculating unit 22, the lifespan consumption calculating step is completed, following which the lifespan consumption cost calculating step is performed in Step S2. In the lifespan consumption cost calculating step (Step S2), the lifespan-consumption-cost calculating unit 22 calculates lifespan consumption costs based upon the lifespan consumption calculated in the lifespan consumption calculating step. The lifespan consumption costs are calculated using Expression (15) described above.

Upon completion of calculation of the lifespan consumption costs by the lifespan-consumption-cost calculating unit 22, the lifespan consumption cost calculating step is completed. Upon completion of the lifespan consumption cost calculating step, all the steps of the lifespan consumption cost calculating processing (Steps S1 and S2) are completed. Upon completion of the lifespan consumption cost calculating processing, the flow proceeds to Step S3, and reserve-electric-power price estimating processing is performed in Step S3.

In the reserve-electric-power price estimation processing (Step S3), first, the reserve-electric-power-price estimating unit 23 receives the present and past electric power market information and operation-history information with regard to output of electric power, serving as information for estimating the price of reserve electric power. Then, the reserve-electric-power-price estimating unit 23 performs computation processing (statistical processing) based upon the received reserve-electric-power price estimating information so as to estimate the price of reserve electric power. Upon the reserve-electric-power-price estimating unit 23 estimating the price of reserve electric power, the reserve-electric-power price estimation processing is completed. Upon completion of the reserve-electric-power price estimation processing, the flow proceeds to Step S4, reserve-electric-power supply-probability estimation processing is performed in Step S4.

In the reserve-electric-power supply-probability estimation processing (Step S4), the reserve-electric-power supply-probability estimating unit 24 receives the past electric-power market information from the electric-power market DB 20, and totals up the amount of reserve electric power bid on and the amount of reserve electric power generation actually supplied according to the bid. Then, the reserve-electric-power supply-probability estimating unit 24 calculates the ratio of the amount of reserve electric power generation actually supplied as to the amount of reserve electric power bid on, whereby the probability of actually supplying reserve electric power is estimated. Note that the reserve-electric-power supply probability is obtained using Expression (16) described above.

Upon the reserve-electric-power supply-probability estimating unit 24 estimating the probability of actually supplying reserve electric power, the reserve-electric-power supply-probability estimation processing is completed. Upon completion of the reserve-electric-power supply-probability estimation processing, all the steps of the analyzing processing (Steps 51 through S4) are completed, and the flow proceeds to Step S5. In Step S5, the operation plan creating processing is performed.

In the operation plan creating processing (Step S5), first, the flow proceeds to Step S51, wherein the operation plan creating means 16 perform planning-based electric-power-generation-amount Xf/market-price Pf property calculating step is performed, as shown in FIG. 15.

In the planning-based electric-power-generation-amount Xf/market-price Pf property calculating step, the electric-power-generation profit calculating unit 29 of the operation plan creating means 16 receives the market price of reserve electric power (estimated value) from the reserve-electric-power-price estimating unit 23 of the analyzing means 15. Then, the planning-based-electric-power-generation-amount Xf/market price Pf property calculating means 33 of the electric-power-generation profit calculating unit 29 calculate the relation between the planning-based electric-power-generation-amount Xf and the market price of reserve electric power Pf (planning-based-electric-power-generation-amount Xf/market-price Pf property) based upon the received market price of reserve electric power (estimated value).

With the operation plan creating means 16, upon completion of calculation of the planning-based-electric-power-generation-amount Xf/market-price Pf property by the planning-based-electric-power-generation-amount Xf/market price Pf property calculating means 33 of the electric-power-generation profit calculating unit 29, the planning-based electric-power-generation-amount Xf/market-price Pf property calculating step is completed, following which the flow proceeds to Step S52 wherein the reserve-electric-power-generation-amount Xv/market-price Pf property calculating step is performed.

In the reserve-electric-power generation-amount Xv/market-price Pv property calculating step (Step S52), the electric-power-generation profit calculating unit 29 of the operation plan creating means 16 receives the market price of reserve electric power (estimated value) from the reserve-electric-power-price estimating unit 23 of the analyzing means 15. Then, the reserve-electric-power generation amount Xv/market-price Pv property calculating means 34 of the electric-power-generation profit calculating unit 29 calculates the relation between the reserve-electric-power generation amount Xv and the market price thereof. Pv (reserve-electric-power generation-amount Xv/market-price Pv property) based upon the received market price of reserve electric power (estimated value).

Upon completion of calculation of the reserve-electric-power generation-amount Xv/market-price Pv property by the reserve-electric-power generation amount Xv/market-price Pv property calculating means 34 of the electric-power-generation profit calculating unit 29, the reserve-electric-power generation-amount Xv/market-price Pv property calculating step is completed, following which the flow proceeds to Step S53 wherein the reserve-electric-power generation amount Xv/reserve-electric-power supply probability Prob (Xv) property calculating step is performed.

In the reserve-electric-power-generation-amount Xv/reserve-electric-power supply-probability Prob (Xv) property calculating step (Step S53), the electric-power-generation profit calculating unit 29 of the operation plan creating means 16 receives the reserve-electric-power supply probability from the reserve-electric-power supply-probability estimating unit 24 of the analyzing means 15. Then, the reserve-electric-power-generation-amount Xv/reserve-electric-power supply probability Prob (Xv) property calculating means 35 of the electric-power-generation profit calculating unit 29 calculate the relation between the reserve-electric-power generation amount Xv and the reserve-electric-power supply probability Prob (Xv) (reserve-electric-power-generation-amount Xv/reserve-electric-power supply-probability Prob (Xv) property) based upon the received reserve-electric-power supply probability.

Upon completion of calculation of the reserve-electric-power-generation-amount Xv/reserve-electric-power supply-probability Prob (Xv) property by the reserve-electric-power-generation-amount Xv/reserve-electric-power supply probability Prob (Xv) property calculating means 35 of the electric-power-generation profit calculating unit 29, the reserve-electric-power-generation-amount Xv/reserve-electric-power supply-probability Prob (Xv) property calculating step is completed, following which the flow proceeds to Step S54 wherein the electric-power-generation amount [Xf+Xv]/electric-power-generation-revenues property P calculating step is performed.

In the electric-power-generation-amount [Xf+Xv]/electric-power-generation-revenues P property calculating step (Step S54), the electric-power-generation profit calculating unit 29 of the operation plan creating means 16 calculates the relation between the revenues from electric power generation P and the amount of electric power generation [Xf+Xv] (i.e., electric-power-generation-amount [Xf+Xv]/electric-power-generation-revenues P property) based upon the properties calculated in the planning-based electric-power-generation-amount Xf/market-price Pf property calculating step and the reserve-electric-power generation-amount Xv/market-price Pv property calculating step.

In order to calculate the electric-power-generation-amount [Xf+Xv]/electric-power-generation-revenues P property, first, the revenues from electric power generation P are calculated. Note that the revenues from electric power generation P are calculated using the following Expression (17).

[Mathematical Expression 12]

$$P = Pf(Xf) \times Xf + Pv(Xv) \times Xv \qquad (17)$$

In this case, the revenues from electric power generation P are calculated using the planning-based electric-power generation amount Xf and the reserve-electric-power generation amount Xv, thereby obtaining the relation between: the profit from electric power generation P; and the sum of the planning-based electric-power generation amount Xf and the reserve-electric-power generation amount Xv, i.e., the electric-power-generation-amount [Xf+Xv]/electric-power-generation-revenues P property.

In this case, electric-power-generation-amount [Xf+Xv]/electric-power-generation-revenues P property calculating means 37 of the electric-power-generation profit calculating unit 29 calculate the electric-power-generation-amount [Xf+Xv]/electric-power-generation-revenues P property based upon the received properties calculated in the planning-based-electric-power-generation-amount Xf/market price Pf property calculating means 33 and the reserve-electric-power generation amount Xv/market-price Pv property calculating means 34, using Expression (17) described above. Upon completion of calculation of the electric-power-generation-amount [Xf+Xv]/electric-power-generation-revenues P property by the electric-power-generation-amount [Xf+Xv]/electric-power-generation-revenues P property calculating means 37, the electric-power-generation-amount [Xf+Xv]/electric-power -generation-revenues P property calculating step is completed, following which the flow proceeds to Step S55 wherein the electric-power-generation-amount [Xf+Xv]/electric-power-generation costs C property calculating step is performed.

In the electric-power-generation-amount [Xf+Xv]/electric-power-generation costs C property calculating step (Step S55), the electric-power-generation profit calculating unit 29 of the operation plan creating means 16 calculates the relation between the costs of electric power generation C and the electric-power generation amount [Xf+Xv], i.e., the electric-power-generation-amount [Xf+Xv]/electric-power-generation costs C property, based upon the properties calculated in the planning-based-electric-power-generation-amount Xf/market-price Pf property calculating step, the reserve-electric-power-generation-amount Xv/market-price Pv property calculating step, and the reserve-electric-power-generation-amount Xv/reserve-electric-power supply probability Prob (Xv) property calculating step.

In order to calculate the electric-power-generation-amount [Xf+Xv]/electric-power -generation costs C property, first, the costs of electric power generation C are obtained. Note that the costs of electric power generation C used in the present fourth embodiment are somewhat different from the costs of electric power generation C in the sixth embodiment described later. Accordingly, description will be made below regarding the costs of electric power generation C used in the present fourth embodiment.

Figure 16:
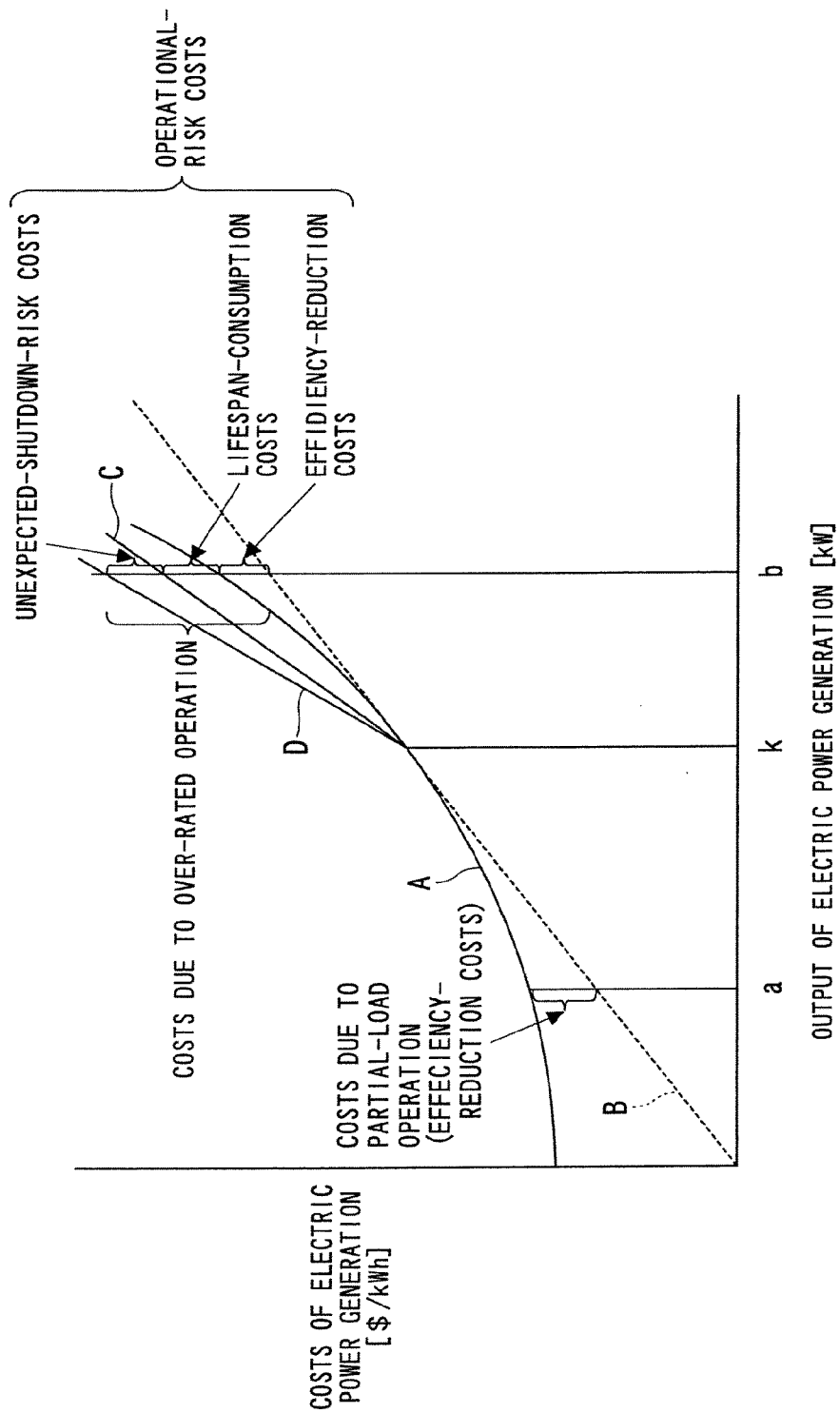
FIG. 16 is an explanatory diagram for describing the relation between the costs of electric power generation and the amount of electric power generation (electric-power-generation-amount/electric-power-generation-costs property)

FIG. 16 is an explanatory diagram for describing the relation between the costs of electric power generation and the amount of electric power generation (electric-power-generation-amount/electric-power-generation costs property).

As shown in FIG. 16, the ordinary (conventional) electric-power-generation-amount/electric-power-generation costs property is represented by a curve denoted by reference numeral A in the drawing, wherein the vertical axis represents the costs of electric power generation C [$/kWh], and the horizontal axis represents the amount of electric power generation [kW].

In general, the electric power generating facilities 2 are designed so as to operate with maximum efficiency during rated output operation. Accordingly, the electric power generating facilities 2 operate with lower efficiency during partial-load operation which is operation with lower output than the rated output k (e.g., operation with output denoted by "a" in FIG. 16). In the same way, the electric power generating facilities 2 operate with lower efficiency during over-rated-load operation which is operation with higher output than the rated output k (e.g., operation with output denoted by "b" in FIG. 16).

Accordingly, the costs of electric power represented by the electric-power-generation/electric-power-costs property (shown by curve A) include costs of reduction of efficiency (which will be referred to as "efficiency-reduction costs" hereafter), as well as costs of ideal operation (without reduction of efficiency) shown by the curve B in FIG. 16. Excessive costs of electric power generation during partial-load operation (which will be referred to as "partial-load costs" hereafter) are represented by the difference between the costs represented by the curve A and the costs represented by the curve B, whereby the efficiency-reduction costs are obtained. Note that the greater the displacement of output is from the rated output k, the greater the efficiency-reduction costs are. The reason is that in general, the greater the displacement of output is from the rated output k, the smaller the efficiency is.

In this case, over-rated-load operation of electric power generation (e.g., operation with the output b in the drawing) causes an excessive load to be applied to the electric power generation facilities 2, leading to increased operation risk, as well as reduction of efficiency. Accordingly, the costs of electric power generation during over-rated-load should be calculated so as to include costs of operational risk (which will be referred to as "operational-risk costs" hereafter), as well as the efficiency-reduction costs, whereby the precise costs of electric power generation during over-rated-load operation (which will be referred to as "over-rated costs" hereafter) are obtained.

Accordingly, the costs of electric power generation C used in the present fourth embodiment include the lifespan-consumption costs due to over-rated load operation as the operational-risk costs as represented by the curve C in the drawing, as well as costs represented by the conventional electric-power generation/electric-power costs property (curve A).

Note that the curve D shown in FIG. 16 represents the costs of electric power generation according to the sixth embodiment, and detailed description thereof will be made in the sixth embodiment. Note that in order to clearly distinguish between the costs of electric power generation represented by the conventional electric-power-generation/electric-power-costs property (curve A) and the costs of electric power generation C according to the present fourth embodiment, the former costs of electric power generation will be referred to as "electric-power-operation costs of electric power generation", and the latter costs will be referred to as "costs of electric power generation C" hereafter.

The costs of electric power generation according to the present invention include the operational-risk costs, and are represented by the following Expression (18).
[Mathematical Expression 13]

$$\text{Costs of electric power generation} = (\text{electric-power operation costs}) + (\text{operational-risk costs}) \quad (18)$$

Furthermore, the costs of electric power generation C according to the present embodiment include lifespan-consumption costs as the operational-risk costs as understood from the explanatory diagram shown in FIG. 16, and are represented by the following Expression (19), using Expression (18) described above.
[Mathematical Expression 14]

$$\text{Costs of electric power generation } C = (\text{electric-power operation costs}) + (\text{lifespan-consumption costs}) \quad (19)$$

On the other hand, the amount of electric power generation which is actually supplied as reserve electric power is represented by the following Expression (20), using the reserve-electric-power generation amount Xv and the reserve-electric-power supply probability Prob (Xv) thereof.
[Mathematical Expression 15]

$$\int Xv \times \text{Prob}(Xv) dXv \quad (20)$$

Now, the costs of electric power generation with the output of (Xf+∫Xv×Prob (Xv) dXv) is represented by the following Expression (21).
[Mathematical Expression 16]

$$\text{Operational costs of electric power generation} = \text{OpCost}(Xf + \int Xv \times \text{Prob}(Xv) dXv) \quad (21)$$

Furthermore, the lifespan-consumption costs are represented by the following Expression (22).
[Mathematical Expression 17]

$$\text{Lifespan-consumption costs} = \text{LifeCost}(Xf + \int Xv \times \text{Prob}(Xv) dXv) \quad (22)$$

In this case, the costs of electric power generation C according to the present embodiment is represented by the following Expression (23)
[Mathematical Expression 18]

$$\text{Costs of electric power generation } C = \text{OpCost}(Xf + \int Xv \times \text{Prob}(Xv) dXv) + \text{LifeCost}(Xf + \int Xv \times \text{Prob}(Xv) dXv) \quad (23)$$

Note that the electric-power generation amount [Xf+Xv]/electric-power-cost C property calculating means 38 of the electric-power-generation-profit calculating unit 29 calculate the electric-power-generation-amount [Xf+Xv]/electric-power-generation costs C property based upon the properties calculated by the planning-based-electric-power-generation-amount Xf/market price Pf property calculating means 33, the reserve-electric-power generation amount Xv/market-price Pv property calculating means 34, and the reserve-electric-power-generation-amount Xv/reserve-electric-power supply probability Prob (Xv) property calculating means 35, using the Expressions (20) through (23) described above.

Upon completion of calculation of the electric-power generation amount [Xf+Xv]/electric-power-cost C property by the electric-power generation amount [Xf+Xv]/electric-power-cost C property calculating means 38, the electric-power generation amount [Xf+Xv]/electric-power-cost C property calculating step is completed, following which the flow proceeds to Step S56 wherein the planning-based-electric-power-generation-amount Xf/reserve-electric-power-generation-amount Xv/expected-profit-from-electric-power-generation Prof property calculating step is performed.

In the planning-based-electric-power-generation-amount Xf/reserve-electric-power-generation-amount Xv/expected-profit-from-electric-power-generation Prof property calculating step (Step S56), the planning-based-electric-power generation amount Xf/reserve-electric-power generation amount Xv/expected-profit-from-electric-power-generation Prof property calculating means 40 of the electric-power-generation profit calculating unit 29 receive the electric-power-generation-amount [Xf+Xv]/electric-power-generation-revenues P property calculated in Step S54 from the electric-power-generation-amount [Xf+Xv]/electric-power-generation-revenues P property calculating means 37, and receive the electric-power-generation-amount [Xf+Xv]/electric-power-generation costs C property calculated in Step S55 from the electric-power generation amount [Xf+Xv]/electric-power-cost C property calculating means 38.

Then, the planning-based-electric-power generation amount Xf/reserve-electric-power generation amount Xv/expected-profit-from-electric-power-generation Prof property calculating means 40 calculate the expected profit from electric power generation, Prof, corresponding to the planning-based electric-power-generation amount Xf and the reserve-electric-power generation amount Xv based upon the received electric-power-generation-amount [Xf+Xv]/costs-from-electric-power-generation P property and electric-power-generation-amount [Xf+Xv]/electric-power-generation-costs C property so as to obtain the relation between the expected profit from electric power generation, i.e., Prof, the planning-based electric power generation amount, i.e., Xf, and the reserve electric power generation amount, i.e., Xv (planning-based-electric-power generation amount Xf/reserve-electric-power generation amount Xv/expected-profit-from-electric-power-generation Prof property).

The planning-based-electric-power generation amount Xf/reserve-electric-power generation amount Xv/expected-profit-from-electric-power-generation Prof property is represented by a three-dimensional function (electric-power-generation profit curve) with the planning-based electric-power-generation amount Xf and the reserve-electric-power generation amount Xv as parameters, wherein the horizontal axis represents the planning-based electric-power-generation amount Xf, the vertical axis represents the reserve-electric-power generation amount Xv, and the height axis represents the expected profit from electric power generation prof in FIG. 15, for example.

Upon completion of calculation of the planning-based-electric-power generation amount Xf/reserve-electric-power generation amount Xv/expected-profit-from-electric-power-generation Prof property by the electric-power-generation profit calculating unit 29 of the operation plan creating means 16, the planning-based-electric-power-generation amount Xf/reserve-electric-power-generation-amount Xv/expected-profit-from-electric-power-generation Prof property calculating step is completed. Upon completion of the planning-based-electric-power-generation amount Xf/reserve-electric-power-generation-amount Xv/expected-profit-from-electric-power-generation Prof property calculating step, all the processing steps of the electric-power-generation-profit calculating processing (Steps S51 through S56) are completed, following which the flow proceeds to Step S57. In Step S57, the optimal-operational-condition-calculating processing is performed.

In the optimal-operational-condition-calculating processing (Step S57), the optimal-operational-condition calculating unit 30 of the operation plan creating means 16 calculates the point (optimal point) which exhibits the maximum expected profit from electric power generation based upon the planning-based-electric-power-generation amount Xf/reserve-electric-power-generation-amount Xv/expected-profit-from-electric-power-generation Prof property obtained in the electric-power-generation-profit calculating processing, whereby the combination of the planning-based electric-power-generation amount Xf and the reserve-electric-power generation amount Xv which exhibits the optimal expected profit from electric power generation Prof is obtained. The combination of the planning-based electric-power-generation amount Xf and the reserve-electric-power generation amount Xv, thus obtained, is used as the estimated optimal operational conditions for achieving the maximum profit from electric power generation.

Upon completion of estimation of the optimal combination of the planning-based-electric-power-generation amount Xf and the reserve-electric-power generation amount Xv, which is estimated to be operational conditions for the optimal profit from electric power generation, the optimal-operational-condition calculation processing is completed, following which the flow proceeds to Step S58. Then, the optimal-operation-condition-notification processing is performed in Step S58.

In the optimal-operation-condition-notification processing (Step S58), the optimal-operational-condition output unit 31 of the operation plan creating means 16 outputs the operational conditions calculated in the optimal-operational-condition calculation processing, i.e., the planning-based electric-power-generation-amount Xv and the reserve-electric-power-generation amount Xv, to the operator terminal 9 as display means so as to notify the operator of (i.e., display) the operational conditions. Upon the optimal-operational-condition output unit 31 of the operation plan creating means 16 outputting the operational conditions to the operator terminal 9, the optimal-operation-condition-notification processing is completed (end). Upon completion of the optimal-operation-condition-notification processing, all the processing steps of the optimal-operation-condition-notification processing are completed (END).

Note that with the analyzing processing (Steps S1 through S4) of the operation plan creating processing, the lifespan-consumption-costs calculating processing (steps S1 and S2), the reserve-electric-power price estimation processing (step S3), and the reserve-electric-power supply-probability estimation processing (Step S4), may be performed in any order in the range of the analyzing processing (Steps S1 through S4). That is to say, the present invention is not restricted to an arrangement in the order shown in FIG. 14.

For example, an arrangement may be made wherein the reserve-electric-power supply-probability estimation processing is performed in Step S1, the reserve-electric-power-price estimation processing is performed in Step S2, and the lifespan-consumption-costs calculating processing is performed in Steps S3 and S4. Furthermore, an arrangement may be made wherein the lifespan-consumption-costs calculating processing, the reserve-electric-power-price estimation processing, and the reserve-electric-power supply-probability estimation processing, are performed at the same time (i.e., multitasking processing).

On the other hand, with the operation plan creating processing (Step S5), the planning-based-electric-power-generation-amount Xf/market-price Pf property calculating step, the reserve-electric-power-generation-amount Xv/market-price Pv property calculating step, and the reserve-electricpower-generation-amount Xv/reserve-electric-power supply-probability Prob (Xv) property calculating step (Steps S51 through S53) of the electric-power-generation-profit calculating processing (Steps S51 through S56) may be performed in any order as long as the Steps S51 through S53 are performed prior to the electric-power-generation-amount [Xf+Xv]/electric-power-generation-revenues P property calculating step (Steps S54) and the electric-power-generation-amount [Xf+Xv]/electric-power-generating-costs C property calculating step (Step S55). That is to say, the present invention is not restricted to an arrangement wherein the Steps S51 through S53 are performed in the order shown in FIG. 15.

For example, the reserve-electric-power-generation-amount Xv/market-price Pv property calculating step or the reserve-electric-power-generation-amount Xv/reserve-electric-power supply-probability Prob (Xv) property calculating step may be performed in Step S51. Furthermore, the aforementioned three processing steps, i.e., the planning-based-electric-power-generation-amount Xf/market-price Pf property calculating step, the reserve-electric-power-generation-amount Xv/market-price Pv property calculating step, and the reserve-electric-power-generation-amount Xv/reserve-electric-power supply-probability Prob (Xv) property calculating step are performed at the same time (i.e., multitasking processing).

On the other hand, the electric-power-generation-amount [Xf+Xv]/electric-power-generation-revenues P property calculating step (Steps S54) and the electric-power-generation-amount [Xf+Xv]/electric-power-generating-costs C property calculating step (Step S55) may be performed in any order as long as the Steps S54 and S55 are performed after completion of the planning-based-electric-power-generation-amount Xf/market-price Pf property calculating step, the reserve-electric-power-generation-amount Xv/market-price Pv property calculating step, and the reserve-electric-power-generation-amount Xv/reserve-electric-power supply-probability Prob (Xv) property calculating step (Steps S51 through S53), and prior to the planning-based-electric-power-generation-amount Xf/reserve-electric-power-generation-amount Xv/expected-profit-from-electric-power-generation Prof property calculating step (Step S56). That is to say, the present invention is not restricted to an arrangement wherein the Steps S54 and S55 are performed in the order shown in FIG. 15.

On the other hand, while description has been made regarding an arrangement wherein the operation plan creating means 16 notify the user (operator of the electric power facilities) of the estimated optimal planning-based-electric-power-generation-amount Xf and the reserve-electric-power-generation-amount Xv through the operator terminal 9 in the optimal-operation-condition-notification processing (Step S58), an arrangement may be made wherein the operation plan creating means 16 notify the user of the planning-based-electric-power-generation-amount Xf/reserve-electric-power-generation-amount Xv/expected-profit-from-electric-power-generation Prof property (electric-power-generation profit curve) in addition to the aforementioned properties in the optimal-operation-condition-notification processing (Step S58).

Furthermore, an arrangement may be made wherein the operator terminal 9 displays the planning-based-electric-power-generation-amount Xf/reserve-electric-power -generation-amount Xv/expected-profit-from-electric-power-generation Prof property (electric-power-generation profit curve) as the operational conditions in the optimal-operation-condition-notification processing (Step S58). In this case, the optimal-operational-condition-calculating processing (Step S57) may be omitted.

With the operations management support method (operation-planning notification processing) of the electric power generating facilities 2 having such a configuration, the system notifies the user (operator of the electric power facilities) of the estimated optimal operational conditions of the electric power generating facilities 2 from the perspective of profit based upon the information with regard to the lifespan consumption costs, the market price of reserve electric power, and the probability of actually supplying reserve electric power, thereby assisting the user in making a determination, and thereby enabling operation of the electric power facilities 2 while giving consideration to the lifespan consumption costs as operational risk.

Furthermore, with the present embodiment, the system estimates the precise reserve-electric-power supply probability, and operates the electric power generating facilities 2 based upon the estimated reserve-electric-power supply probability, thereby enabling operation of the electric power generating facilities 2 with high efficiency generally the same as with the rated operation without excessive restriction of planning-based electric power generation while maintaining sufficient reserve electric power production capability.

With the electric-power-generating-facilities operations management support system, the operations management support method thereof (operational-conditions notification processing), and the program for executing the operations management support method on a computer according to the fourth embodiment of the present invention, the costs of electric power generation are calculated based upon the lifespan consumption costs as the operational-risk costs due to over-rated operation as well as based upon the efficiency-reduction costs as costs of electric power generation due to reduction of efficiency during the over-rated-load operation. In the event that determination has been made that the market price of reserve electric power (revenues from electric power generation) are greater than the calculated costs of electric power generation, the electric power generating facilities 2 are actively operated beyond rated operation so as to generate reserve electric power. The system having such a configuration assists the operator in operating the electric power generating facilities 2 while meeting the market needs.

With the present embodiment, the system is designed to operate beyond rated operation for generating reserve electric power. Accordingly, the electric power generating facilities 2 are operated under high-efficiency operational conditions generally the same as with the rated operation even during operation without generating reserve electric power (planning-based electric power generation), thereby maintaining high-efficiency operation of the electric power generating facilities 2 in normal situations. Furthermore, the system calculates the estimated optimal planning-based electric power generation amount and reserve electric power generation amount, and notifies the user of the information as optimal operational conditions, thereby assisting the user (operator of the electric power generating facilities) in making a determination.

Furthermore, with the present embodiment, a single system having such a configuration may be connected to multiple electric power generating facilities at various remote locations from the system, through the network line 8 for transmission/reception of information. In this case, the system installed in a single place centrally forms the optimal operation planning for multiple electric power generating facilities 2 (notifies of each user of the operational conditions). Thus, such a system provides an O&M service which is an operations management support service for providing operational conditions of the electric power facilities 2 to each operator.

[Fifth Embodiment]

Figure 17:
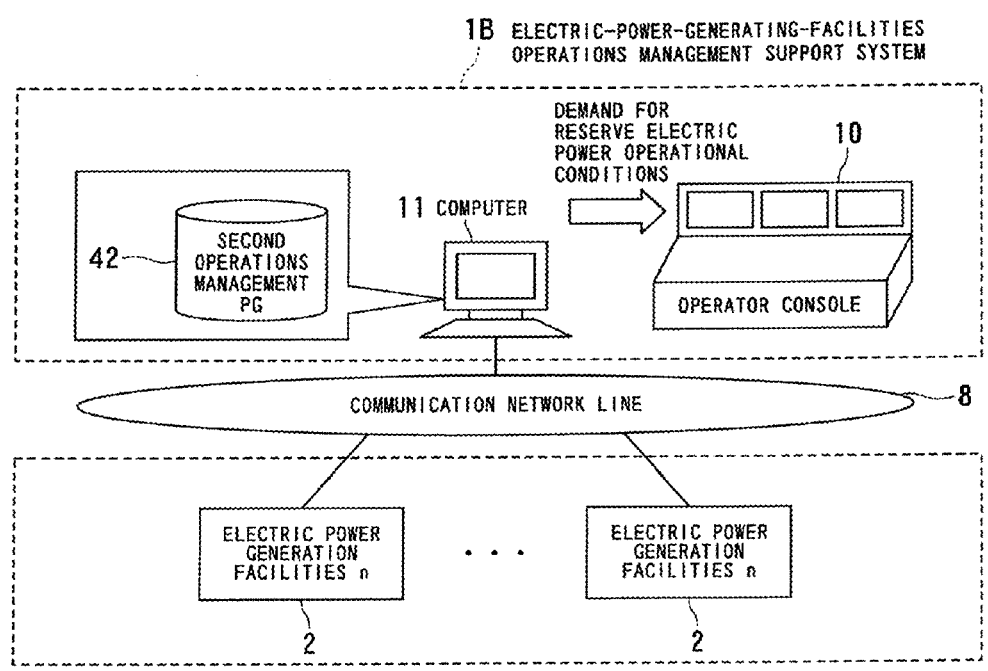
FIG. 17 is a schematic configuration diagram which shows a configuration example of an operations management system for the electric power generating facilities, including an electric-power-generating-facilities operations management support system according to a fifth embodiment of the present invention.

FIG. 17 is a schematic configuration diagram which shows a configuration example of an operations management support system for the electric power generating facilities 2, including an electric-power-generating-facilities operations management support system 1B according to a fifth embodiment of the present invention.

An arrangement example according to the fifth embodiment of the present invention shown in FIG. 17 has basically the same configuration as with the fourth embodiment, except for including a second operations management PG 42 instead of the first operations management PG 12, and different components included in the electric-power-generating-facilities operations management support system 1B. Accordingly, the same components as with the fourth embodiment are denoted by the same reference numerals, and description thereof will be omitted.

As shown in FIG. 17, the difference between the electric-power-generating-facilities operations management support system 1B and the electric-power-generating-facilities operations management support system 1A is that the electric-power-generating-facilities operations management support system 1B further includes the operator console 10 as market-bidding means, reserve-electric-power demand receiving means, and electric-power-generation-amount adjustment-instruction input means. Accordingly, the electric-power-generating-facilities operations management support system 1B shown in the functional block diagram in FIG. 17 differs from the electric-power-generating-facilities operations management support system 1A shown in the functional block diagram in FIG. 12.

Figure 18:
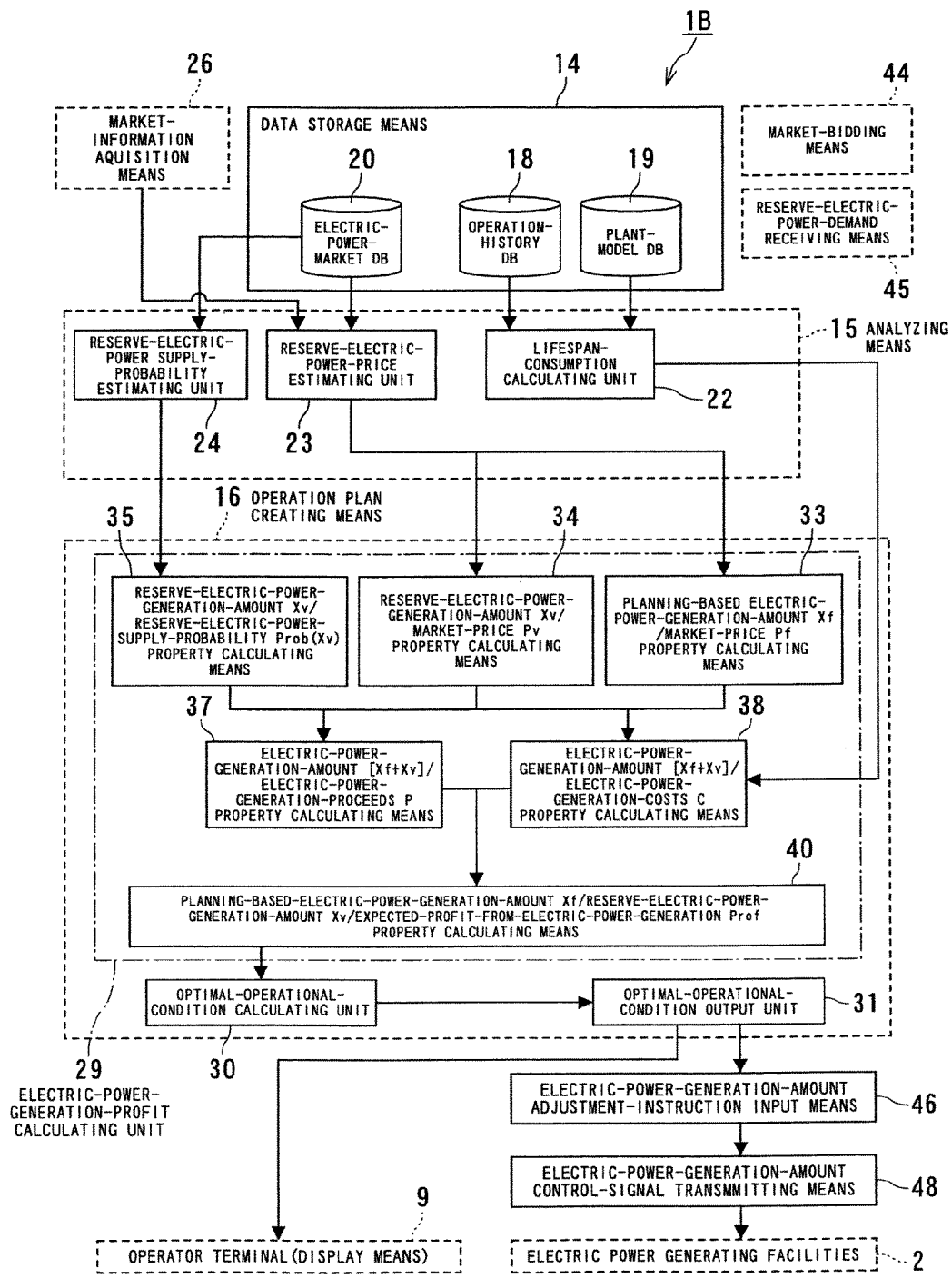
FIG. 18 is a schematic functional block diagram which shows a functional configuration of the electric-power-generating-facilities operations management support system according to the fifth embodiment of the present invention.

FIG. 18 is a schematic functional block diagram which shows a functional configuration of the electric-power-generating-facilities operations management support system 1B according to the fifth embodiment of the present invention.

The electric-power-generating-facilities operations management support system 1B further includes: market-bidding means 44 for putting electric power up for bidding on the market; reserve-electric-power demand receiving means 45 for receiving demands for reserve electric power on the market; electric-power-generation -amount adjustment-instruction input means 46 for receiving and inputting the electric power generation amount (instruction value) for instructing the electric power generating facilities 2; and electric-power-generation-amount control signal transmitting means 48 for transmitting electric-power-generation-amount control signals to each of the electric power generation facilities 2 for controlling each electric power generation amount according to the instruction values input to the electric-power-generation-amount adjustment-instruction input means 46.

Note that with the electric-power-generating-facilities operations management support system 1A according to the fourth embodiment, the operator console 10 serves as the market-bidding means 44, the reserve-electric-power demand receiving means 45, the electric-power-generation-amount adjustment-instruction input means 46, and the electric-power-generation-amount control signal transmitting means 48, as shown in FIG. 12.

With the electric-power-generating-facilities operations management support system 1B having such a configuration, the electric-power-generation-amount control signal transmitting means 48 transmits electric-power-generation-amount control signals to each of the electric power generation facilities 2 so as to control each electric power generation amount thereof. Thus, the electric-power-generating-facilities operations management support system 1B controls actual operation of the electric power generation facilities 2, in addition to operational support for the electric power generating facilities 2, which is a function of the electric-power-generating-facilities operations management support system 1A. Thus, the electric-power-generating-facilities operations management support system 1B provides an operation-support service including control of operation of the electric power generating facilities 2.

Note that with the electric-power-generating-facilities operations management support system 1B, while description has been made regarding an arrangement wherein the user inputs the instruction values (electric power generation amount) to each of the multiple electric power generating facilities 2 through the operator console 10 as the electric-power-generation-amount adjustment-instruction input means while monitoring the operational conditions displayed on the operator terminal 9 serving as the display means, an arrangement may be made wherein the operational conditions output from the operation plan creating means 16 are directly input to the electric-power-generation-amount adjustment-instruction input means. In this case, the input operation by the user may be omitted.

The electric-power-generating-facilities operations management support system 1B has the same configuration as with the electric-power-generating-facilities operations management support system 1A except for further including the operator console 10. While description has been made regarding an arrangement wherein the electric-power-generating-facilities operations management support system 1B further includes the market-bidding means 44, the reserve-electric-power demand receiving means 45, the electric-power-generation-amount adjustment-instruction input means 46, and the electric-power-generation-amount control signal transmitting means 48, in addition to the components included in the electric-power-generating-facilities operations management support system 1A, the market-bidding means 44 and the reserve-electric-power demand receiving means 45 are not indispensable to the electric-power-generating-facilities operations management support system 1B.

The reason is that the electric-power-generating-facilities operations management support system 1B further including the electric-power-generation-amount adjustment-instruction input means 46 and the electric-power-generation-amount control signal transmitting means 48 in addition to the components included in the electric-power-generating-facilities operations management support system 1A provides an operation support service including control of actual operation of the electric power generating facilities 2 from the perspective of functional configuration.

Furthermore, the computer 11 forming the functional configuration of the electric-power-generating-facilities operations management support system 1B performs the aforementioned functions, instead of the operator terminal 9 shown in FIG. 17.

With the electric-power-generating-facilities operations management support system 1B shown in FIG. 18, the computer 11 reads out the second operations management PG 42 for executing the operations management support method (electric-power-generation-facilities operation control processing) according to the fifth embodiment, whereby the combination of the computer 11 (hardware) and the second operations management PG 42 (software) makes up the functional configuration for performing the electric-power-generation -facilities operation control processing.

Next, description will be made in order, regarding the electric-power-generating-facilities operation control processing as the electric-power-generating-facilities operations management support method performed by the electric-power-generating-facilities operations management support system 1B.

Figure 19:
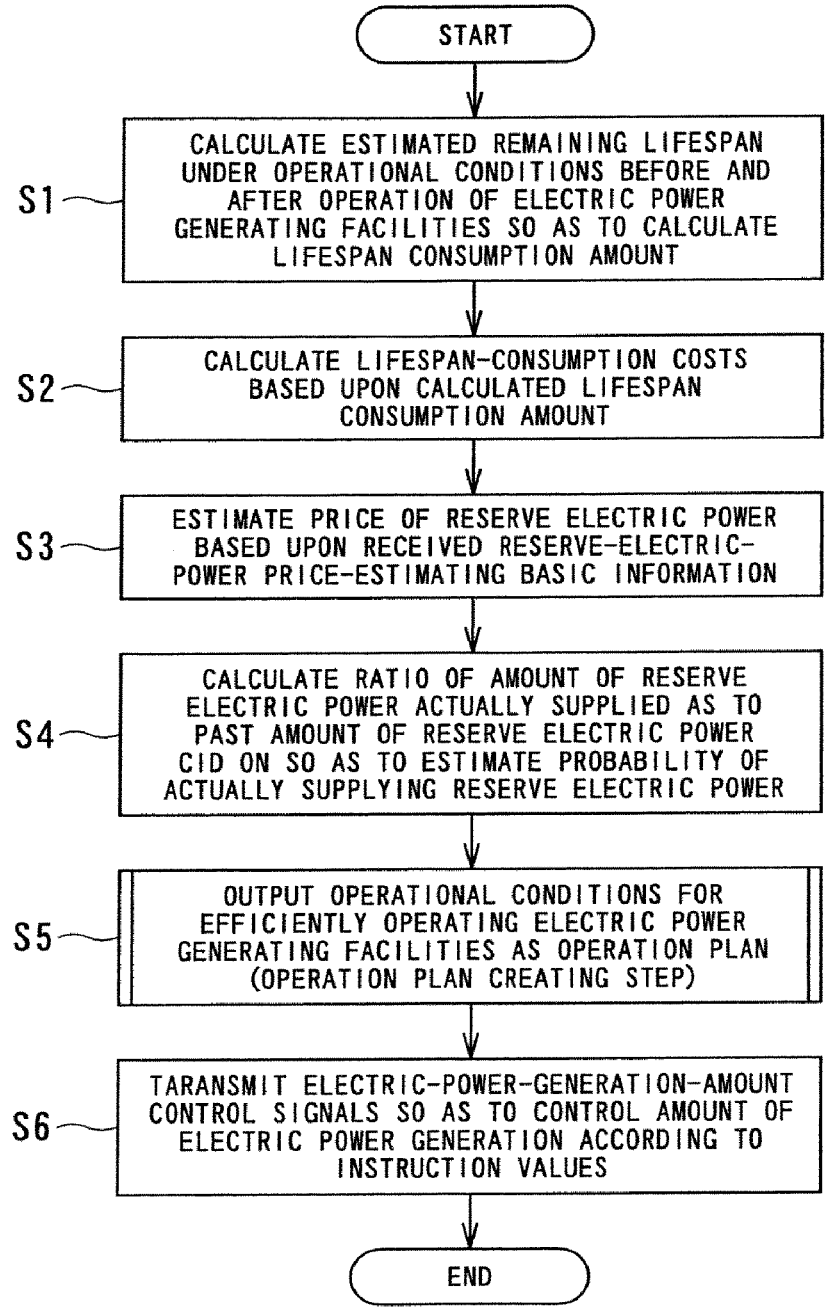
FIG. 19 is an explanatory diagram (processing flowchart) for describing electric-power-generating-facilities operations control processing performed by the electric-power-generating-facilities operations management support system according to the fifth embodiment of the present invention.

FIG. 19 is an explanatory diagram (processing flowchart) for making description in order regarding the electric-power-generating-facilities operation control processing as the electric-power-generating-facilities operations management support method performed by the electric-power-generating-facilities operations management support system 1B.

As shown in FIG. 19, the electric-power-generating-facilities operation control processing includes analyzing steps (Steps S1 through S4) and the operation plan creating step (Step S5) corresponding to the operation-planning notification processing of the electric-power-generating-facilities operations management support system 1A, and further includes electric-power-generation-amount control signal transmission processing (Step S6) for transmitting instruction values of electric power generation amount to each of the electric power generating facilities 2. Accordingly, in the present embodiment, description will be omitted regarding the aforementioned Steps S1 through S4 corresponding to the operation plan notification processing of the electric-power-generating-facilities operations management support system 1A, and description will be made regarding the electric-power-generation-amount control signal transmission processing (Step S6).

Prior to the processing in Step S6, the system displays the operational conditions calculated by the operation plan creating means 16 in Step S5 on the operator terminal 9 serving as display means so as to notify the user of the operational conditions. Then, the user inputs the instruction values to the operator console 10 serving as the electric-power-generation-amount adjustment-instruction input means 46. Upon the operator console 10 receiving the instruction values for controlling electric power generation, the flow proceeds to Step S6 wherein the electric-power-generation-amount control signal transmission processing is performed.

In the electric-power-generation-amount control signal transmission processing (Step S6), the operator console 10 receives the instruction values of electric power generation amount from the user. In this case, the operator console 10 serves as the electric-power-generation-amount control signal transmitting means 48, i.e., transmits electric-power-generation-amount control signals to the electric power generating facilities 2 for controlling the electric power generation according to the received instruction values. Upon the operator console 10 transmitting the received instruction values to the electric power generating facilities 2 which are to be controlled, the electric-power-generation-amount control signal transmission processing is completed (END).

Note that with the electric-power-generating-facilities control processing, description has been made regarding an arrangement wherein prior to Step S6, the user inputs the instruction values to the operator console 10 serving as the electric-power-generation-amount adjustment instruction input means while monitoring the operational conditions displayed on the operator terminal 9, an arrangement may be made wherein the operational conditions are directly transmitted from the operation plan creating means 16 to the operator console 10 serving as the electric-power-generation-amount adjustment instruction input means. In this case, the electric-power-generating-facilities operation control processing shown in the explanatory diagram (processing flowchart) in FIG. 19 further includes formed-operation-planning transmission processing for transmitting the formed operation planning, i.e., the calculated operational conditions, from the operation plan creating means 16 to the operator console 10 serving as the electric-power-generation-amount adjustment instruction input means, between the operation plan creating step (Step S5) and the electric-power-generation-amount control signal transmission processing (Step S6).

With the electric-power-generating-facilities operations management support system, the operations management support method thereof (electric-power-generating-facilities operations control processing), and the program for executing the operations management support method on a computer according to the fifth embodiment of the present invention, the system has a function for controlling operation of the electric power generating facilities 2, in addition to functions provided by the electric-power-generating-facilities operations management support system according to the fourth embodiment of the present invention. That is to say, the system according to the present fifth embodiment provides an actual operation service, as well as the operation support service for the electric power generating facilities 2.

[Sixth Embodiment]

Figure 20:
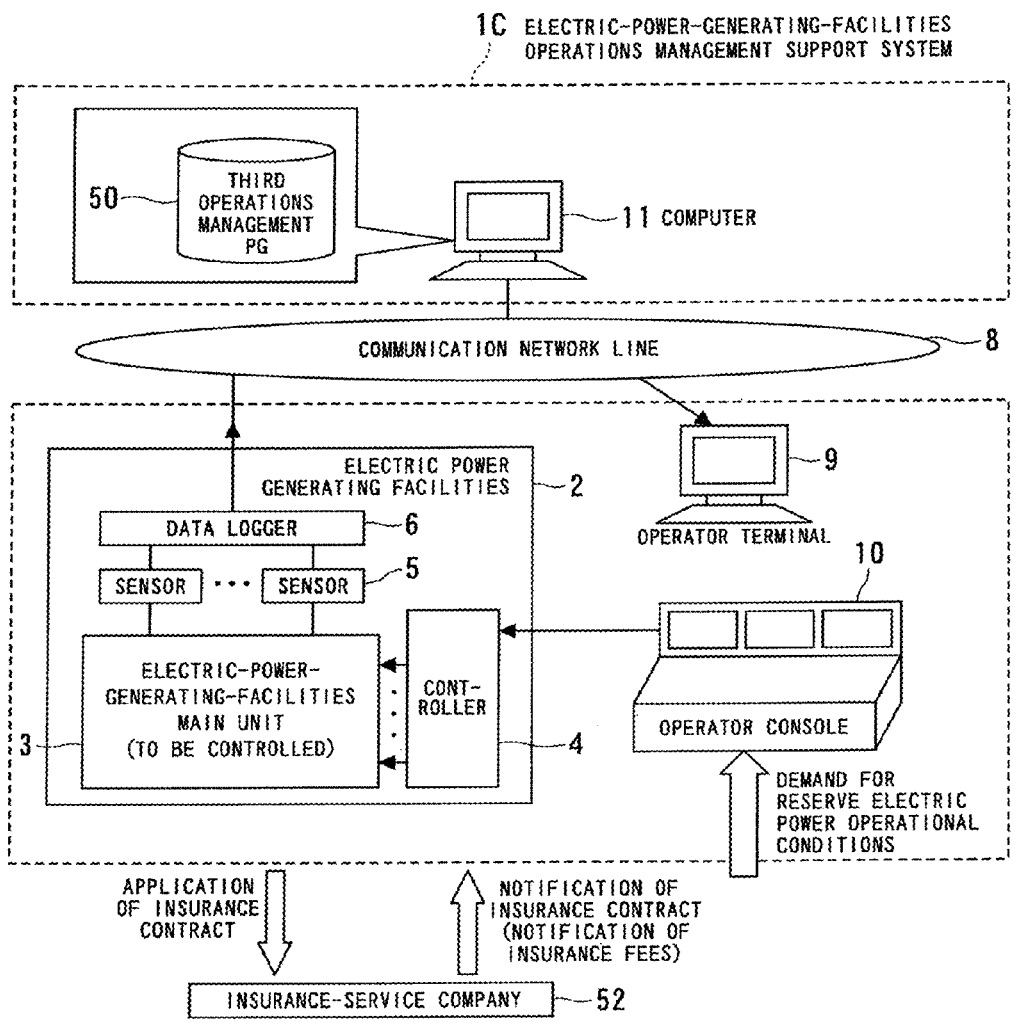
FIG. 20 is a schematic configuration diagram which shows a configuration example of an operations management system for the electric power generating facilities, including an electric-power-generating-facilities operations management support system according to a sixth embodiment of the present invention.

FIG. 20 is a schematic configuration diagram which shows a configuration example of an operations management support system for the electric power generating facilities 2, including an electric-power-generating-facilities operations management support system 1C according to a sixth embodiment of the present invention.

An arrangement according to the sixth embodiment of the present invention shown in FIG. 20 has basically the same configuration as with the fourth embodiment shown in FIG. 12, except for including the electric-power-generating-facilities operations management support system 1C and a third operations management PG 50, instead of the electric-power-generating-facilities operations management support system 1A and the first operations management PG 12, respectively. Accordingly, the same components as with the fourth embodiment are denoted by the same reference numerals, and description thereof will be omitted.

The electric-power-generating-facilities operations management support system 1C estimates costs of a risk of shutdown of electric power generation (which will be referred to as "unexpected shutdown risk costs" hereafter) due to trouble such as malfunctioning of the electric power generating facilities 2, emergency shutdown thereof, or the like, from over-rated operation for maintaining the reserve electric power production capability, in addition to the lifespan consumption costs as the operation-risk costs, for assisting the operator of the electric power generating facilities 2 in performing operation and management thereof.

Note that giving consideration to the fact that prediction and control of the unexpected shutdown risk costs are impossible, the electric-power-generating-facilities operations management support system 1C uses insurance as means for hedging such a risk. That is to say, the unexpected shutdown risk costs correspond to insurance fees which are to be paid to an insurance service company 52 for hedging the risk of the electric power generating facilities 2.

With the electric-power-generating-facilities operations management support system 1C, the computer 11 reads out the third operations management PG 50 for executing the operations management support method (second operation-planning notification processing) according to the sixth embodiment of the present invention, whereby the combination of the computer 11 (hardware) and the third operations management PG 50 (software) makes up the functional configuration for performing the second operation-planning notification processing.

Figure 21:
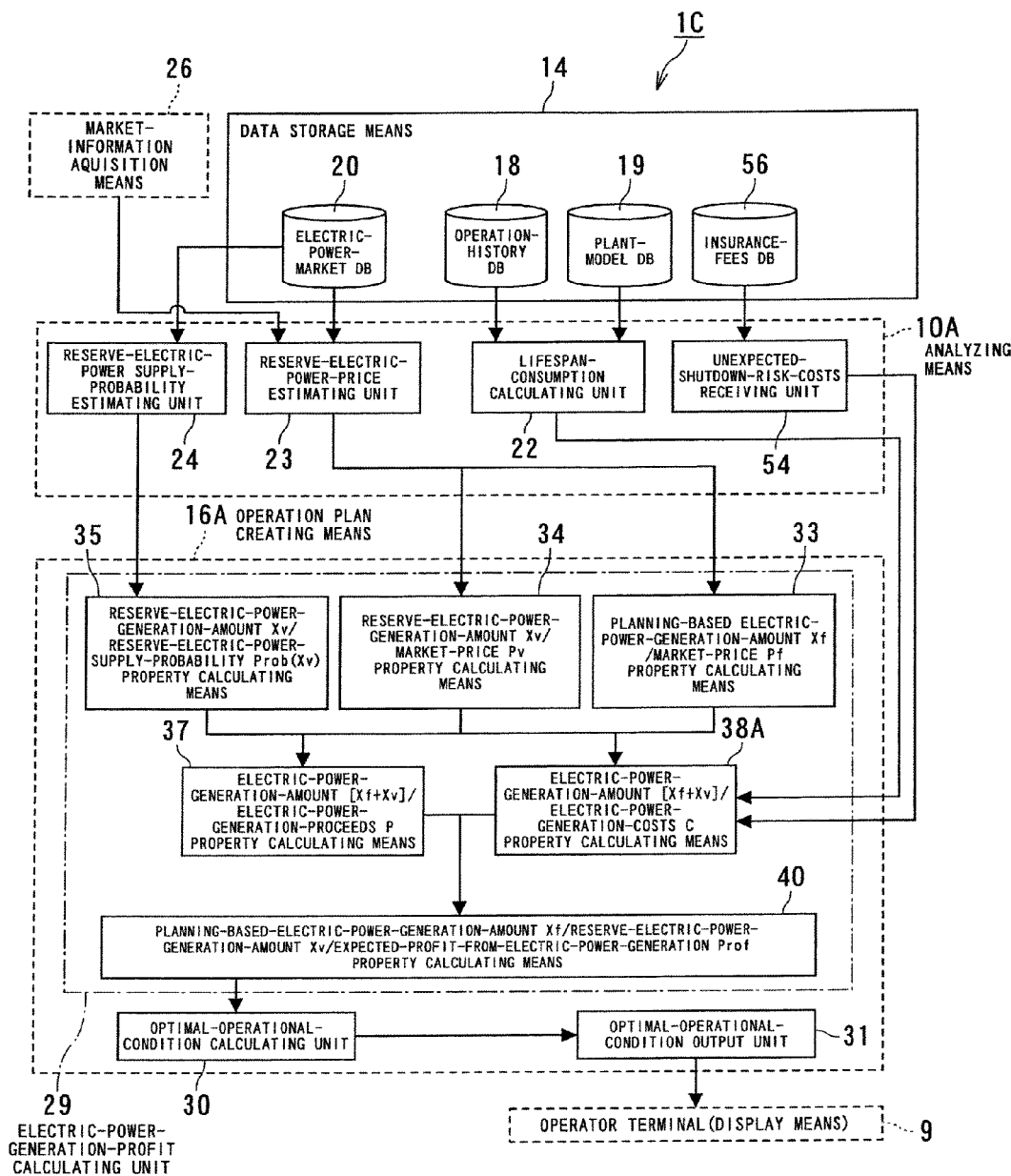
FIG. 21 is a schematic functional block diagram which shows a functional configuration of the electric-power-generating-facilities operations management support system according to the sixth embodiment of the present invention.

FIG. 21 is a schematic functional block diagram which shows a functional configuration of the electric-power-generating-facilities operations management support system 1C according to the sixth embodiment of the present invention.

As shown in FIG. 21, the electric-power-generating-facilities operations management support system 1C has the same configuration as with the electric-power-generating-facilities operations management support system 1A, except for including analyzing means 15A and operation plan creating means 16A, instead of the analyzing means 15 and operation plan creating means 16, respectively. That is to say, the electric-power-generating-facilities operations management support system 1C includes the data storage means 14, the analyzing means 15A, and the operation plan creating means 16A.

The analyzing means 15A include an unexpected-shutdown-risk-costs receiving unit 54 serving as means for receiving costs of the risk of unexpected shutdown of electric power generating facilities. The costs of electric power generation C are calculated based upon the unexpected shutdown risk costs as the operational-risk costs, as well as based upon the lifespan-consumption costs. The unexpected-shutdown-risk-costs receiving unit 54 receives information with regard to insurance fees which have been paid to the insurance service company 52 as the unexpected-shutdown-risk costs, from an insurance DB 56 included in the data storage means 14.

Furthermore, the operation plan creating means 16A include an electric-power-generation-profit calculating unit 29A for calculating a profit from electric generation, an optimal-operational-condition calculating unit 30, and an optimal-operational-condition output unit 31. In further detail, the electric-generation-profit calculating unit 29A has essentially the same configuration as with the electric-power-generation profit calculating unit 29, except for including electric-power generation amount [Xf+Xv]/electric-power-cost C property calculating means 38A, instead of the electric-power generation amount [Xf+Xv]/electric-power-cost C property calculating means 38.

That is to say, the difference between the operation plan creating means 16A and the operation plan creating means 16 is that the operation plan creating means 16A further include the unexpected-shutdown-risk-costs receiving unit 54, and include the electric-power generation amount [Xf+Xv]/electric-power-cost C property calculating means 38A, instead of the electric-power generation amount [Xf+Xv]/electric-power-cost C property calculating means 38, thereby calculating the costs of electric power generation C and the electric-power generation amount [Xf+Xv]/electric-power-cost C property, including the unexpected-shutdown-risk costs as the operational-risk costs.

As described above, the electric-power generation amount [Xf+Xv]/electric-power-cost C property calculating means 38A calculate the costs of electric power generation C based upon the unexpected-shutdown-risk costs as the operational-risk costs. That is to say, the costs of electric power generation C according to the present embodiment are represented by the curve D shown in FIG. 16, and is represented by the following Expression (24), using Expression (18) described in the fourth embodiment.

[Mathematical Expression 19]

$$\text{Costs of electric power generation } C = (\text{electric-power operation costs}) + (\text{lifespan-consumption costs}) + (\text{unexpected-shutdown-risk costs}) \quad (24)$$

With the present embodiment, the system uses insurance as means for hedging such a risk, and accordingly, the unexpected shutdown risk costs correspond to insurance fees which are to be paid to an insurance service company. Let us say that the insurance fees are represented by the following Expression (25).

[Mathematical Expression 20]

$$\text{Insurance fees} = MF\text{Cost}(Xf + Xv) \quad (25)$$

In this case, the costs of electric power generation C according to the present embodiment is represented by the following Expression (26).

[Mathematical Expression 21]

$$\text{Costs of electric power generation } C = \text{OpCost}(Xf + \int Xv \times \text{Prob}(Xv) dXv) + \text{LifeCost}(Xf + \int Xv \times \text{Prob}(Xv) dXv) + MF\text{Cost}(Xf + Xv) \quad (26)$$

With the electric-power-generating-facilities operations management support system 1C having such a configuration, the operation plan creating means 16A calculate the costs of electric power generation C based upon the unexpected-shutdown-risk costs (corresponding to insurance fees) as the operational-risk costs for using insurance as risk-hedging means, thereby assisting the operator in operating the electric power generating facilities 2 under generally the optimal operational conditions in the economic and overall perspective, as compared with the electric-power-generating-facilities operations management support system 1A.

Note that description has been made regarding an arrangement wherein the unexpected-shutdown-risk-costs receiving unit 54 receives information with regard to the insurance fees which have been paid to the insurance service company 52 serving as the unexpected-shutdown-risk costs, from the insurance DB 56 stored in the data storage means 14, an arrangement may be made wherein the user directly inputs the insurance fees as the unexpected-shutdown-risk costs to the unexpected-shutdown-risk-costs receiving unit 54. In this case, the insurance DB 56 is unnecessary.

Next, description will be made in order regarding the second operation-planning notification processing as the electric-power-generating-facilities operations management support method performed by the electric-power-generating-facilities operations management support system 1C.

Note that the second operation-planning notification processing has essentially the same configuration as with the operation-planning notification processing performed by the electric-power-generating-facilities operations management support system 1A, except for only one processing step in the operation plan creating processing (Step S5)

Accordingly, the processing steps in the second operation-planning notification processing which are essentially the same as with the operation-planning notification processing (Step 5) performed by the electric-power-generating-facilities operations management support system 1A are denoted by the same processing-step numerals, and description thereof will be omitted. Description will be made regarding processing steps different from those of the electric-power-generating-facilities operations management support system 1A.

Figure 22:
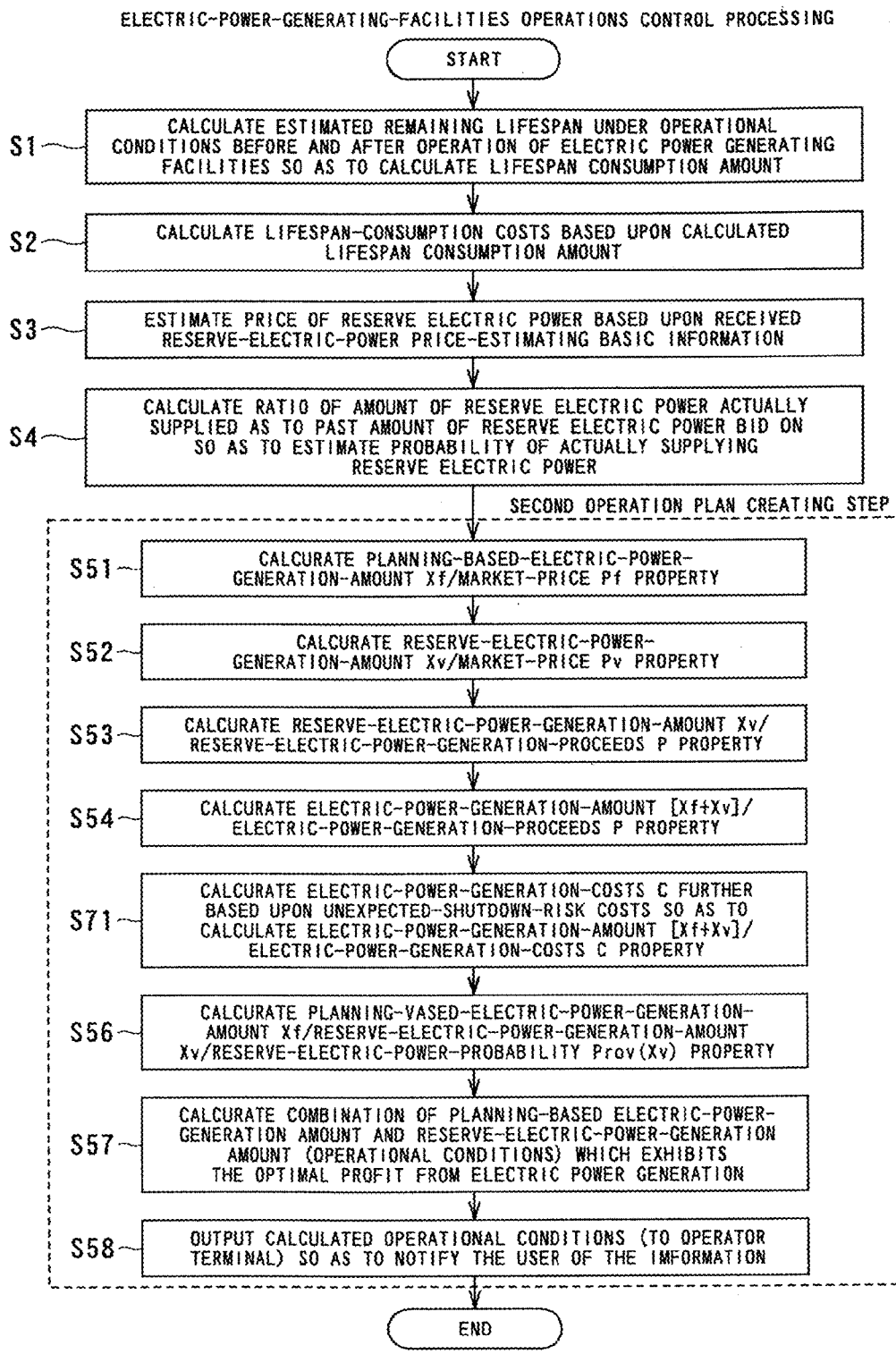
FIG. 22 is an explanatory diagram (processing flowchart) for describing a second operation-planning notification processing performed by the electric-power-generating-facilities operations management support system according to the sixth embodiment of the present invention.

FIG. 22 is an explanatory diagram (processing flowchart) for making description in order regarding the second operation-planning notification processing as the electric-power-generating-facilities operations management support method performed by the electric-power-generating-facilities operations management support system 1C.

As shown in FIG. 22, the second operation plan creating processing (Step S7) has essentially the same configuration as with the operation plan creating processing (Step S5) formed of the electric-power-generation-profit calculating processing (Steps S51 through S56), except for including an electric-power-generation-amount [Xf+Xv]/electric-power-generation-costs C property calculating step (Step S71) for calculating the costs of electric power generation C based upon the unexpected-shutdown-risk costs (insurance fees) as the operational-risk costs, instead of the electric-power-generation-amount [Xf+Xv]/electric-power-generation-costs C property calculating step (Step S55).

Accordingly, description will be omitted regarding the Steps S51 through S54, and Step S56, and description will be made regarding the electric-power-generation-amount [Xf+Xv]/electric-power-generation-costs C property calculating step (Step S71) with reference to the electric-power-generation-amount [Xf+Xv]/electric-power-generation-costs C property calculating step (Step S55).

In the second operation-planning notification processing, the analyzing processing (Steps S1 through S4) are performed based upon the received information for calculating the operation plan creating basic information in the same way as with the operation-planning notification processing, following which the second operation plan creating processing (Step S7) is performed.

In the second operation plan creating processing (Step S7), first, the planning-based-electric-power-generation-amount Xf/market-price Pf property calculating step is performed in Step S51. Subsequently, the processing in Steps S52, S53, and S54, are performed in that order, following which the electric-power-generation amount [Xf+Xv]/electric-power-generation-costs C property calculating step (Step S71) is performed.

In the electric-power-generation amount [Xf+Xv]/electric-power-generation-costs C property calculating step (Step S71), the electric-power generation amount [Xf+Xv]/electric-power-cost C property calculating means 38A of the electric-generation-profit calculating unit 29A of the operation plan creating means 16A calculate the electric-power-generation amount [Xf+Xv]/electric-power-generation-costs C property based upon the properties calculated in the planning-based-electric-power-generation-amount Xf/market-price Pf property calculating step, the reserve-electric-power-generation-amount Xv/market-price Pv property calculating step, and the reserve-electric-power-generation-amount Xv/reserve-electric-power supply-probability Prob (Xv) property calculating step.

The difference between the electric-power-generation amount [Xf+Xv]/electric-power -generation-costs C property calculating step (Step S71) performed by the electric-power generation amount [Xf+Xv]/electric-power-cost C property calculating means 38A and the electric-power-generation amount [Xf+Xv]/electric-power-generation-costs C property calculating step (Step S55) of the operation plan creating processing (Step S5) is that in the electric-power-generation amount [Xf+Xv]/electric-power-generation-costs C property calculating step (Step S71), the costs of electric power generation C are calculated based upon the unexpected-shutdown-risk costs as the operational-risk costs, as well as based upon the lifespan-consumption costs.

Upon the electric-power generation amount [Xf+Xv]/electric-power-cost C property calculating means 38A calculating the electric-power-generation amount [Xf+Xv]/electric-power-generation-costs C property based upon the unexpected-shutdown-risk costs as the operational-risk costs, as well as based upon the lifespan-consumption costs, the electric-power-generation amount [Xf+Xv]/electric-power-generation-costs C property calculating step (Step S71) is completed, following which the flow proceeds to Step S56. Upon completion of the planning-based-electric-power-generation-amount Xf/reserve-electric-power-generation-amount Xv/expected-profit-from-electric-power-generation Prof property calculating step (Step S56), the electric-power-generation-profit calculating processing of the second operation plan creating processing is completed.

Upon completion of the electric-power-generation-profit calculating processing, the flow proceeds to the optimal-operational-condition-calculating processing (Step S57) for calculating the combination of the planning-based electric power generation amount and the reserve-electric-power generation amount which exhibits the maximum profit of electric power generation calculated in the electric-power-generation-profit calculating processing, and the optimal-operation-condition-notification processing (Step S58) for notifying the user of the operational conditions calculated in the optimal-operation-condition calculating step, following which the second operation plan creating processing is completed (Step S7). Upon completion of the second operation plan creating processing, the second operation-planning notification processing is completed (END).

With the operations management support method (second operation plan creating processing) for the electric power generating facilities 2 having such a configuration, the system estimates the optimal operational conditions of the electric power generating facilities 2 based upon the information with regard to the lifespan-consumption costs, the market price of reserve electric power, the reserve-electric-power supply probability, and the unexpected-shutdown-risk costs, so as to notify the user (operator of the electric power generating facilities) of the optimal operational conditions from the perspective of profit, thereby assisting the user in making a determination for operating the electric power generating facilities 2 while giving consideration to the lifespan-consumption costs and the unexpected-shutdown-risk costs which are the operational-risk costs.

With the electric-power-generating-facilities operations management support system, the operations management support method thereof (second operation plan creating processing), and the program for executing the operations management support method on a computer according to the sixth embodiment of the present invention, the costs of electric power generation C are calculated further based upon the unexpected-shutdown-risk costs (insurance fees) as the operational-risk costs, thereby operating the electric power generating facilities 2 under generally the optimal operational conditions as compared with the electric-power-generating-facilities operations management support system 1A, from the economic and overall perspective.

[Seventh Embodiment]

Figure 23:
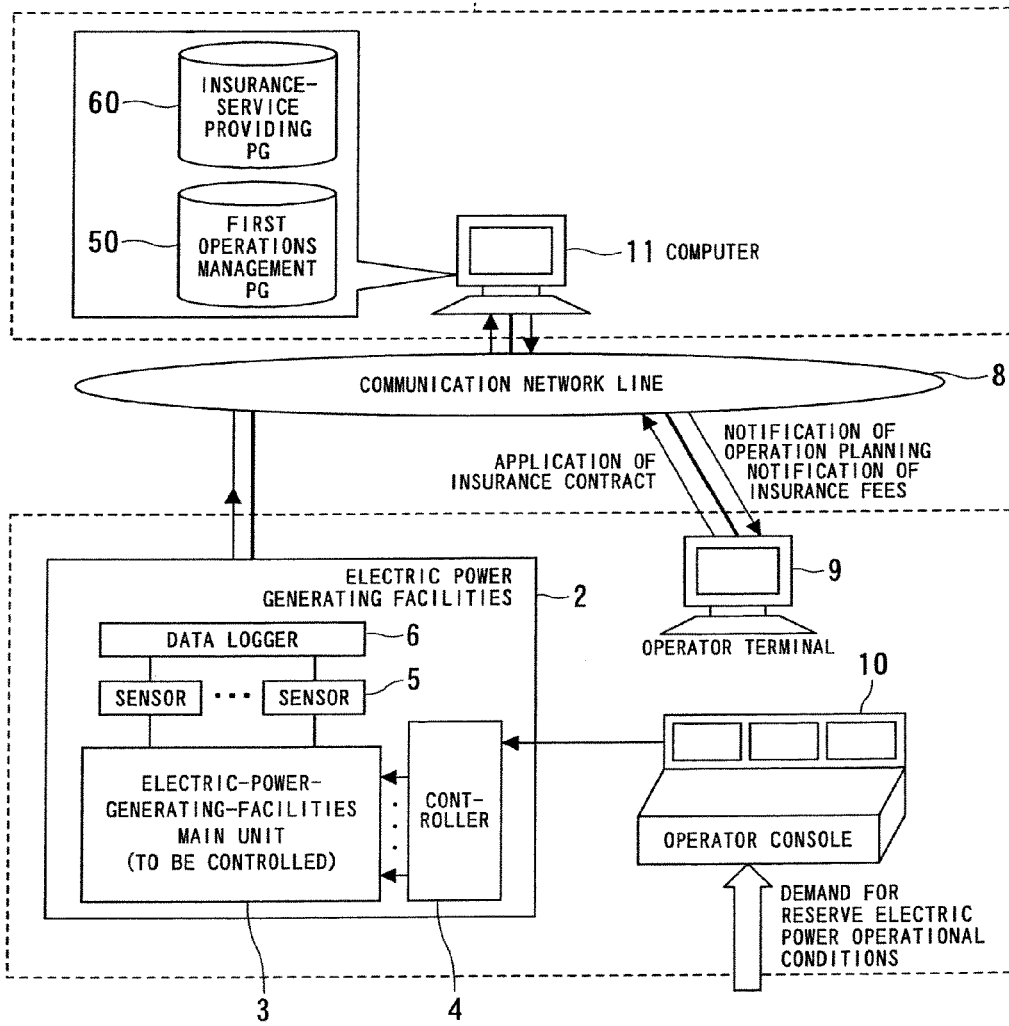
FIG. 23 is a schematic configuration diagram which shows a configuration of the operations management system for the electric power generating facilities, including an electric-power-generating-facilities operations management support system according to a seventh embodiment of the present invention.

FIG. 23 is a schematic configuration diagram which shows a configuration of the operations management support system for the electric power generating facilities 2, including an electric-power-generating-facilities operations management support system 1D according to a seventh embodiment of the present invention.

As shown in FIG. 23, an arrangement according to the seventh embodiment of the present invention has essentially the same configuration as with the sixth embodiment, except for further including an insurance service providing PG 60 for executing processing on the computer 11 for providing an insurance service (which will be referred to as "insurance-service providing processing" hereafter) as means for hedging the unexpected-shutdown risk of the electric power generating facilities 2. Accordingly, the same components as with the sixth embodiment are denoted by the same reference numerals, and description thereof will be omitted.

With the electric-power-generating-facilities operations management system 1D shown in FIG. 23, the computer 11 reads out the third operations management PG 50 and the insurance-service providing PG 60 for executing the operations management support method (total operations management support processing) according to the seventh embodiment of the present invention, whereby the combination of the computer 11 (hardware), the third operations management PG 50 (software), and the insurance-service providing PG 60 (software) makes up the functional configuration for performing the total operations management support processing.

Figure 24:
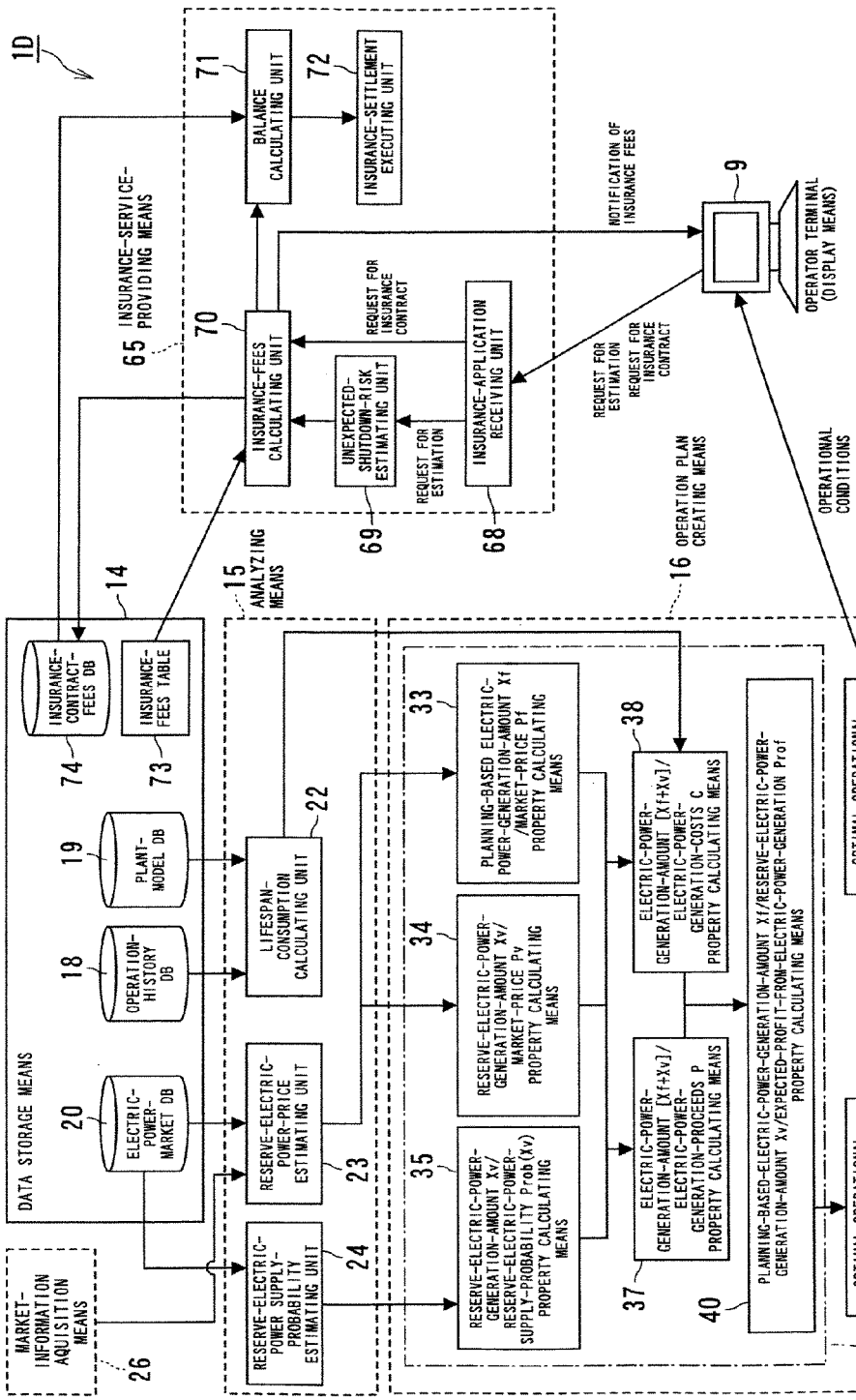
FIG. 24 is a schematic functional block diagram which shows a functional configuration of the electric-power-generating-facilities operations management support system according to the seventh embodiment of the present invention.

FIG. 24 is a schematic functional block diagram which shows a functional configuration of the electric-power-generating-facilities operations management support system 1D according to the seventh embodiment of the present invention.

The functional configuration of the electric-power-generating-facilities operations management support system 1D is roughly classified into two parts; one being functional means (which will be referred to as "electric-power-generating-facilities operations management support system 1C", detailed configuration of which is omitted in FIG. 24) corresponding to the electric-power-generating-facilities operations management support system 1C, having essentially the same configuration as with the sixth embodiment; and the other being functional means 60 (which will be referred to as "insurance-service providing means" hereafter) for providing an insurance service as means for hedging the unexpected-shutdown-risk costs of the electric power generating facilities 2. Now, description will be made regarding the insurance service providing means 65, which is not included in the sixth embodiment.

The insurance-service providing means 65 provides an insurance service corresponding to the insurance service company 52 described in the sixth embodiment. Note that with the electric-power-generating-facilities operations management support system 1D, the insurance-service providing means 65 provide an insurance service in a more suitable form for supporting the operator of the electric power generating facilities wherein over-rated operation is actively performed for maintaining the reserve electric power production capability.

More specifically, the system according to the present embodiment employs a method wherein the user performs preliminary settlement at the time of application, and performs settlement at least one or more times after application (which will be referred to as "post-operation settlement" hereafter). The reason is that prediction of generation of reserve electric power is impossible in reality, leading to a problem that in some cases, there is a great difference between the reserve electric power generation amount at the time of application of insurance contract (at the time of preliminary settlement) and the reserve electric power which has been actually output (at the time of post-operation settlement). Furthermore, the reason is that the fact whether or not reserve electric power has been actually generated, and the amount of reserve electric power which has been actually generated, greatly affect the risk of the electric power generating facilities 2.

As shown in FIG. 24, the insurance-service providing means 65 include: an insurance-application receiving unit 68 for receiving estimation of insurance and application thereof; an unexpected-shutdown-risk estimating unit 69 for estimating risk of unexpected shutdown of the electric power generating facilities; an insurance-fees calculating unit 70 for calculating insurance fees as the unexpected-shutdown-risk costs based upon the risk of unexpected shutdown estimated by the unexpected-shutdown-risk estimating unit 69; a balance calculating unit 71 for calculating and outputting the balance corresponding to the difference in insurance fees between the preliminary settlement and the post-operation settlement; and an insurance-settlement executing unit 72 for executing the settlement of insurance.

The insurance-application receiving unit 68 receives application for insurance contract and application for estimation of insurance fees which are to be paid at the time of insurance contract, from the user (operator of the electric power generating facilities) through the communication network line 8.

The unexpected-shutdown-risk estimating unit 69 calculates expected costs of damage at the time of unexpected shutdown of the electric power generating facilities 2 (which will be referred to as "expected damage costs" hereafter) based upon costs of damage at the time of unexpected shutdown of the electric power generating facilities 2 including: costs of damages due to lost opportunity on the market from shutdown of electric power generation owing to trouble of the electric power generating facilities 2 such as malfunctioning, emergency shutdown, or the like, due to over-rated operation for maintaining the reserve electric power production capability, and penalty costs under the contract; costs required for restoring the electric power generating facilities 2 from abnormal situations; and costs required at the time of unexpected shutdown of the electric power generating facilities 2 including costs of replacement, maintenance, and so forth, and the probability of unexpected shutdown of the electric power generating facilities 2, as well as based upon the lifespan-consumption costs of the electric power generating facilities 2, so as to estimate the risk of unexpected shutdown based upon the calculated expected damage costs.

The expected damage costs due to unexpected shutdown of the electric power generating facilities 2 calculated by the unexpected-shutdown-risk estimating unit 69 is represented by the following Expression (27).

[Mathematical Expression 22]

$$\text{Expected damage costs} = (\text{probability of unexpected shutdown}) \times (\text{costs of damage due to unexpected shutdown}) \quad (27)$$

Note that the unexpected-shutdown-risk estimating unit 69 reads out the operation-history information from the operation-history DB 18, and obtains the costs of damage due to unexpected shutdown of the electric power generating facilities 2 and the probability of unexpected shutdown thereof based upon this information.

Note that the unexpected-shutdown-risk estimating unit 69 calculates the expected damage costs based upon the received operation-history information, thereby enabling estimation of unexpected-shutdown risk not only prior to insurance contract (for estimating the preliminary-settlement fees) of the user (operator of the electric power generating facilities) but also after insurance contract (for estimating post-operation settlement fees).

The unexpected-shutdown-risk estimating unit 69 calculates the expected damage costs RC1 (which will be referred to as "preliminary expected damage costs" hereafter) as unexpected-shutdown risk for insurance contract. The preliminary expected damage costs RC1 are calculated based upon the information with regard to operation which has been performed prior to insurance contract read out from the operation-history DB 18. The probability of unexpected shutdown and the costs of damage due to unexpected shutdown are represented in the form of a function of the electric power generation amount (=(planning-based electric power generation amount Xf)+(reserve-electric-power generation amount Xv)), i.e., (Xf+Xv), as represented by the following Expressions (28) and (29), respectively.
[Mathematical Expression 23]

$$\text{Unexpected-shutdown-probability}(Xf+Xv) \qquad (28)$$

[Mathematical Expression 24]

$$\text{Unexpected-shutdown-damage-costs}(Xf+Xv) \qquad (29)$$

Using the above Expressions (27), (28), and (29), the preliminary expected damage costs RC1 are represented by the following Expression (30).
[Mathematical Expression 25]

$$\text{Preliminary expected damage costs } RC1 = (\text{Unexpected-shutdown-probability}(Xf+Xv)) \times (\text{Unexpected-shutdown-damage-costs}(Xf+Xv)) \qquad (30)$$

Furthermore, the unexpected-shutdown-risk estimating unit 69 estimates expected damage costs following operation of the electric power generating facilities 2 after insurance contract based upon the amount of reserve electric power which has been actually generated. In the same way as with the preliminary expected damage cost RC, the probability of unexpected shutdown and the costs of damages due to unexpected shutdown are represented in the form of a function of the electric power generation amount (=(planning-based electric power generation amount Xf)+(reserve-electric-power generation amount Xv0)), i.e., (Xf+Xv0), as represented by the following Expressions (31) and (32), respectively. Using the Expressions (27), (31), and (32), the post-operation expected damage costs RC2 is represented by the following Expression (33).
[Mathematical Expression 26]

$$\text{Unexpected-shutdown-probability}(Xf+Xv0) \qquad (31)$$

[Mathematical Expression 27]

$$\text{Unexpected-shutdown-damage-costs}(Xf+Xv0) \qquad (32)$$

[Mathematical Expression 28]

$$\text{Post-operation expected damage costs } RC2 = (\text{Unexpected-shutdown-probability}(Xf+Xv0)) \times (\text{Unexpected-shutdown-damage-costs}(Xf+Xv0)) \qquad (33)$$

Note that Xvo used here represents the amount of reserve electric power which has been actually generated, and is in a range between 0 and Xv, wherein Xv represents the reserve electric power production capability maintained beforehand.

The insurance-fees calculating unit 70 calculates insurance fees based upon the unexpected-shutdown risk (e.g., preliminary expected damage costs RC1) estimated by the unexpected-shutdown-risk estimating unit 69. Note that the insurance-fees calculating unit 70 calculates the insurance fees by making a reference to an insurance-fees table 73 of the relation between the unexpected-shutdown risk and the insurance fees.

Upon completion of calculation of the insurance fees, the insurance-fees calculating unit 70 outputs the calculated insurance fees to the operator terminal 9 serving as display means so as to notify the user of the calculated insurance fees. Note that insurance fees (which will be referred to as "preliminary insurance fees" hereafter) calculated based upon the preliminary expected damage costs RC1, and the insurance fees (which will be referred to as "post-operation insurance fees" hereafter) calculated based upon the post-operation expected damage costs RC2, giving consideration to operation of the electric power generating facilities 2 after insurance contract, are represented by the following Expressions (34) and (35).
[Mathematical Expression 29]

$$\text{Preliminary insurance fees} = BMF\text{Cost}(Xf+Xv) \qquad (34)$$

[Mathematical Expression 30]

$$\text{Post-operation insurance fees} = AMF\text{Cost}(Xf+Xv0) \qquad (35)$$

Furthermore, upon completion of the insurance fees, the insurance-fees calculating unit 70 stores the calculated results in an insurance-contract-fees DB 74. The insurance-contract-fees DB 74 is included in data storage means such as the data storage means 14 or the like, for example, and can store data received from the insurance-fees calculating unit 70. The insurance-contract-fees DB 74 stores the insurance fees calculated by the insurance-fees calculating unit 70 in connection with the corresponding electric power generating facilities and date of estimation.

At the time of estimation of expected damage risk following operation after insurance contract, the balance calculating unit 71 calculates the difference between the post-operation insurance fees and the preliminary insurance fees. In the event that determination is made that the difference is not zero, the insurance-settlement executing unit 72 receives the information with regard to the amount of the difference in these fees so as to execute post-operation settlement. Specifically, the balance calculating unit 71 reads out the amount of the preliminary insurance fees and post-operation insurance fees from the insurance-contract-fees DB 74 for calculating the difference therebetween. In the event that determination is made that the difference calculated by the balance calculating unit 71 is not zero, the balance calculating unit 71 outputs the difference to the operator terminal 9 serving as display means for notifying the user of the difference, as well as transmitting the information with regard to the difference to the insurance-settlement executing unit 72.

The insurance-settlement executing unit 72 is included for executing settlement. With the preliminary settlement at the time of insurance contract, upon receiving application for insurance contract, the insurance-settlement executing unit 72 executes settlement with the insurance fees notified to the user, i.e., the preliminary insurance fees. Furthermore, the system estimates the unexpected-shutdown risk (post-operation expected damage costs RC2) following operation after insurance contract, and calculates the difference between: the preliminary insurance fees calculated based upon the preliminary expected damage costs RC1; and the post-operation insurance fees calculated based upon the post-operation expected damage costs RC2, as described above. In the event that the difference in insurance fees is not zero, the insurance-settlement executing unit 72 receives the difference calculated by the balance calculating unit 71 so as to execute post-operation settlement. Note that at the time of the post-operation settlement, the user (insured) receives a return of the difference calculated by the balance calculating unit 71.

With the insurance-service providing means 65 having such a configuration, following payment of insurance fees by the user (operator of the electric power generating facilities) for the preliminary settlement at the time of application for insurance contract, the unexpected-shutdown-risk estimating unit 69 estimates the unexpected-shutdown risk (post-operation expected damage costs RC2) of the electric power generating facilities 2 based upon the amount of reserve electric power which has been actually generated, the insurance-fees calculating unit 70 estimates post-operation insurance fees based upon the estimation results thus obtained, and the balance calculating unit 71 calculates the difference between the preliminary insurance fees and the post-operation insurance fees, thereby enabling post-operation settlement in the event that the difference is not zero.

With the present embodiment, the post-operation settlement maintains a suitable balance between: the risk which the electric power generating facilities 2 or the like have actually had; and the insurance fees which are to be paid, thereby preventing a case wherein the user pay excessive insurance fees as compared with the unexpected-shutdown risk of the electric power generating facilities 2, unlike conventional insurance service providing methods wherein settlement is performed only one time at the time of application for insurance contract.

In particular, the system according to the present embodiment exhibits the great advantage thereof in a case of the great difference between: the preliminary expected damage costs RC1 estimated at the time of application for insurance contract; and the post-operation expected damage costs RC2 estimated based upon information at the time of post-operation settlement with regard to the amount of reserve electric power which has been actually generated. In this case, the post-operation settlement maintains a suitable balance between: the risk which the electric power generating facilities 2 or the like have actually had; and the insurance fees which are to be paid by the user, thereby preventing a case wherein the user pays excessive insurance fees; thereby providing the user a markedly effective insurance service as means for hedging risk from the perspective of business.

The electric-power-generating-facilities operations management support system 1D including the insurance-service providing means 65 having such a configuration estimates the costs of electric power generation C further based upon the unexpected-shutdown-risk costs (insurance fees) as the operational-risk costs, thereby enabling operation of the electric power generating facilities 2 under generally the optimal conditions from the economic and overall perspective as compared with the electric-power-generating-facilities operations management support system 1A.

Furthermore, the electric-power-generating-facilities operations management support system 1D according to the present embodiment estimates the insurance fees as the unexpected-shutdown-risk costs following operation after insurance contract based upon the amount of reserve electric power which has been actually generated, and performs post-operation settlement based upon the unexpected-shutdown-risk costs thus calculated following operation after insurance contract, thereby maintaining a suitable balance between the risk which the electric power generating facilities 2 or the like have actually had, and the insurance fees which are to be paid by the user.

Thus, the system according to the present embodiment prevents a case wherein the user pays excessive insurance fees as compared with the risk of unexpected shutdown of the electric power generating facilities 2, unlike conventional insurance service providing methods wherein settlement is performed only one time at the time of application for insurance contract, thereby providing an effective insurance service as means for hedging risk due to maintaining of the reserve electric power production capability from the perspective of business, and thereby assisting the user in operating the electric power generating facilities 2 while maintaining the reserve electric power production capability wherein prediction of generation of reserve electric power is impossible.

Note that while description has been made in the present embodiment regarding an arrangement wherein the computer 11 reads and executes the two programs of the third operations management PG 50 and the insurance-service providing PG 60, an arrangement may be made wherein the computer 11 reads and executes a single program including functions of the third operations management PG 50 and the insurance-service providing PG 60.

Furthermore, while description has been made regarding an arrangement wherein upon the unexpected-shutdown-risk estimating unit 69 estimating the unexpected-shutdown risk following operation after insurance contract, and upon completion of calculation of the difference by the balance calculating unit 71, the insurance-settlement executing unit 72 performs the post-operation settlement, the present invention is not restricted to an arrangement wherein the post-operation settlement is performed for each estimation of the difference by the balance calculating unit 71. The reason is that the insurance-settlement executing unit 72 should perform settlement so as to maintain a balance between the insurance fees estimated at the time of insurance contract and the insurance fees estimated at the expiration of the insurance contract in the final stage. Accordingly, an arrangement may be made wherein post-operation estimations are made for each month, i.e., twelve times in a year, in a one-year insurance contract, and the post-operation settlement is performed all at one time for the difference estimated at the expiration of the insurance contract.

Accordingly, the present invention is not restricted to an arrangement wherein the number of times wherein the unexpected-shutdown-risk estimating unit 69 makes post-operation estimation of the unexpected-shutdown risk (i.e., the number of times wherein the balance calculating unit 71 calculates the difference) matches the number of times wherein the insurance-settlement executing unit 72 executes settlement, rather, an arrangement may be made wherein the number of times of settlement do not match the number of times of estimation.

Furthermore, while description has been made regarding an arrangement wherein the electric-power-generating-facilities operations management support system 1D includes functional means corresponding to the electric-power-generating-facilities operations management support system 1C and the insurance-service providing means 65, an arrangement may be made wherein the electric-power-generating-facilities operations management support system 1D includes only the insurance-service providing means 65. With such a configuration, the system provides an effective insurance service as means for heading risk due to maintaining of the reserve electric power production capability from the perspective of business, thereby serving as an electric-power-generating-facilities operations management support system for assisting operations and management of the electric power generating facilities 2, as well.

Next, description will be made regarding total operations management support processing as the electric-power-generating-facilities operations management support method performed by the electric-power-generating-facilities operations management support system 1D.

Figure 25:
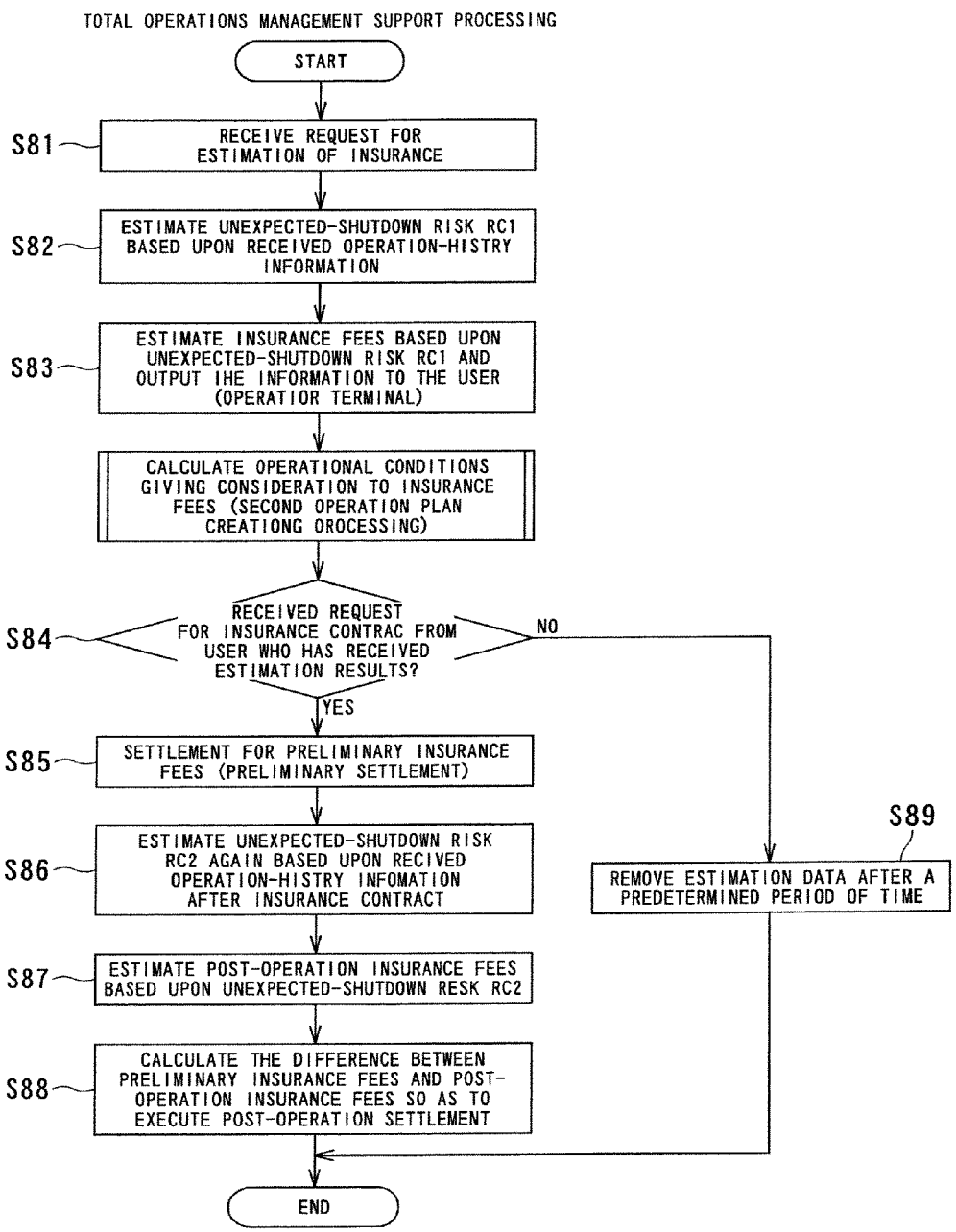
FIG. 25 is an explanatory diagram (processing flowchart) for describing total operations management support processing performed by the electric-power-generating-facilities operations management support system according to the seventh embodiment of the present invention.
Figure 26:
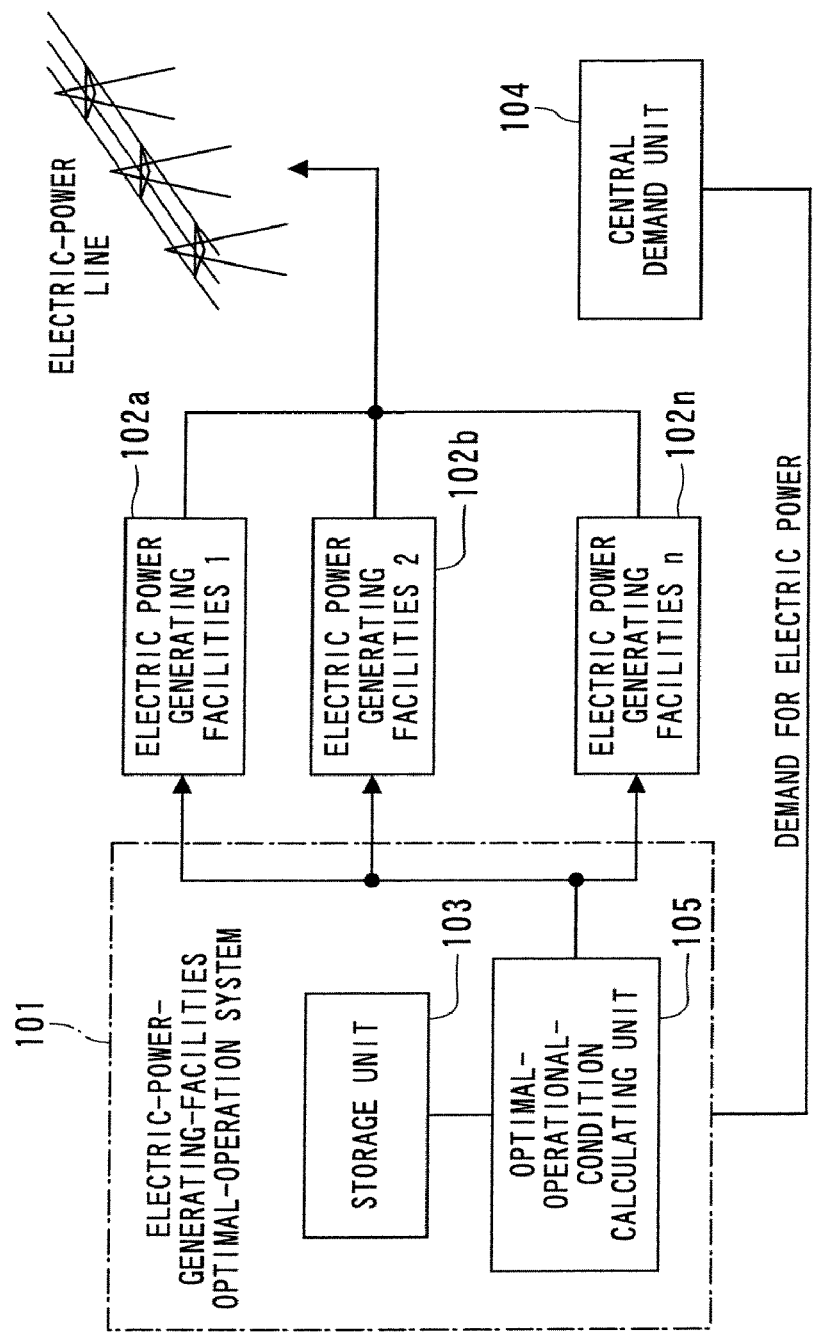
FIG. 26 is an explanatory diagram for describing a conventional electric-power-generating-facilities optimal operation system.

FIG. 25 is an explanatory diagram (processing flowchart) for making description in order regarding the total operations management support processing as the electric-power-generating-facilities operations management support method performed by the electric-power-generating-facilities operations management support system 1D.

As shown in FIG. 25, the total operations management support processing further includes insurance-service providing processing (Step S8), in addition to the second operational-condition notification processing described in the sixth embodiment. Accordingly, description will be omitted in the present embodiment regarding the second operational-condition notification processing described above.

As shown in FIG. 25, the insurance-service providing processing (Step S8) comprises: an estimation-request receiving step (Step S81) for receiving request for estimation of insurance; an unexpected-shutdown-risk estimating step (Step S82) for estimating the risk of unexpected shutdown of the electric power generating facilities 2 of which the risk is to be estimated according to the application for estimation of insurance, based upon the past operation-history information thereof; an insurance-fees-estimation-results output step (Step S83) for estimating the insurance fees based upon the unexpected-shutdown risk estimated by the unexpected-shutdown-risk estimating step, and outputting the estimation results; an insurance-contract-application receiving step (Step S84) for receiving application for insurance contract with the estimated insurance fees (preliminary insurance fees); and a preliminary insurance-fees settlement step (Step S85) for executing preliminary settlement for insurance fees after reception of application for insurance contract.

Furthermore, the insurance-service providing processing (Step S8) further comprises: a post-operation unexpected-shutdown-risk estimating step (Step S86) for estimating the unexpected-shutdown risk following preliminary settlement, based upon the operation-history information with regard to the insured electric-power-generating facilities 2 after insurance contract; a post-operation insurance-fees estimating step (Step S87) for estimating the insurance fees based upon the unexpected-shutdown risk estimated by the post-operation unexpected-shutdown-risk estimating step; and a post-operation settlement executing step (Step S88) for calculating the difference between the insurance fees (post-operation insurance fees) estimated by the post-operation insurance-fees estimating step and the preliminary insurance fees so as to execute post-operation settlement.

The total operations management support processing including: the insurance-service providing processing (Step S8) having such a configuration; and the second operational-condition notification processing, assists total operations and management of the electric power generating facilities 2 by providing notification of the operational conditions of the electric power generating facilities 2, and providing a suitable insurance service as means for hedging risk due to active maintaining of the reserve electric power production capabilities.

Next, brief description will be made in order, with regard to the total operations management support processing. First, the system performs processing in Steps S81 through S83 of the insurance-service providing processing (Step S8) for estimating the insurance fees at the time of application for insurance contract. Next, the system performs the second operational-condition notification processing, whereby the optimal operational conditions of the electric power generating facilities 2 are calculated further based upon the insurance fees which are as the unexpected-shutdown-risk costs, and are displayed on the operator terminal 9.

Next, the system performs processing in Steps S84 through S85, whereby preliminary settlement is completed. Subsequently, the system performs processing in Steps S86 through S88, whereby post-operation insurance fees are estimated at the time of expiration of the insurance contract or the like, and the post-operation settlement is completed based upon the estimated post-operation insurance fees.

Specifically, with the total operations management support processing, first, the insurance-application receiving unit 68 receives request from the user for estimation of insurance in the estimation-request receiving step (Step S81). Upon reception of request for estimation of insurance, the unexpected-shutdown-risk estimating unit 69 estimates the unexpected-shutdown risk RC1 based upon the received operation-history information (Step S82). Note that the unexpected-shutdown-risk estimating unit 69 reads out the operation-history information required for estimation from the operation-history DB 18.

Upon completion of estimation of the unexpected-shutdown risk RC1 based upon the received operation-history information by the unexpected-shutdown-risk estimating unit 69, the insurance-fees calculating unit 70 estimates the insurance fees based upon the estimated unexpected-shutdown risk RC1, and outputs the preliminary insurance fees thus estimated to the operator terminal 9 (Step S83). At the same time, the insurance-fees calculating unit 70 stores the preliminary insurance fees thus estimated in the insurance-contract-fees DB 74.

Upon the user receiving the information with regard to the estimated insurance fees through the operator terminal 9, the user operates the electric-power-generating-facilities operations management support system 1D to execute the second operational-condition notification processing. Upon completion of the second operational-condition notification processing, the operator terminal 9 displays the operational conditions for performing operations and management of the electric power generating facilities 2 more optimally. Note that in the event that the user accepts the displayed operational conditions, i.e., the amount of electric power generation (=(planning-based electric-power-generation amount Xf)+(reserve-electric-power amount Xv)), the user makes an application for insurance contract with accepted operational conditions through the operator terminal 9.

The electric-power-generating-facilities operations management support system 1D receives the application for insurance contract made with the operator terminal 9 through the communication network line 8, and the insurance-application receiving unit 68 receives the application for insurance contract with the preliminary insurance fees (in a case of "YES" in Step S84). Then, the insurance-settlement executing unit 72 executes settlement with the preliminary insurance fees, whereby preliminary settlement is completed (Step S85).

Upon completion of the preliminary settlement by the insurance-settlement executing unit 72, the unexpected-shutdown-risk estimating unit 69 receives the operation-history information with regard to the insured electric power generating facilities 2 after insurance contract so as to estimate the post-operation unexpected-shutdown risk RC2 (Step S86). While the unexpected-shutdown-risk estimating unit 69 may estimate the post-operation unexpected-shutdown risk RC2 at any time, description will be made regarding an arrangement example wherein estimation of the post-operation unexpected-shutdown risk RC2 is made only one time at the expiration of the insurance contract.

Upon completion of estimation of the post-operation unexpected-shutdown risk RC2, the insurance-fees calculating unit 70 estimates the insurance fees based upon the post-operation unexpected-shutdown risk RC2 thus estimated (Step S87). Upon completion of calculation of the insurance fees (post-operation insurance fees), the balance calculating unit 71 receives the information with regard to the post-operation insurance fees and the preliminary insurance fees from the insurance-contract-fees DB 74 so as to calculate the difference therebetween. Subsequently, the insurance-settlement executing unit 72 receives the information with regard to the difference calculated by the balance calculating unit 71 so as to execute post-operation settlement for returning the excessive insurance fees to the user (insured), or the like (Step S88). Upon completion of the post-operation settlement, the total operations management support processing is completed (END).

Note that the present embodiment has been proposed in order to provide an insurance service, and accordingly, the system described above does not include any specific processing for handling a case wherein the user does not make any application for insurance contract through the operator terminal 9 (i.e., a case of "NO" in Step S84) following the user receiving information with regard to the operational conditions (=(planning-based electric-power-generation amount Xf)+(reserve-electric-power-generation amount Xv). With the system shown in FIG. 25, in such a case, the system performs processing wherein the insurance-contract-fees data is removed after a predetermined period of time (Step S89), or the like.

With the operations management support system (total operations management support processing) for the electric power generating facilities 2 having such a configuration, following settlement with the preliminary insurance fees as the preliminary settlement according to an application of insurance contract by the user (operator of the electric power generating facilities) in the preliminary insurance-fees settlement step (Step S85), the unexpected-shutdown-risk estimating unit 69 estimates the unexpected-shutdown risk (post-operation expected damage costs) RC2 of the electric power generating facilities 2 based upon the amount of reserve electric power which has been actually generated after insurance contract in the post-operation unexpected-shutdown-risk estimating step (Step S86), the insurance-fees calculating unit 70 calculates the post-operation insurance fees in the post-operation insurance-fees estimating step (Step S87), the balance calculating unit 71 calculates the difference between the preliminary insurance fees and the post-operation insurance fees, and in the event that the difference is not zero, the insurance-settlement executing unit 72 executes post-operation settlement for the difference in the post-operation settlement executing step (Step S88).

The system according to the present embodiment includes a function for executing the post-operation settlement, thereby maintaining a suitable balance between the risk which the electric power generating facilities 2 have actually had, and the insurance fees, thereby preventing a case wherein the user pays excessive insurance fees (costs) as compared with the unexpected-shutdown risk of the electric power generating facilities 2, unlike conventional insurance service providing methods wherein settlement is performed only one time at the time of application for insurance contract. Thus, the system according to the present embodiment provides an effective insurance service as means for hedging risk from the perspective of business, and thereby assisting the user in operating the electric power generating facilities 2 while maintaining the reserve electric power production capability wherein prediction of generation of reserve electric power is impossible.

Furthermore, the system according to the present embodiment calculates the costs of electric power generation C further based upon the unexpected-shutdown-risk costs as the operational-risk costs, thereby enabling operation of the electric power generating facilities 2 under generally the optimal operational conditions from the economic and overall perspective as compared with the electric-power-generating-facilities operations management support system 1A.

Note that while description has been made regarding an arrangement wherein estimation of the post-operation unexpected-shutdown risk RC2 is made only one time at the expiration of the insurance contract in the post-operation unexpected-shutdown-risk estimating step (Step S86), the estimation may be made at any time. Furthermore, the system according to the present embodiment should execute settlement at least one time, and should execute settlement so as to completely restore the difference between the preliminary insurance fees and the post-operation insurance fees over the term of insurance.

With the electric-power-generating-facilities operations management support system, the operations management support method thereof (total operations management support processing), and the program for executing the operations management support method according to the present seventh embodiment of the present invention, the costs of electric power generation C are calculated further based upon the unexpected-shutdown-risk costs (insurance fees) as the operational-risk costs, thereby enabling operation of the electric power generating facilities 2 under generally the optimal conditions from the economic and overall perspective as compared with the electric-power-generating-facilities operations management support system 1A.

Furthermore, with the present embodiment, estimation of insurance fees as the unexpected-shutdown-risk costs is made again following operation after insurance contract based upon the amount of electric power which has been actually generated, and post-operation settlement is executed based upon the insurance fees thus estimated, thereby maintaining a suitable balance between the risk of the insured electric power generating facilities and the insurance fees which are to be paid by the user.

Thus, the system according to the present embodiment prevents a case wherein the user pays excessive insurance fees as compared with the unexpected-shutdown risk of the insured electric power generating facilities 2, unlike conventional insurance service providing methods wherein settlement is executed only one time at the time of application of insurance contract, thereby providing an effective insurance service as means for hedging risk due to maintaining of the reserve electric power production capability from the perspective of business. That is to say, the system according to the present embodiment totally assists the user in operating the electric power generating facilities 2 while actively maintaining the reserve electric power production capability wherein prediction of generation of reserve electric power is impossible, by providing the optimal operation planning, and providing effective means for hedging risk (insurance service) from the perspective of business.

As described above, with the electric-power-generating-facilities operations management support system, the operations management support method thereof, and the program for executing the operations management support method on a computer according to any one of the fourth through seventh embodiments of the present invention, costs of electric power generation under over-rated operation are calculated based upon the lifespan-consumption costs as the operational-risk costs due to over-rated operation as well as based upon the costs of efficiency reduction, thereby assisting operation of electric power generating facilities 2 while meeting the market needs, e.g., operation wherein in the event that the market price (revenues from electric power generation) of reserve electric power is greater than the calculated costs of electric power generation, over-rated operation is actively performed so as to generate reserve electric power.

Note that over-rated operation is performed for generating reserve electric power. Accordingly, in the event that reserve electric power has not actually been generated (in the event that the amount of electric power generation matches the planning-based electric-power-generation amount), the electric power generating facilities operate with high efficiency under around the rated operational conditions, thereby maintaining high-efficiency operation of the electric power generating facilities 2. Furthermore, the system estimates the optimal planning-based electric-power-generation amount and the reserve-electric-power-generation amount, and notifies the user of the information as operational conditions, thereby assisting the user (operator of the electric power generating facilities) in making a determination.

Furthermore, even in a case wherein multiple electric power generating facilities 2 are at various remote locations from the system according to the present invention, the system installed in a single place centrally makes up the optimal operation planning (notifies the operators of the operational conditions) for the multiple electric power generating facilities 2 by transmitting and receiving information through the communication network line 8. Thus, the system according to the present invention provides an O&M service for providing the operational conditions of the multiple electric power generating facilities 2 to the corresponding operators thereof so as to assist operation management of each.

Furthermore, the system according to the present invention calculates the costs of electric power generation C further based upon unexpected-shutdown-risk costs (insurance fees) as the operational-risk costs, thereby assisting the user in operating the electric power generating facilities 2 under generally the optimal operational conditions from the economic and overall perspective while using insurance as means for hedging risk.

Furthermore, estimation of insurance fees as the unexpected-shutdown-risk costs is made again following operation after insurance contract based upon the amount of reserve electric power which has been actually generated, and post-operation settlement is executed based upon the insurance fees thus estimated, thereby maintaining a suitable balance between the risk which the electric power generating facilities 2 has actually had, and the insurance fees paid by the user. Thus, the system according to the present invention totally assists the user in operating the electric power generating facilities 2 by providing operation planning thereof and providing effective means for heading risk from the perspective of business while maintaining the reserve electric power production capability wherein prediction of generation of reserve electric power is impossible.

Note that with the electric-power-generating-facilities operations management support system, the operations management support method thereof, and the program for executing the operations management support method on a computer according to the present invention, involve an electric-power-generating-facilities operations management support system formed of a combination of arrangements according to the embodiments of the present invention, an operations management support method thereof, and a program for executing the operations management support method on a computer.

Furthermore, none of the electric-power-generating-facilities operations management support systems 1A, 1B, 1C, and 1D, according to the fourth through seventh embodiments of the present invention, are restricted to an arrangement wherein the number of the electric power generating facilities 2 which are to be managed, the operator terminals 9, the operator consoles 10, and the computers 11, are fixed as shown in FIG. 12, FIG. 17, FIG. 20, or FIG. 23. For example, while description has been made with reference to FIG. 12 regarding an arrangement wherein the system supports only one set of electric power generating facilities 2 which are to be managed, an arrangement may made wherein the system supports multiple sets of electric power generating facilities 2.

Furthermore, with the electric-power-generating-facilities operations management support systems 1A, 1B, 1C, and 1D, according to the fourth through seventh embodiments of the present invention, while description has been made regarding an arrangement wherein the operational conditions calculated by the electric-power-generating-facilities operations management support systems 1A, 1B, 1C, or 1D, are output to the operator terminal 9 serving as display means, the system may notify the user of the operational conditions through other means. For example, an arrangement may be made wherein the system outputs the operational conditions through printing means such as a printer or the like instead of the operator terminal 9 (display means).

Furthermore, while description has been made regarding an arrangement wherein electronic data such as the first operations management PG 12, the operation-history DB 18, the plant-model DB 19, and the electric-power market DB 20, is stored in the data storage means 14 included in the computer 11, the present invention is not restricted to an arrangement wherein the PGs and DBs, which are to be read out by the system, are stored in the data storage means 14 included in the computer 11. For example, an arrangement may be made wherein the aforementioned PGs and DBs are stored in other data storage means such as an unshown data storage server or the like.

That is to say, the electronic data which is to be read out by the computer 11 may be stored in any data storage means from which the computer 11 can read out the electronic data. In the same way, the DB which is to be written by the computer 11 may be stored in any data storage means to which the computer 11 can write the DB.

What is claimed is:

1. An electric-power-generating-facility operation management support system, comprising:
  an analyzing unit that calculates operation plan creating basic information based upon received information with regard to lifespan calculating expressions, present electric-power market information, and operation-history information with regard to an electric power generation; and
  an operation plan creating unit that calculates and outputs operational conditions of electric power generating facilities as a created operation planning based upon said operation plan creating basic information calculated by said analyzing unit,
  said analyzing unit comprising
    a lifespan-consumption-costs calculating unit that calculates lifespan consumption costs of said electric power generating facilities,
    a reserve-electric-power-price estimating unit that estimates a market price of reserve electric power, and
    a reserve-electric-power supply-probability estimating unit that estimates a probability of a supply of the reserve electric power.

2. The electric-power-generating-facility operation management support system according to claim 1, further comprising:
  an electric-power-generation-amount-adjustment-instruction input unit that inputs and receives electric-power-generation-amount adjustment instruction values for said electric power generating facilities; and
  an electric-power-generation-amount control signal transmitting unit that transmits electric-power-generation-amount control signals to said electric power generating facilities for controlling an amount of an electric power generation according to said electric-power-generation-amount adjustment instruction values received by said electric-power-generation-amount-adjustment-instruction input unit.

3. The electric-power-generating-facility operation management support system according to claim 1, wherein said analyzing unit includes an unexpected-shutdown-risk-costs receiving unit that receives information with regard to insurance fees paid to an insurance service company, as unexpected-shutdown-risk costs.

4. The electric-power-generating-facility operation management support system according to claim 1, further including:
an insurance-service providing unit that provides an insurance service for hedging a risk of an unexpected shutdown of said electric power generating facilities.

5. The electric-power-generating-facility operation management support system according to claim 1, wherein said operation plan creating unit includes:
an electric-power-generation-profit calculating unit that calculates a profit from an electric power generation based upon information with regard to the lifespan consumption costs, the market price of the reserve electric power, and the probability of supplying the reserve electric power, analyzed by said analyzing unit;
an optimal-operational-condition calculating unit that calculates a combination of a planning-based electric-power-generation amount and a reserve electric power generation amount as operational conditions, which exhibits an optimal profit from an electric generation calculated by said electric-power-generation-profit calculating unit; and
an optimal-operation-condition output unit that outputs said operational conditions calculated by said optimal-operational-condition calculating unit,
said electric-power-generation-profit calculating unit including
a planning-based electric-power-generation-amount/market-price property calculating unit that calculates a relation between the planning-based electric-power-generation amount which is a part of an amount of an electric power generation amount and the estimated market price of the reserve electric power,
a reserve-electric-power-generation-amount/market-price property calculating unit that calculates a relation between the reserve electric power generation amount which is a part of the amount of the electric power generation amount and the estimated market price of the reserve electric power,
a reserve-electric-power-generation-amount/reserve-electric-power-supply-probability property calculating unit that calculates a relation between the reserve electric power generation amount and a reserve-electric-power supply probability,
an electric-power-generation-amount/electric-power-generation-revenues property calculating unit that calculates a relation between revenues from electric power generation and an amount of electric power generation, to calculate an electric-power-generation-amount/electric-power-generation-revenues property,
an electric-power-generation-amount/electric-power-generation-costs property calculating unit that calculates a relation between costs of an electric power generation including operational-risk costs and the amount of electric power generation, to calculate an electric-power-generation-amount/electric-power-generation-costs property, and
a planning-based-electric-power-generation-amount/reserve-electric-power-generation-amount/expected-profit-from-electric-power-generation property calculating unit that calculates a relation between an expected profit from an electric power generation, the planning-based electric-power-generation amount, and the reserve electric power generation amount, based upon said electric-power-generation-amount/electric-power-generation -revenues property and said electric-power-generation-amount/electric-power-generation-costs property, wherein said operational-risk costs include said lifespan consumption costs.

6. The electric-power-generating-facility operation management support system according to claim 5, wherein said operational-risk costs include unexpected-shutdown-risk costs.

7. An electric-power-generating-facility operation management support method implemented by a processing unit, the electric-power-generating-facility operation management support method comprising:
calculating operation plan creating basic information; and
an operation plan creating step,
said calculating including
calculating lifespan-consumption costs of electric power generating facilities;
estimating a market price of reserve electric power; and
estimating a probability of supplying the reserve electric power,
said operation plan creating step including
calculating a profit from an electric power generation based upon said operation plan creating basic information;
calculating, with the processing unit, optimal operational conditions which exhibit an optimal profit from the electric power generation calculated by said calculating the profit; and
outputting said optimal operational conditions calculated by said calculating the optimal operational conditions to notify of said optimal operational conditions.

8. The electric-power-generating-facility operation management support method according to claim 7, further comprising:
transmitting instruction values to each of said electric power generating facilities for adjusting an electric power generation amount of each of said electric power generating facilities for controlling an amount of electric power generation.

9. The electric-power-generating-facility operation management support method according to claim 7, wherein said calculating the profit includes:
calculating a relation between a planning-based electric-power-generation amount which is a part of an amount of electric power generation and the estimated market price of the reserve electric power, based upon said operation plan creating basic information, to calculate a planning-based electric-power-generation-amount/market-price property;
calculating a relation between a reserve-electric-power-generation amount which is a part of the amount of electric power generation and the estimated market price of the reserve electric power, to calculate a reserve-electric-power-generation-amount/market-price property;

calculating a relation between the reserve-electric-power generation amount and a reserve-electric-power supply probability, to calculate a reserve-electric-power-generation-amount/reserve-electric-power-supply-probability property;

calculating a relation between revenues from an electric power generation and the amount of electric power generation, based upon said planning-based electric-power-generation-amount/market-price property, said reserve-electric-power-generation-amount/market-price property, and said reserve-electric-power-generation-amount/reserve-electric-power-supply-probability property, to calculate an electric-power-generation-amount/electric-power-revenues property;

calculating a relation between costs of an electric power generation including lifespan-consumption costs as operational-risk costs and the amount of electric power generation, to calculate an electric-power-generation-amount/electric-power-generation-costs property; and calculating a relation between an expected profit from an electric power generation, the planning-based electric-power-generation amount, and the reserve-electric-power-generation amount, based upon said calculated electric-power-generation-amount/electric-power-revenues property and said electric-power-generation-amount/electric-power-generation-costs property.

10. The electric-power-generating-facility operation management support method according to claim 7, further comprising:

receiving a request for an estimation of insurance;

estimating an unexpected-shutdown risk of an unexpected shutdown of facilities based upon past operation-history information with regard to the electric power generating facilities which are to be insured, provided according to said request;

estimating insurance fees based upon said unexpected-shutdown risk, and outputting said estimated insurance fees;

calculating a relation between a planning-based electric power generation amount which is a part of an amount of electric power generation and the estimated market price of the reserve electric power, based upon said operation plan creating basic information, to calculate a planning-based electric-power-generation-amount/market-price property;

calculating a relation between a reserve-electric-power-generation amount which is a part of the amount of electric power generation and the estimated market price of the reserve electric power, to calculate a reserve-electric-power-generation-amount/market-price property;

calculating a relation between the reserve-electric-power-generation amount and a reserve-electric-power supply probability, to calculate a reserve-electric-power-generation-amount/reserve-electric-power-supply-probability property;

calculating a relation between revenues from an electric power generation and the amount of electric power generation, based upon said planning-based electric-power-generation-amount/market-price property, said reserve-electric-power-generation-amount/market-price property, and said reserve-electric-power-generation-amount/reserve-electric-power-supply-probability property, to calculate an electric-power-generation-amount/electric-power-revenues property;

calculating a relation between costs of an electric power generation including a lifespan-consumption cost and unexpected-shutdown-risk costs as an operational-risk cost; and of the amount of electric power generation, to calculate an electric-power-generation-amount/electric-power-generation-costs property;

calculating a relation between an expected profit from an electric power generation, the planning-based electric power generation amount, and the reserve-electric-power-generation amount, based upon said calculated electric-power-generation-amount/electric-power-revenues property and said electric-power-generation-amount/electric-power-generation-costs property;

receiving an application of an insurance contract with said insurance fees;

executing a preliminary settlement for said insurance fees according to the application of the insurance contract;

estimating an unexpected-shutdown risk following said preliminary settlement, based upon operation-history information with regard to said insured electric power generating facilities after the insurance contract;

calculating insurance fees again based upon said unexpected-shutdown risk estimated by said estimating the unexpected-shutdown risk following said preliminary settlement; and calculating a difference between said insurance fees calculated again by said calculating said insurance fees again and preliminary insurance fees, to execute a post-operation settlement.

11. A non-transitory computer-readable medium including computer executable instructions, wherein the instructions, when executed by a processor, cause the processor to perform a method for executing an operational-condition notifying processing on a computer, comprising:

calculating operation plan creating basic information;

an operation plan creating step; and transmitting instruction values to each of electric power generating facilities for adjusting an electric power generation amount of each of said electric power generating facilities, said calculating including calculating lifespan-consumption costs of said electric power generating facilities;

estimating a market price of reserve electric power; and estimating a probability of supplying the reserve electric power; and said operation plan creating step including calculating a profit from an electric power generation based upon said operation plan creating basic information;

calculating optimal operational conditions which exhibit an optimal profit from the electric power generation calculated by said calculating the profit; and outputting said optimal operational conditions to notify of said optimal operational conditions.

12. A non-transitory computer-readable medium including computer executable instructions, wherein the instructions, when executed by a processor, cause the processor to perform a method for executing an operation-planning notifying processing on a computer, comprising:

calculating operation plan creating basic information; and an operation plan creating step, said calculating including calculating lifespan-consumption costs of electric power generating facilities;

estimating a market price of reserve electric power; and estimating a probability of supplying the reserve electric power;

said operation plan creating step including
- calculating a profit from an electric power generation based upon said operation plan creating basic information;
- calculating optimal operational conditions which exhibit an optimal profit from the electric power generation calculated by said calculating the profit; and
- outputting said optimal operational conditions to notify of said optimal operational conditions;

said calculating the profit including
- calculating a relation between a planning-based electric-power-generation amount which is a part of an amount of electric power generation and the estimated market price of the reserve electric power, based upon said operation plan creating basic information, to calculate a planning-based electric-power-generation-amount/market-price property;
- calculating a relation between a reserve-electric-power-generation amount which is a part of the amount of electric power generation and the estimated market price of the reserve electric power, to calculate a reserve-electric-power-generation-amount/market-price property;
- calculating a relation between the reserve-electric-power-generation amount and a reserve-electric-power supply probability, to calculate a reserve-electric-power-generation-amount/reserve-electric-power-supply-probability property;
- calculating a relation between revenues from an electric power generation and the amount of electric power generation, based upon said planning-based electric-power-generation-amount/market-price property, said reserve-electric-power-generation-amount/market-price property, and said reserve-electric-power-generation-amount/reserve-electric-power-supply-probability property, to calculate an electric-power-generation-amount/electric-power-revenues property;
- calculating a relation between costs of an electric power generation including lifespan-consumption costs and unexpected-shutdown-risk costs as operational-risk costs and the amount of electric power generation, to calculate an electric-power-generation-amount/electric-power-generation-costs property; and
- calculating a relation between an expected profit from an electric power generation, the planning-based electric-power-generation amount, and the reserve-electric-power-generation amount, based upon said calculated electric-power-generation-amount/electric-power-revenues property and said electric-power-generation-amount/electric-power-generation-costs property.

* * * * *